United States Patent
Iguchi et al.

(10) Patent No.: US 8,462,900 B2
(45) Date of Patent: Jun. 11, 2013

(54) RECEPTION DEVICE, INTEGRATED CIRCUIT, AND RECEPTION METHOD

(75) Inventors: Noritaka Iguchi, Osaka (JP); Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 12/919,303

(22) PCT Filed: Feb. 20, 2009

(86) PCT No.: PCT/JP2009/000745
§ 371 (c)(1),
(2), (4) Date: Oct. 28, 2010

(87) PCT Pub. No.: WO2009/107347
PCT Pub. Date: Sep. 3, 2009

(65) Prior Publication Data
US 2011/0038447 A1    Feb. 17, 2011

(30) Foreign Application Priority Data

Feb. 27, 2008    (JP) .................................. 2008-045402

(51) Int. Cl.
*H04B 7/10*    (2006.01)
*H04L 1/02*    (2006.01)

(52) U.S. Cl.
USPC ......................................... 375/346; 375/347

(58) Field of Classification Search
None
See application file for complete search history.

(56) References Cited

U.S. PATENT DOCUMENTS

| | | | |
|---|---|---|---|
| 7,054,354 B2 | 5/2006 | Gorokhov et al. | |
| 8,098,747 B2 * | 1/2012 | Lee | 375/260 |
| 2004/0091057 A1 | 5/2004 | Yoshida | |
| 2004/0184550 A1 | 9/2004 | Yoshida et al. | |
| 2006/0239367 A1 | 10/2006 | Wilhelmsson et al. | |
| 2008/0025384 A1* | 1/2008 | Liu et al. | 375/229 |
| 2009/0225913 A1* | 9/2009 | Nakahara et al. | 375/347 |

FOREIGN PATENT DOCUMENTS

| | | |
|---|---|---|
| CN | 1499753 | 5/2004 |
| CN | 1585393 | 2/2005 |
| EP | 1 418 720 | 5/2004 |
| EP | 1 737 177 | 12/2006 |
| EP | 1 933 488 | 6/2008 |
| EP | 1 940 062 | 7/2008 |
| EP | 2 051 425 | 4/2009 |
| JP | 11-261657 | 9/1999 |
| JP | 11261657 A  * | 9/1999 |

(Continued)

OTHER PUBLICATIONS

International Search Report issued Mar. 17, 2009 in International (PCT) Application No. PCT/JP2009/000745.

*Primary Examiner* — Chieh M Fan
*Assistant Examiner* — Wednel Cadeau
(74) *Attorney, Agent, or Firm* — Wenderoth, Lind & Ponack, L.L.P.

(57) ABSTRACT

An OFDM demodulation unit 13 transforms transmission signals in the time domain into demodulation vectors Y in the frequency domain; an equalization unit 14 estimates channel response vectors H' based on the demodulation vectors Y, and calculates equalization vectors X' by equalizing the demodulation vectors Y based on the estimated channel response vectors H'; and an interference removal unit 15 calculates error component vectors indicating error components pertaining to ISI and ICI related to the demodulation vectors Y, based on the equalization vectors X' and the channel response vectors H', generates demodulation vectors Y' by removing the error component vectors from the demodulation vectors Y, and outputs the generated demodulation vectors Y'.

18 Claims, 24 Drawing Sheets

FOREIGN PATENT DOCUMENTS

| | | |
|---|---|---|
| JP | 2004-208254 | 7/2004 |
| JP | 2004-519900 | 7/2004 |
| JP | 2004-229198 | 8/2004 |
| JP | 2004-289475 | 10/2004 |
| JP | 2006-24992 | 1/2006 |
| JP | 2007-6067 | 1/2007 |
| WO | 02/067527 | 8/2002 |
| WO | 2006/111843 | 10/2006 |
| WO | 2007/032497 | 3/2007 |
| WO | 2007/046503 | 4/2007 |
| WO | 2008/084784 | 7/2008 |

\* cited by examiner

FIG. 4
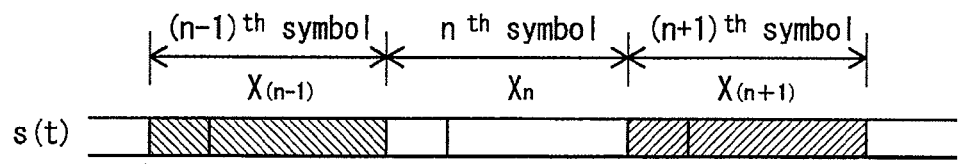
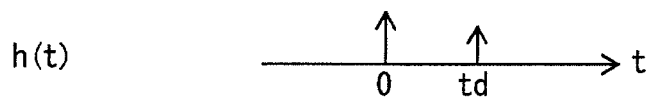
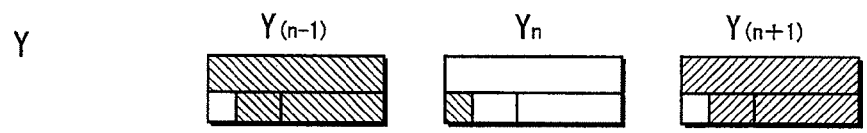
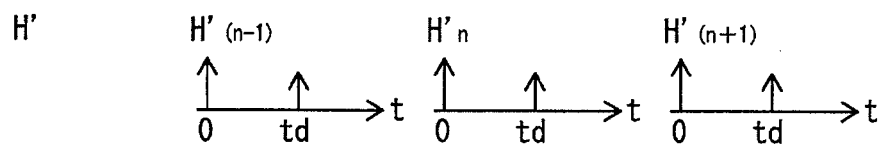

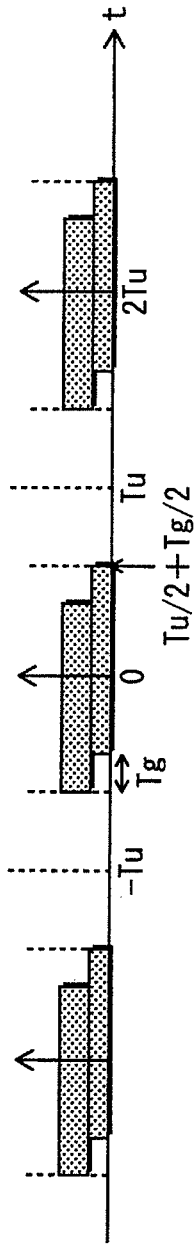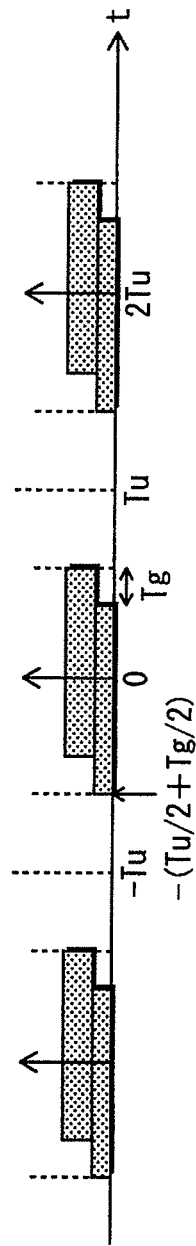

RECEPTION DEVICE, INTEGRATED CIRCUIT, AND RECEPTION METHOD

TECHNICAL FIELD

The present invention relates to a technology to remove an error caused by at least one of Inter-Symbol Interference and Inter-Carrier Interference, from transmission signals that include a plurality of modulated carriers frequency-division multiplexed therein.

BACKGROUND ART

An Orthogonal Frequency Division Multiplexing (OFDM) method has been adopted as a transmission method for digital terrestrial broadcasting, a wireless LAN (Local Area Network), and the like. With the OFDM method, a plurality of carriers are closely arrayed while remaining orthogonal to each other. Therefore, the OFDM method enables efficient use of frequency. Furthermore, as the OFDM method allows setting long symbol lengths, the OFDM method is robust against Inter-Symbol Interference caused by a plurality of incoming waves.

Also, a guard interval technique is commonly used in the OFDM method. According to the guard interval technique, a portion of the end of a useful symbol is inserted in front of the useful symbol as a guard interval. With this structure, the guard interval technique makes it possible to perform the Fast Fourier Transform (FFT) while avoiding interference components pertaining to Inter-Symbol Interference caused by a delayed wave in a case where the delayed wave is delayed from the dominant wave by a delay period not greater than the duration of the guard interval. As a result, the receiver becomes able to demodulate the received OFDM transmission signals without deterioration.

However, when the delay time of a delayed wave exceeds the duration of the guard interval, Inter-Symbol Interference (ISI) and Inter-Carrier Interference (ICI) occur, and as a result, the receiver is unlikely to be able to demodulate the received OFDM transmission signals accurately, causing deterioration in reception quality.

Single Frequency Network (SFN) has been adopted for a terrestrial digital broadcasting method, and transmission stations are installed such that the delay times of delayed waves are within the duration of the guard interval. However, in some environment, the delay times of delayed waves exceed the duration of the guard interval due to reflection off mountains, building, etc. In such an environment, it is difficult for the receiver to demodulate the received OFDM transmission signals accurately due to ISI and ICI, and the reception quality significantly deteriorates as a result.

Accordingly, accurate demodulation of the OFDM transmission signals in the above-described environment requires a technology to remove, from the OFDM transmission signals, interference components pertaining to ISI and ICI due to delayed waves. For example, Patent Literature 1 suggests the following method.

Demodulated data in a frequency domain is calculated by performing an FFT on the OFDM transmission signal in a time domain; channel response data in the frequency domain is estimated based on the demodulated data; and channel response signals in the time domain are calculated by performing an Inverse Fast Fourier Transform (IFFT) on the channel response data in the frequency domain. Waveform equalization is performed on the OFDM transmission signals in the time domain based on the channel response signals in the time domain; interference components pertaining to ISI and ICI are estimated; and the interference components are removed from the OFDM transmission signals.

Note that Patent Literature 2 discloses another method. According to this method, however, interference components pertaining to ISI and ICI due to preceding waves which arrive at the receiver earlier than the dominant wave cannot be estimated and removed.

CITATION LIST

Patent Literature

[Patent Literature 1]
Japanese Laid-Open Patent Application Publication No. 2007-006067
[Patent Literature 2]
Japanese Laid-Open Patent Application Publication No. 2004-289475

SUMMARY OF INVENTION

Technical Problem

However, according to the method disclosed by Patent Literature 1, interference components pertaining to ISI and ICI are estimated in the time domain using a filter before the FFT is performed. Accordingly, estimating the interference components more accurately requires a filter with a large number of taps, which leads to an increase in the circuit scale.

In view of the above problem, the present invention aims to provide a receiver, an integrated circuit, and a reception method which enable, with a small circuit scale, removal of an error component pertaining to at least one of ISI and ICI, from transmission signals having a plurality of demodulated carriers frequency division multiplexed therein.

Solution to Problem

In order to achieve the stated aim, one aspect of the present invention is a receiver that receives transmission signals, which have been generated by multiplexing a plurality of modulated carriers, and demodulates the received transmission signals, the receiver comprising: a transform unit operable to transform, for each symbol, received transmission signals corresponding to the symbol in a time domain into demodulated data in a frequency domain; an equalization unit operable to estimate channel response data in the frequency domain based on the demodulated data, and calculate equalized data in the frequency domain by equalizing the demodulated data based on the estimated channel response data; and an interference removal unit operable to calculate, for each symbol, interference data indicating an interference component pertaining to at least one of intersymbol interference and intercarrier interference, based on the equalized data and the channel response data and perform, on the demodulated data, removal processing of the interference component based on the interference data.

Another aspect of the present invention is an integrated circuit that receives transmission signals, which have been generated by multiplexing a plurality of modulated carriers, and demodulates the received transmission signals, the integrated circuit comprising: a transform unit operable to transform, for each symbol, received transmission signals corresponding to the symbol in a time domain into demodulated data in a frequency domain; an equalization unit operable to estimate channel response data in the frequency domain based on the demodulated data, and calculate equalized data in the frequency domain by equalizing the demodulated data based on the estimated channel response data; and an interference removal unit operable to calculate, for each symbol, interference data indicating an interference component pertaining to at least one of intersymbol interference and intercarrier interference, based on the equalized data and the channel response data and perform, on the demodulated data, removal processing of the interference component based on the interference data.

Another aspect of the present invention is a reception method used by a receiver that receives transmission signals, which have been generated by multiplexing a plurality of modulated carriers, and demodulates the received transmission signals, the reception method comprising: a transforming step of transforming, for each symbol, received transmission signals corresponding to the symbol in a time domain into demodulated data in a frequency domain; an equalizing step of estimating channel response data in the frequency domain based on the demodulated data, and calculating equalized data in the frequency domain by equalizing the demodulated data based on the estimated channel response data; and an interference removing step of calculating, for each symbol, interference data indicating an interference component pertaining to at least one of intersymbol interference and intercarrier interference, based on the equalized data and the channel response data and performing, on the demodulated data, removal processing of the interference component based on the interference data.

Advantageous Effects of Invention

According to the above-described receiver, integrated circuit, and reception method, interference components are calculated and removed after the transform unit transforms the transmission signal in the time domain to demodulated data in the frequency domain. Consequently, influence of the ISI and the ICI are removed while the circuit scale is suppressed, which leads to an improvement in reception quality.

In the above-described receiver, the interference removal unit may include: a delay upsample unit operable to generate first equalized data having a discrete frequency interval of $1/(N \times Tu)$ by performing delay processing and upsample processing on the equalized data corresponding to one symbol, and output the generated first equalized data, where N is a number greater than 1, and Tu represents a duration of a useful symbol period; an upsample unit operable to generate first channel response data having the discrete frequency interval of $1/(N \times Tu)$ by performing upsample processing on the channel response data corresponding to the one symbol; a multiplication unit operable to generate first demodulated data by multiplying the first equalized data by the first channel response data on a per-carrier basis; an extraction unit operable to extract, from the first demodulated data, a first interference component pertaining to intersymbol interference due to a delayed wave, by performing filter processing on the first demodulated data based on a predetermined transfer function, and generate first interference data indicating the first interference component; an interference component generation unit operable to generate the interference data indicating the interference component, by performing downsample processing on the first interference data; and a removal unit operable to subtract the interference data from the demodulated data corresponding to the one symbol.

According to the stated structure, adjacent signal components of the first demodulated data seen in the time domain do not overlap with each other. Consequently, the receiver can independently extract the first interference component pertaining to ISI due to a delayed wave, achieving an improvement in the ability to remove ISI due to delayed waves as a result.

In the above-described receiver, the interference component generation unit may perform, on the first interference data, in addition to the downsample processing, phase rotation processing based on a value obtained by multiplying a duration of a guard interval period by −1, on the per-carrier basis.

With the stated structure, the receiver can remove the interference component from the demodulated data effectively even in a case where a guard interval period has been added to each received transmission signal.

In the above-described receiver, the interference removal unit may include: a first upsample unit operable to generate first equalized data having a discrete frequency interval of $1/(N \times Tu)$ by performing upsample processing on the equalized data corresponding to one symbol, and output the generated first equalized data, where N is a number greater than 1, and Tu represents a duration of a useful symbol period; a second upsample unit operable to generate first channel response data having the discrete frequency interval of $1/(N \times Tu)$ by performing upsample processing on the channel response data corresponding to the one symbol; a multiplication unit operable to generate first demodulated data by multiplying the first equalized data by the first channel response data on a per-carrier basis; an extraction unit operable to extract, from the first demodulated data, a first interference component pertaining to intercarrier interference due to a delayed wave, by performing filter processing on the first demodulated data based on a predetermined transfer function, and generate first interference data indicating the first interference component; an interference component generation unit operable to generate the interference data indicating the interference component, by performing downsample processing on the first interference data; and a removal unit operable to add the interference data to the demodulated data corresponding to the one symbol.

According to the stated structure, adjacent signal components of the first demodulated data seen in the time domain do not overlap with each other. Consequently, the receiver can independently extract the first interference component pertaining to the ICI due to the delayed wave, achieving an improvement in the ability to remove ISI due to delayed waves as a result.

In the above-described receiver, the interference removal unit may further include a phase rotation unit operable to generate second equalized data by performing phase rotation processing on the equalized data corresponding to the one symbol or the first equalized data on the per-carrier basis, based on a duration of a guard interval period, wherein when the phase rotation unit performs the phase rotation processing on the equalized data corresponding to the one symbol, the first upsample unit generates the first equalized data by performing the upsample processing on the second equalized data instead of on the equalized data corresponding to the one symbol, when the phase rotation unit performs the phase rotation processing on the first equalized data, the multiplication unit generates the first demodulated data by multiplying the second equalized data, instead of the first equalized data, by the first channel response data, on the per-carrier basis, and the interference component generation unit performs, on the first interference data, in addition to the downsample processing, phase rotation processing based on a value obtained by multiplying the duration of the guard interval period by −1, on the per-carrier basis.

With the stated structure, the receiver can remove the interference component from the demodulated data effectively even in a case where a guard interval period has been added to each received transmission signal.

In the above-described receiver, the interference removal unit may include: a delay unit operable to generate delayed equalized data by performing delay processing on the equalized data corresponding to one symbol; a difference unit operable to generate difference equalized data indicating a subtraction result by subtracting the equalized data corresponding to the one symbol from the delayed equalized data; a first upsample unit operable to generate first difference equalized data having a discrete frequency interval of $1/(N \times Tu)$ by performing upsample processing on the difference equalized data, where N is a number greater than 1, and Tu represents a duration of a useful symbol period; a second upsample unit operable to generate first channel response data having the discrete frequency interval of $1/(N \times Tu)$ by performing upsample processing on the channel response data corresponding to the one symbol; a multiplication unit operable to generate difference demodulated data by multiplying the first difference equalized data by the first channel response data on the per-carrier basis; an extraction unit operable to extract a first interference component pertaining to intersymbol interference due to a delayed wave and intercarrier interference due to the delayed wave, from the difference demodulated data, by performing filter processing on the difference demodulated data based on a predetermined transfer function, and generate first interference data indicating the first interference component; an interference component generation unit operable to generate the interference data indicating the interference component by performing downsample processing on the first interference data; and a removal unit operable to subtract the interference data from the demodulated data corresponding to the one symbol.

With the stated structure, the receiver shares some of the structural components for removing the interference components pertaining to the ISI and the ICI due to the delayed wave. Accordingly, the receiver is able to remove both of the interference components pertaining to the ISI due to the delayed wave and the interference components pertaining to the ICI due to the delayed wave while achieving a reduction in the circuit scale.

In the above-described receiver, the interference removal unit may further include a phase rotation unit operable to generate first equalized data by performing phase rotation processing on the equalized data corresponding to the one symbol on the per-carrier basis, based on a duration of a guard interval period, wherein the difference unit generates the difference equalized data by subtracting the first equalized data, instead of the equalized data corresponding to the one symbol, from the delayed equalized data, and the interference component generation unit performs, on the first interference data, in addition to the downsample processing, phase rotation processing based on a value obtained by multiplying the duration of the guard interval period by −1, on the per-carrier basis.

With the stated structure, the receiver can remove the interference component from the demodulated data even in a case where a guard interval period has been added to each received transmission signal.

In the above-described receiver, the interference removal unit may further include: a first extraction unit operable to extract, from the difference demodulated data, a second interference component pertaining to intersymbol interference due to a preceding wave and intercarrier interference due to the preceding wave, by performing, on the difference demodulated data, filter processing based on a predetermined transfer function, and generate second interference data indicating the second interference component; a first interference component generation unit operable to generate third interference data indicating a third interference component pertaining to the intersymbol interference due to the preceding wave and the intercarrier interference due to the preceding wave; a first delay unit operable to perform delay processing on first demodulated data resultant from processing by the removal unit, and output first delayed demodulated data; and a first removal unit operable to add the first delayed demodulated data to the third interference data.

With the stated structure, the receiver is able to remove the interference components pertaining to ISI and ICI due to a preceding wave, from the demodulated data, which leads to a further improvement in reception quality.

In the above-described receiver, the interference removal unit may further include: a delay upsample unit operable to generate second channel response data having the discrete frequency interval of $1/(N \times Tu)$ by performing delay processing and upsample processing on the channel response data corresponding to the one symbol, and output the generated second channel response data; a first multiplication unit operable to generate first difference demodulated data by multiplying the first difference equalized data by the second channel response data on the per-carrier basis; a first extraction unit operable to extract, from the first difference demodulated data, a second interference component pertaining to intersymbol interference due to a preceding wave and intercarrier interference due to the preceding wave, by performing, on the first difference demodulated data, filter processing based on a predetermined transfer function, and generate second interference data indicating the second interference component, a first interference component generation unit operable to generate third interference data indicating a third interference component pertaining to the intersymbol interference due to the preceding wave and the intercarrier interference due to the preceding wave, a first delay unit operable to perform delay processing on first demodulated data resultant from processing by the removal unit, and output first delayed demodulated data; and a first removal unit operable to add the first delayed demodulated data to the third interference data.

With the stated structure, the receiver is able to remove the interference components pertaining to ISI and ICI due to a preceding wave, from the demodulated data while suppressing effects due to frequency deviation between transmission stations or channel variance, or the like, which leads to a further improvement in the reception quality.

In the above-described receiver, the interference removal unit may include: a division unit operable to generate first equalized data by dividing supplied first delayed demodulated data by the channel response data corresponding to one symbol; an interference component generation unit operable to (i) calculate a first interference component pertaining to intersymbol interference due to a delayed wave based on the first equalized data and the channel response data corresponding to the one symbol, (ii) calculate a second interference component pertaining to intercarrier interference due to the delayed wave based on the equalized data corresponding to the one symbol and the channel response data corresponding to the one symbol, and (iii) generate the interference data by calculating the interference component, by subtracting the second interference component from the first interference component; a subtraction unit operable to subtract the interference data from the demodulated data corresponding to the one symbol and output first demodulated data; and a delay unit operable to perform processing on the first demodulated data and supply the delayed first demodulated data for a next symbol, to the division unit.

With the stated structure, the receiver is able to perform removal processing of ISI due to a delayed wave using the demodulated data in the preceding symbol, from which the interference components pertaining to ISI and ICI have been removed. As a result, a further improvement in the reception quality can be achieved.

In the above-described receiver, the interference removal unit may transform the equalized data in the frequency domain into an equalized signal in the time domain, transform the channel response data in the frequency domain into a channel signal in the time domain, calculate an interference signal indicating the interference component based on the equalized signal and the channel signal, and perform removal processing of the interference component on the demodulated data based on the interference signal.

With the stated structure, the receiver is able to calculate an interference signal indicating interference components in the time domain when performing the removal processing of the interference components.

The above-described receiver may further comprise a selection unit operable to compare a reception quality of the demodulated data and a reception quality of first demodulated data obtained as a result of the removal processing by the interference removal unit, and outputs one of the demodulated data and the first demodulated data that has a better reception quality.

With the stated structure, in a case where removal of the interference components leads to deterioration of the reception quality of the first demodulated data, the receiver selects the demodulated data, from which no interference component has been removed. As a result, the deterioration caused by the interference removal can be avoided.

In the above-described receiver, the interference removal unit may perform the removal processing by performing hard decision processing on the equalized data.

With the stated structure, the receiver is able to reduce the estimation error of the equalized data, thereby achieving a further improvement in the reception quality.

The above-described receiver may include a processing block that is composed of the equalization unit and the interference removal unit which are cascade-connected in series.

With the stated structure, the receiver repeats the interference removal processing multiple times, thereby achieving a further improvement in the reception quality.

Another aspect of the present invention is a receiver that receives transmission signals, which have been generated by multiplexing a plurality of modulated carriers, and demodulates the received transmission signals, the receiver comprising: a transform unit operable to transform, for each symbol, received transmission signals corresponding to the symbol in a time domain into demodulated data in a frequency domain; a division unit operable to generate, for each symbol, equalized data by dividing the demodulated data by supplied delay channel response data; an interference removal unit operable to generate, for each symbol, first demodulated data by calculating interference data indicating an interference component pertaining to at least one of intersymbol interference and intercarrier interference, based on the equalized data and the supplied delay channel response data, and performing, on the demodulated data, removal processing of the interference component based on the interference data; an equalization unit operable to estimate channel response data in the frequency domain based on the first demodulated data, and calculate equalized data in the frequency domain by equalizing the demodulated data based on the estimated channel response data; and a delay unit operable to perform delay processing on the channel response data and supply the delayed channel response data for a next symbol to the division unit and the interference removal unit.

With the stated structure, the interference components in the frequency domain are calculated and removed after the transmission signals in the time domain are transformed to the demodulated data in the frequency domain by the transform unit. Consequently, the reception quality improves as a result of removing the effects of the ISI and the ICI while suppressing an increase in the circuit scale. Also, the channel response data is estimated using the first demodulated data which has been generated by performing the removal processing of the interference component; and first demodulated data are generated by performing the removal processing of the interference components on the demodulated based on the interference data which has been calculated with the estimated channel response data fed back. Accordingly, an effect of repeatedly removing interference components is achieved for the channel response vectors, whereby the reception quality is improved.

Yet another aspect of the present invention is a receiver that receives transmission signals, which have been generated by multiplexing a plurality of modulated carriers, and demodulates the received transmission signals, the receiver comprising: a transform unit operable to transform, for each symbol, received transmission signals corresponding to the symbol in a time domain into demodulated data in a frequency domain; a first interference removal unit operable to generate, for each symbol, first demodulated data by subtracting supplied delay interference data indicating an interference component pertaining to intersymbol interference due to a delayed wave, from the demodulated data; an equalization unit operable to estimate channel response data in the frequency domain based on the first demodulated data, and calculate equalized data in the frequency domain by equalizing the demodulated data based on the estimated channel response data; a second interference removal unit operable to, for each symbol, calculate an interference component pertaining to intersymbol interference due to the delayed wave based on the equalized data and the channel response data, generate interference data indicating the interference component, and perform interference removal processing on the first demodulated data; and a delay unit operable to perform delay processing on the interference data and supply the delayed interference data for a next symbol to the first interference removal unit.

With the stated structure, the interference components in the frequency domain are calculated and removed after the transmission signals in the time domain are transformed to the demodulated data in the frequency domain by the transform unit. Consequently, the reception quality improves as a result of removing the effects of the ISI and the ICI while suppressing an increase in the circuit scale.

BRIEF DESCRIPTION OF DRAWINGS

FIG. 4(a)-(g) is a diagram for explaining processing performed by the receiver 1 shown in FIG. 3.

FIG. 8A is a diagram for explaining a passband of a filter of an extraction unit 57 shown in FIG. 6; and FIG. 8B is a diagram for explaining a passband of a filter of an extraction unit 84 shown in FIG. 14.

FIG. 10(a)-(n) is a diagram for explaining processing performed by the interference removal unit 15a.

Figure 1:
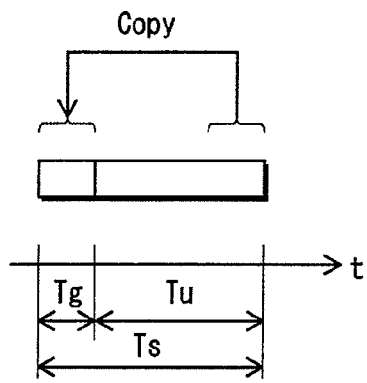
FIG. 1 schematically shows an OFDM transmission signal.

REFERENCE SIGNS LIST 1 receiver
11 antenna
12 tuner
13 OFDM demodulation unit
14 equalization unit
15 interference removal unit
16 equalization unit
17 decoding unit
51 delay unit
52, 54, 55 upsampling unit
53 phase rotation unit
56, 60 multiplication unit
57, 61 extraction unit
58, 62 downsampling unit
59, 63 phase rotation unit
64, 65 subtraction unit

DESCRIPTION OF EMBODIMENTS

First Embodiment

The following describes a first embodiment of the present invention with reference to the drawings. Note that each of the present embodiment and subsequent embodiments (described later) describes, as an example, a receiver that receives OFDM transmission signals generated and wirelessly transmitted according to the OFDM transmission method. Note that the OFDM transmission method is one of multi-carrier transmission methods, and is or will be applied to a wide range of products such as terrestrial digital broadcasting (DVB-T/H, ISDB-T, etc.), wireless LAN (IEEE802.11a/g, etc.), Wi-MAX (IEEE802.16), next-generation mobile communication, and the like.

<Outline of OFDM Transmission Signals>

Before describing a structure and operations of a receiver 1 of the present embodiment, an outline of OFDM transmission signals used in the OFDM transmission method is described with reference to FIG. 1. FIG. 1 schematically shows an OFDM transmission signal corresponding to one symbol. The horizontal axis in FIG. 1 represents time.

Ts represents the duration of one symbol, and the duration Ts is referred to as a "symbol period". The symbol period Ts is constituted from a duration Tu referred to as a "useful symbol period" and a duration Tg referred to as a "guard interval period".

OFDM transmission signals are signals that include a plurality of digitally modulated carriers multiplexed therein on a per-symbol basis. The frequencies of the carriers form a relationship of being orthogonal to one another in the useful symbol period Tu. According to this relationship, a frequency interval of any two carriers is an integral multiple of an inverse of the useful symbol period Tu, i.e. the inverse is denoted by (1/Tu). Accordingly, in this case, each OFDM transmission signal is a signal having a periodicity in the useful symbol period Tu. The portion of the OFDM transmission signal transmitted in the guard interval period Tg is a duplicate of an end portion of the OFDM transmission signal transmitted in the duration Tg of the useful symbol period Tu. The portion of the OFDM transmission signal transmitted in the guard interval period Tg is called a Cyclic Prefix.

Even in a case where multiple incoming waves arrive at the receiver at different times due to multi-path propagation, SFN, or the like, if the arrival time differences are within the guard interval period Tg, occurrence of ISI can be prevented with the effect of the guard interval. In addition, the effect of the Cyclic Prefix allows the carriers in the same symbol to maintain orthogonality to one another, thereby preventing occurrence of ICI. However, in a case where an arrival time difference between incoming waves exceeds the guard interval period Tg, ISI and ICI will occur.

Note that hereinafter, the following terms are used when appropriate: a "dominant wave" for the incoming wave with the highest reception level; a "preceding wave" for an incoming wave that arrives earlier than the dominant wave; and a "delayed wave" for an incoming wave which arrives later than the dominant wave.

<Outline of ISI and ICI Due to Delayed Wave>

The following describes an outline of ISI and ICI due to a delayed wave, using an example case in which one delayed wave arrives at the receiver later than the dominant wave by a time that exceeds the guard interval period Tg, with reference to FIG. 2(a)-(g). FIG. 2(a)-(g) is a diagram for explaining the outline of ISI and ICI due to delayed waves. In each of FIG. 2(a)-(g), the horizontal axis represents time.

Figure 2:
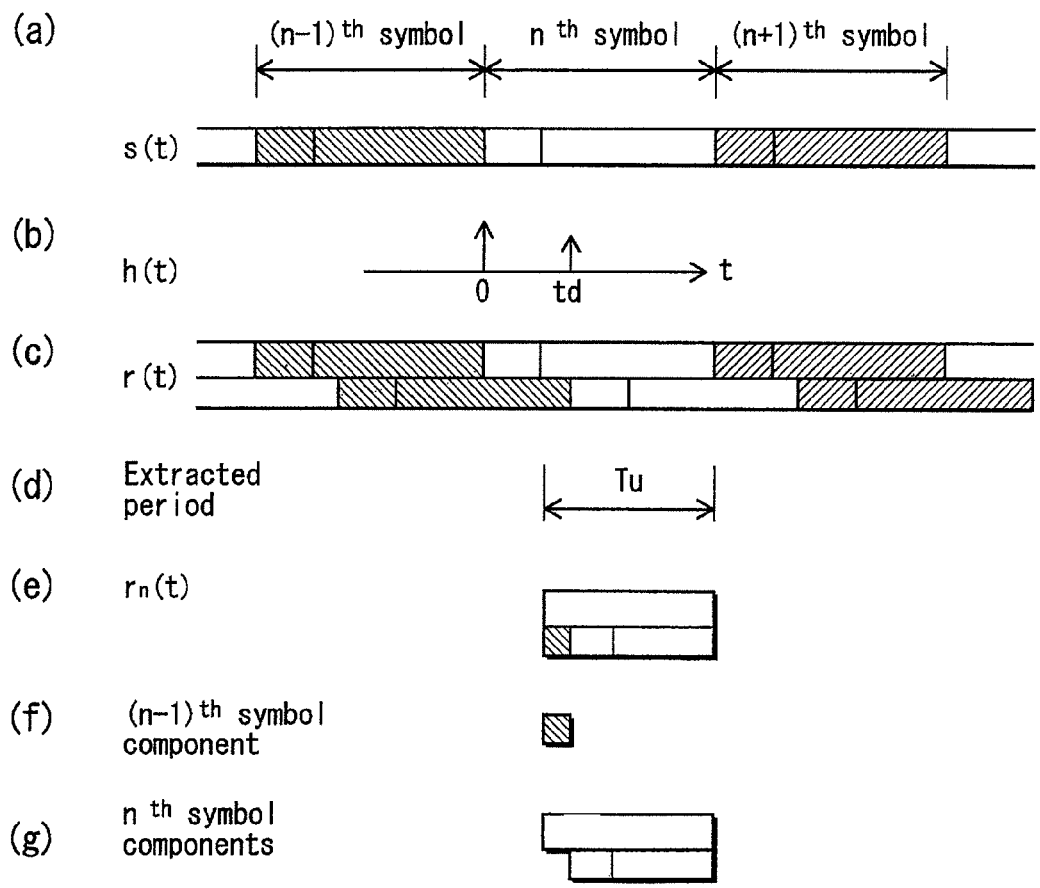
FIG. 2(a)-(g) is a diagram for explaining an outline of ISI and ICI due to a delayed wave.

FIG. 2(a) schematically shows consecutively transmitted OFDM transmission signals s(t) corresponding to a plurality of symbols, and in this case, it is assumed that the transmission station consecutively transmits OFDM transmission signals corresponding to symbols. Here, the explanation is given with focus on the $n^{th}$ symbol. Note that in FIG. 2(a), in order to distinguish an OFDM transmission signal $S_n(t)$ in the focused $n^{th}$ symbol from an OFDM transmission signal $S_{(n-1)}(t)$ in an adjacent $(n-1)^{th}$ symbol and an OFDM transmission signal $S_{(n+1)}(t)$ in an adjacent $(n+1)^{th}$ symbol, the OFDM transmission signal $S_{(n-1)}(t)$ in the adjacent $(n-1)^{th}$ symbol is hatched with backward diagonal lines (diagonal lines from top left to bottom right), and the OFDM transmission signal $S_{(n+1)}(t)$ in the adjacent $(n+1)^{th}$ symbol is hatched with forward diagonal lines (diagonal lines from bottom left to top right).

FIG. 2(b) schematically shows a channel response signal h(t) indicating a channel response, and the channel response signal h(t) is expressed using a relative time difference between the incoming waves which arrive at the receiver, and the reception levels of these incoming waves. The channel response signal h(t) shown in FIG. 2(b) is also called a delay profile. The channel response signal h(t) shown as an example in FIG. 2(b) indicates the following case: two incoming waves arrive at the receiver; an arrival time t of the incoming wave which arrives first and whose reception level is higher (dominant wave) is assumed to be "0" (t=0); and the incoming wave which arrives second (delayed wave) is delayed from the dominant wave by a period of time td. Note that here, the time difference td between the arrival times of these incoming waves is greater than the guard interval period Tg.

FIG. 2(c) schematically shows OFDM transmission signals r(t) received by the receiver. While the first-arriving incoming wave (dominant wave) and the second-arriving incoming wave whose arrival was delayed from the dominant wave by the time td (delayed wave) are shown on top of each other as the upper part and the lower part, respectively, additive convolution has been performed on these incoming waves are in an additively convoluted state when received. Note that FIGS. 2(e) and (g) show the incoming waves in a similar manner. In FIG. 2(c), signal components from the OFDM transmission signal $s_{(n-1)}(t)$ are hatched with backward diagonal lines, and signal components from the OFDM transmission signal $s_{(n+1)}(t)$ are hatched with forward diagonal lines. FIGS. 2(e) and (f) are hatched in a similar manner.

The receiver that receives the OFDM transmission signals extracts, for each symbol, an OFDM transmission signal part having the duration Tu of the useful symbol period from the received OFDM transmission signals r(t) and demodulates the extracted OFDM transmission signal part. In the $n^{th}$ symbol, the receiver extracts an OFDM transmission signal part $r_n(t)$, shown in FIG. 2(e), having the duration Tu of the useful symbol period shown in FIG. 2(d), from the OFDM transmission signals r(t) shown in FIG. 2(c).

FIG. 2(f) shows a signal component from the OFDM transmission signal $s_{(n-1)}(t)$ in the $(n-1)^{th}$ symbol, included in the OFDM transmission signal part $r_n(t)$ shown in FIG. 2(e). This signal component from the OFDM transmission signal $s_{(n-1)}(t)$ in the $(n-1)^{th}$ symbol is the interference component pertaining to ISI due to the delayed wave in the OFDM transmission signal part $r_n(t)$ in the $n^{th}$ symbol. The interference component pertaining to ISI due to the delayed wave in the OFDM transmission signal part $r_n(t)$ in the $n^{th}$ symbol is a signal component having a period (td−Tg) at the end of the delayed wave related to the OFDM transmission signal $s_{(n-1)}(t)$ in the $(n-1)^{th}$ symbol.

FIG. 2(g) shows signal components from the OFDM transmission part $s_n(t)$ in the $n^{th}$ symbol, included in the OFDM transmission signal part $r_n(t)$ shown in FIG. 2(e). As FIG. 2(g) shows, in the delayed wave, the duration of the signal components from the OFDM transmission signal $s_n(t)$ in the $n^{th}$ symbol included in the OFDM transmission signal part $r_n(t)$ is shorter than the duration Tu of the useful symbol period. Because the duration of the signal components of this delayed wave is shorter than the duration Tu of the useful symbol period, the carriers constituting the OFDM transmission signal part $r_n(t)$ cannot maintain their orthogonality, causing ICI when each carrier is demodulated. The signal component missing from the signal components of the delayed wave corresponding to the OFDM transmission signal $s_n(t)$ in the $n^{th}$ symbol is the interference component pertaining to ICI due to the delayed wave in the OFDM transmission signal part $r_n(t)$ in the $n^{th}$ symbol. The interference component pertaining to ICI due to the delayed wave in the OFDM transmission signal part $r_n(t)$ in the $n^{th}$ symbol is a signal component of a period (td−Tg) starting from a temporal position that precedes, by the time td, the end of the delayed wave related to the OFDM transmission signal $s_n(t)$ in the $n^{th}$ symbol.

<Structure and Operations of Receiver 1>

Figure 3:
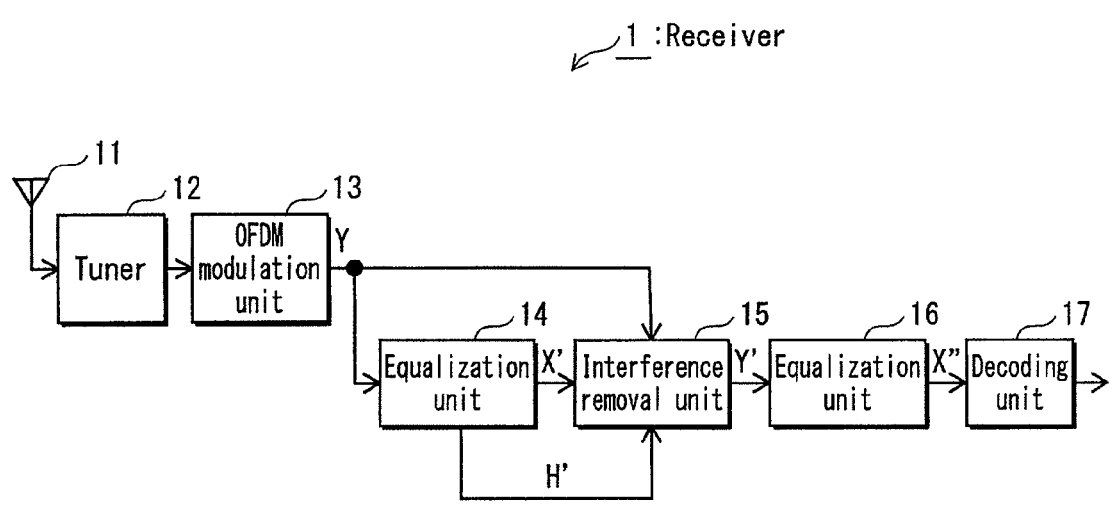
FIG. 3 shows a structure of a receiver 1 of a first embodiment.

The following describes the structure and the operations of the receiver 1 of the present embodiment with reference to FIGS. 3 and 4(a)-(g). FIG. 3 shows the structure of the receiver 1 of the present embodiment, and FIG. 4(a)-(g) is a diagram for explaining processing by the receiver 1 shown in FIG. 3.

The receiver 1 includes an antenna 11, a tuner 12, an OFDM demodulation unit 13, an equalization unit 14, an interference removal unit 15, an equalization unit 16, and a decoding unit 17.

The antenna 11 receives OFDM transmission signals transmitted from a transmission station (not shown), and supplies the received OFDM transmission signals to the tuner 12. The tuner 12 selects OFDM transmission signals r(t) of a desired channel from the OFDM transmission signals supplied from the antenna 11, and outputs the selected OFDM transmission signals r(t) to the OFDM demodulation unit 13.

FIG. 4(a) schematically shows an OFDM transmission signals s(t) transmitted from the transmission station. FIG. 4(b) schematically shows a channel response signal h(t). FIG. 4(c) schematically shows the OFDM transmission signals r(t) which were received and selected by the receiver 1.

Note that $X_{(n-1)}$, $X_n$, and $X_{(n+1)}$ in FIG. 4(a) indicate modulation vectors of modulated carriers in the $(n-1)^{th}$, $n^{th}$, and $(n+1)^{th}$ symbols, respectively. An OFDM transmission signal $s_{(n-1)}(t)$ in the $(n-1)^{th}$ symbol is hatched with backward diagonal lines, and an OFDM transmission signal $s_{(n+1)}(t)$ in the $(n+1)^{th}$ symbol is hatched with forward diagonal lines. In FIG. 4(c), signal components from the OFDM transmission signal $s_{(n-1)}(t)$ are hatched with backward diagonal lines, while signal components from the OFDM transmission signal $s_{(n+1)}(t)$ are hatched with forward diagonal lines.

The OFDM demodulation unit 13 extracts, for each symbol, an OFDM transmission signal part having the duration Tu of the useful symbol period as shown in FIG. 4(d), from the OFDM transmission signals r(t), shown in FIG. 4(c), supplied from the tuner 12, in accordance with a symbol synchronization signal generated by a symbol synchronization unit (not shown). Following that, the OFDM demodulation unit 13 performs discrete Fourier transform on each extracted OFDM transmission signal part. The OFDM demodulation unit 13 then supplies demodulation vectors Y in the frequency domain resultant from the discrete Fourier transform, to the equalization unit 14 and the interference removal unit 15. Note that discrete Fourier transform can be calculated at a high speed with use of Fast Fourier Transform. FIG. 4(e) schematically shows, as signals in the time domain, the demodulation vectors Y in the frequency domain output from the OFDM demodulation unit 13. Note that the signs $Y_{(n-1)}$, $Y_n$, and $Y_{(n+1)}$ in FIG. 4(e) respectively indicate demodulation vectors Y in the $(n-1)^{th}$, $n^{th}$, and $(n+1)^{th}$ symbols output by the OFDM demodulation unit 13. Here, signal components from the OFDM transmission signal $s_{(n-1)}(t)$ are hatched with backward diagonal lines, while signal components from the OFDM transmission signal $s_{(n+1)}(t)$ are hatched with forward diagonal lines.

The above-described structures of the antenna 11, the tuner 12, and the OFDM demodulation unit 13 are similar to those adopted by a receiver that receives an ordinary OFDM transmission signal, and accordingly, no further explanation is provided.

Note that although processing by the respective components after the processing by the OFDM demodulation unit 13 are performed in the frequency domain, the explanation is given using signals in the time domain when appropriate, for the sake of conciseness.

The equalization unit 14 estimates channel response vectors H' based on the demodulation vectors Y supplied from the OFDM demodulation unit 13, calculates equalization vectors X' by equalizing the demodulation vectors Y based on the estimated channel response vectors H', and supplies the channel response vectors H' and the equalization vectors X' to the interference removal unit 15. FIG. 4(f) schematically shows, as signals in the time domain, the channel response vectors X' in the frequency domain output from the equalization unit 14. FIG. 4(g) schematically shows, as signals in the time domain, the equalization vectors X' in the frequency domain output from the equalization 14. Note that $H'_{(n-1)}$, $H'_n$, and $H'_{(n+1)}$ in FIG. 4(f) respectively indicate channel response vectors H' in the $(n-1)^{th}$, $n^{th}$, and $(n+1)^{th}$ symbols output from the equalization unit 14. Note also that $X'_{(n-1)}$, $X'_n$, and $X'_{(n+1)}$ in FIG. 4(g) respectively indicate channel response vectors X' in the $(n-1)^{th}$, $n^{th}$, and $(n+1)^{th}$ symbols output from the equalization unit 14. Here, the equalization vectors $X'_{(n-1)}$ in the $(n-1)^{th}$ signal are hatched with backward diagonal lines, while the equalization vectors $X'_{(n+1)}$ in the $(n+1)^{th}$ symbol are hatched with forward diagonal lines.

The equalization vectors X' output from the equalization unit 14 are reproduction of the modulation vectors X which have been modulated by the transmitter, by means of such as channel equalization processing. However, in an environment where there is a delayed wave whose delay time exceeds the guard interval period Tg, the equalization vectors X' output from the equalization unit 14 include interference components pertaining to ISI and ICI due to the delayed wave, with respect to the modulation vectors X.

The interference removal unit 15, with use of the channel response vectors H' and the equalization vectors X' supplied from the equalization unit 14, calculates the following: interference vectors indicating interference components, which pertain to ISI due to the delayed wave, included in the demodulation vectors Y supplied from the OFDM demodulation unit 13; and interference vectors indicating interference components, which pertain to ICI due to the delayed wave, missing from the demodulation vectors Y. After that, the interference removal unit 15 performs the following processing on the demodulation vectors Y: subtracting, from the demodulation vectors Y, the interference vectors indicating the interference components pertaining to ISI due to the delayed wave; and adding, to the demodulation vectors Y, the interference vectors indicating the interference components pertaining to ICI due to the delayed wave. Following that, the interference removal unit 15 supplies demodulation vectors Y' resultant from these processing to the equalization unit 16.

The equalization unit 16 estimates channel response vectors H" based on the demodulation vectors Y' supplied from the interference removal unit 15, calculates equalization vectors X" by equalizing the demodulation vectors Y' based on the estimated channel response vectors H", and supplies the equalization vectors X" to the decoding unit 17. The decoding unit 17 judges the transmitted information by performing the following and outputs the judged information: judging the modulation vectors X by performing demapping processing on the equalization vectors X"; and performing decode processing such as error correction on the judgement result.

[Structure and Operations of Equalization Unit 14]

Figure 5:
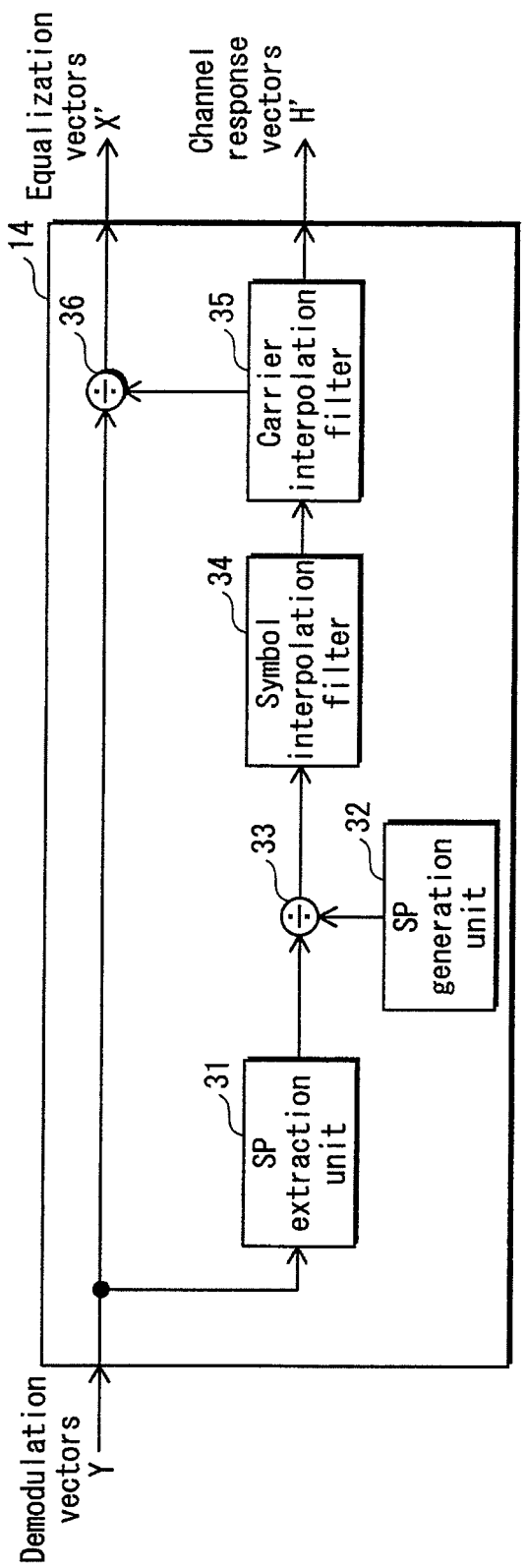
FIG. 5 shows a structure of an equalization unit 14 shown in FIG. 3.

The following describes a structure and operations of the equalization unit 14 shown in FIG. 3, with reference to FIG. 5. FIG. 5 shows the structure of the equalization unit 14 shown in FIG. 3. Note that the structure of the equalization unit 14 is a known structure which is generally used for channel equalization in terrestrial digital broadcasting. Note that a structure which is substantially the same as the structure shown in FIG. 5 can be applied to the equalization unit 16 shown in FIG. 3.

The equalization unit 14 includes an SP extraction unit 31, an SP generation unit 32, a division unit 33, a symbol interpolation filter 34, a carrier interpolation filter 35, and a division unit 36.

The demodulation vectors Y output from the OFDM demodulation unit 13 are supplied to the SP extraction unit 31 and the division unit 36 in the equalization unit 14. Note that, of (N1, N2) attached to each vector in the explanation on the equalization unit 14, N1 denotes a symbol number and N2 denotes a carrier number.

The SP extraction unit 31 extracts, from the demodulation vectors Y (n, k) supplied from the OFDM demodulation unit 13, a demodulation vector Y (n, $k_{sp}(n)$) corresponding to a scattered pilot, and supplies the extracted demodulation vector Y (n, $k_{sp}(n)$) to the division unit 33. Note that $k_{sp}(n)$ denotes a carrier number of a carrier corresponding to one of a plurality of scattered pilots in a symbol having a symbol number n. The SP generation unit 32 generates a reference vector SP (n, $k_{sp}(n)$) whose amplitude and phase are same as those of a corresponding modulation vector X (n, $k_{sp}(n)$), and supplies the generated reference vector SP (n, $k_{sp}(n)$) to the division unit 33. The division unit 33 divides the demodulation vector Y (n, $k_{sp}(n)$) supplied from the SP extraction unit 31 by the corresponding reference vector SP (n, $k_{sp}(n)$) supplied from the SP generation unit 32 and supplies the division result as a channel response vector H' (n, $k_{sp}(n)$) to the symbol interpolation filter 34.

The symbol interpolation filter 34 performs interpolation processing in the symbol direction on a symbol-carrier plane using the channel response vector H' (n, $k_{sp}(n)$) supplied from the division unit 33, and the carrier interpolation filter 35 performs interpolation processing in the carrier direction on the symbol-carrier plane using the result of the interpolation processing in the symbol direction by the symbol interpolation filter 34. The carrier interpolation filter 35 supplies channel response vector H' (n,k) resultant from the interpolation processing in the carrier direction, to the division unit 36 and the interference removal unit 15. Note that the channel response vectors H' output from the carrier interpolation filter 35 are channel response vectors that correspond one-to-one with the carriers in the symbols.

The division unit 36 divides the demodulation vector Y (n,k) supplied from the OFDM demodulation unit 13 by the channel response vector H' (n,k) supplied from the carrier interpolation filter 35, and supplies the division result as an equalization vector X' (n,k) to the interference removal unit 15. Note that the equalization vectors X' output from the division unit 36 are equalization vectors that correspond one-to-one with the carriers in the symbols.

[Structure and Operations of Interference Removal Unit 15]

Figure 6:
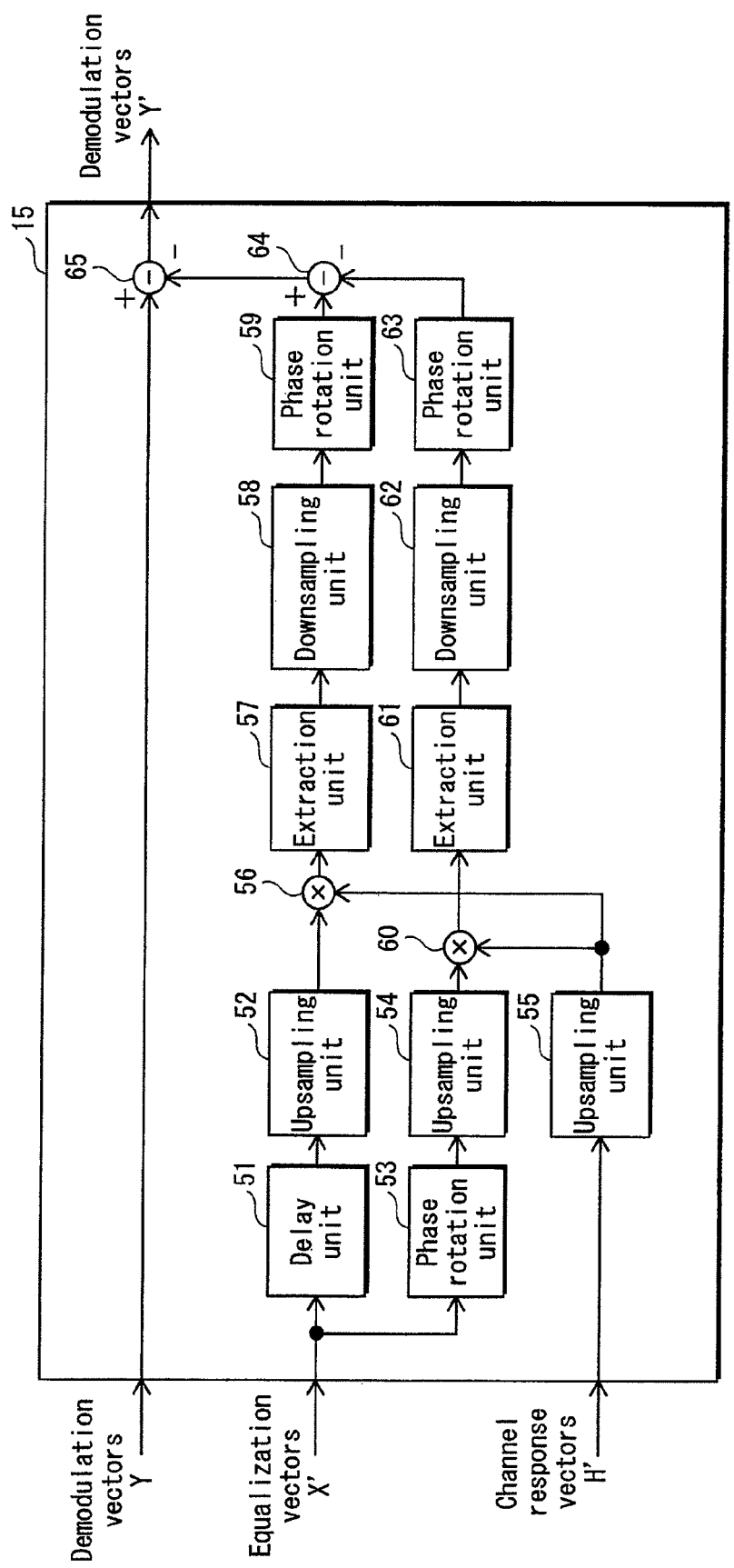
FIG. 6 shows a structure of an interference removal unit 15 shown in FIG. 3.
Figure 7:
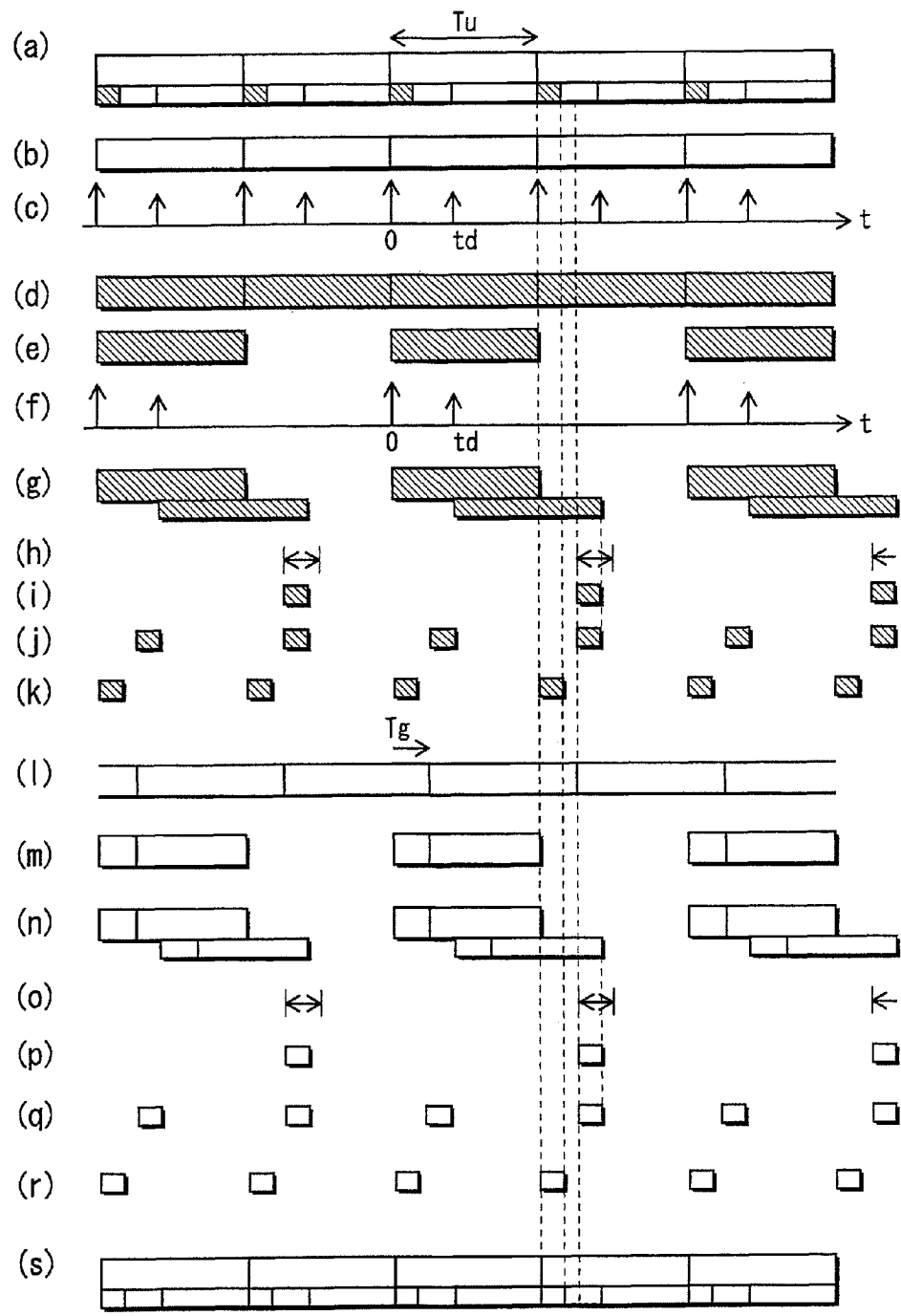
FIG. 7(a)-(s) is a diagram for explaining processing performed by the interference removal unit 15 shown in FIG. 6.

The following describes the structure and the operations of the interference removal unit 15 shown in FIG. 3, with reference to FIGS. 6 and 7(a)-(s). FIG. 6 shows the structure of the interference removal unit 15 shown in FIG. 3, and FIG. 7(a)-(s) is a diagram for explaining processing performed by the interference removal unit 15 shown in FIG. 6.

The interference removal unit 15 includes a delay unit 51, an upsampling unit 52, a phase rotation unit 53, an upsampling unit 54, an upsampling unit 55, a multiplication unit 56, an extraction unit 57, a downsampling unit 58, a phase rotation unit 59, a multiplication unit 60, an extraction unit 61, a downsampling unit 62, a phase rotation unit 63, a subtraction unit 64, and a subtraction unit 65.

The demodulation vectors Y output from the OFDM demodulation unit 13 are supplied to the subtraction unit 65 in the interference removal unit 15. The equalization vectors X' output from the equalization unit 14 are supplied to the delay unit 51 and the phase rotation unit 53 in the interference removal unit 15, and the channel response vectors H' output from the equalization unit 14 are supplied to the upsampling unit 55 in the interference removal unit 15. FIG. 7(a) schematically shows, as a signal in the time domain, the demodulation vectors $Y_n$ in the frequency domain in the $n^{th}$ symbol output by the OFDM demodulation unit 13. Signal components from the OFDM transmission signal $s_{(n-1)}(t)$ in the $(n-1)^{th}$ symbol are hatched with backward diagonal lines. FIG. 7(b) schematically shows, as a signal in the time domain, the equalization vectors $X'_n$ in the frequency domain in the $n^{th}$ symbol output by the equalization unit 14. FIG. 7(c) schematically shows, as a signal in the time domain, the channel response vectors $H'_n$ in the frequency domain output from the equalization unit 14 in the $n^{th}$ symbol.

For each of the discrete frequencies of the carriers used in the OFDM transmission, a demodulation vector $Y_n$, an equalization vector $X'_n$, and a channel response vector $H'_n$ are obtained. The frequencies of the carriers used in the OFDM transmission are each a discrete frequency with an interval of (1/Tu), where Tu denotes the duration of the useful symbol period. Accordingly, when expressed as a signal in the time domain, the demodulation vectors $Y_n$, the equalization vectors $X'_n$, and the channel response vectors $H'_n$ in the frequency domain are each represented by a periodic signal with a periodicity of the duration Tu of the useful symbol period, as shown in FIGS. 7(a), (b), and (c).

The following describes the structure and the operations of the interference removal unit 15 in three parts as follows: calculation of the interference components pertaining to ISI due to a delayed wave (hereinafter, referred to as "delayed wave ISI components"); calculation of the interference components pertaining to ICI due to the delayed wave (hereinafter, referred to as "delayed wave ICI components"); and interference removal processing of removing the delayed wave ISI components and the delayed wave ICI components from the demodulation vectors. The processing of removing the interference components pertaining to ISI due to the delayed wave or a preceding wave (described later) is processing of subtracting those interference components from the demodulation vectors; and the processing of removing the interference components pertaining to ICI due to the delayed wave or the preceding wave is processing of adding those interference components to the demodulation vectors. Note that the explanation is provided on, as an example, processing by the respective units in the interference removal unit 15 when the demodulation vectors $Y_n$, the equalization vectors $X'_n$, and the channel response vectors $H'_n$ corresponding to the $n^{th}$ symbol are supplied to the interference removal unit 15.

(Calculation of Delayed Wave ISI Components)

The delay unit 51 delays the equalization vectors X' supplied from the equalization unit 14 by a period of time equivalent to a processing period of one symbol, i.e. delaying it by one symbol, and outputs the delayed equalization vectors X'. As a result, when the demodulation vectors $Y_n$, the equalization vectors $X'_n$, and the channel response vectors $H'_n$ corresponding to the $n^{th}$ symbol are supplied to the interference removal unit 15 and are to be processed by the interference removal unit 15, equalization vectors $X'_{(n-1)}$ corresponding to the $(n-1)^{th}$ symbol are supplied to the upsampling unit 52 from the delay unit 51. FIG. 7(d) schematically shows, as a signal in the time domain, the equalization vectors $X'_{(n-1)}$ in the frequency domain output by the delay unit 51. Note that in FIGS. 7(d), (e), (g), (i), (j), and (k), signal components are hatched with backward diagonal lines to indicate that they pertain to the equalization vectors $X'_{(n-1)}$.

The upsampling unit 52 upsamples the equalization vectors $X'_{(n-1)}$ supplied from the addition unit 51 by a factor of 2, and supplies equalization vectors $X'^2_{(n-1)}$ resultant from the upsampling to the multiplication unit 56. FIG. 7(e) schematically shows, as a signal in the time domain, the equalization vectors $X'^2_{(n-1)}$ in the frequency domain output by the upsampling unit 52. Because the equalization vectors $X'^2_{(n-1)}$ are generated by upsampling the equalization vectors $X'_{(n-1)}$ having the discrete frequency interval of 1/Tu by the factor of 2, the discrete frequency interval of the equalization vectors $X'^2_{(n-1)}$ is 1/(2×Tu). As shown in FIG. 7(e), when expressed as a signal in the time domain, the equalization vectors $X'^2_{(n-1)}$ in the frequency domain are represented by a periodic signal with a periodicity of twice the duration Tu of the useful symbol period.

Upsampling by the factor of 2 can be realized, for example, by inserting "0" between each two adjacent carriers with respect to the equalization vectors $X'_{(n-1)}$ and makes the resultant equalization vectors $X'_{(n-1)}$ pass through a half-band filter generated with an FIR (Finite Impulse Response) filter. Upsampling by a factor of 2 by other components can be realized in a similar manner. Note that since upsampling is a known technique, no further detailed explanation will be given.

The upsampling unit 55 upsamples the channel response vectors $H'_n$ corresponding to the $n^{th}$ symbol supplied from the equalization unit 14 by a factor of 2, and supplies channel response vectors $H'^2_n$ resultant from the upsampling to the multiplication unit 56. FIG. 7(f) schematically shows, as a signal in the time domain, the channel response vectors $H'^2_n$ in the frequency domain output by the upsampling unit 55. Because the channel response vectors $H'^2_n$ are generated by upsampling the channel response vectors $H'_n$ having the discrete frequency interval of 1/Tu by the factor of 2, the discrete frequency interval of the channel response vectors $H'^2_n$ is 1/(2×Tu). As shown in FIG. 7(f), when expressed as a signal in the time domain, the channel response vectors $H'^2_n$ in the frequency domain are represented by a periodic signal with a periodicity of twice the duration Tu of the useful symbol period.

The multiplication unit 56 multiplies, on a per-carrier basis, the equalization vectors $X'^2_{(n-1)}$ supplied from the upsampling unit 52 by the channel response vectors $H'^2_n$ supplied from the upsampling unit 55, and supplies demodulation vectors $Y1'^2_{(n-1)}$ resultant from the multiplication to the extraction unit 57. FIG. 7(g) schematically shows, as a signal in the time domain, the demodulation vectors $Y1'^2_{(n-1)}$ in the frequency domain output by the multiplication unit 56. The upper part of FIG. 7(g) shows signal components related to the dominant wave; the lower part of FIG. 7(g) shows signal components related to the delayed wave. The time domain signal shown in FIG. 7(g) is obtained by convolving the time domain signal shown in FIG. 7(e) and the time domain signal shown in FIG. 7(f).

As shown by FIG. 7(g), upsampling the equalization vectors $X'_{(n-1)}$ and the channel response vectors $H'_n$ by the factor of 2 and then multiplying these vectors prevents periodic components on the right and the left apart from each other by 2×Tu from interfering with each other when the delay time td of the delayed wave with respect to the dominant wave is within the duration Tu of the useful symbol period. As a result, the delayed wave ISI components included in the demodulation vectors $Y_n$ can be independently monitored using the demodulation vectors $Y1'^2_{(n-1)}$.

The extraction unit 57 is constituted from, for example, an FIR filter, and has a transfer function of a passband described below. The extraction unit 57 (i) extracts the delayed wave ISI components related to the demodulation vectors $Y_n$ from the demodulation vectors $Y1'^2_{(n-1)}$ supplied from the multiplication unit 56 by performing filter processing on the demodulation vectors $Y1'^2_{(n-1)}$, (ii) generates interference vectors $E1'^2_n$ indicating the extracted delayed wave ISI components, and (iii) supplies the generated interference vectors $E1'^2_n$ to the downsampling unit 58. The delayed wave ISI components extracted by the extraction unit 57 are, among signal components included in the demodulation vectors $Y1'^2_{(n-1)}$, signal components that belong to a period with a duration of (td−Tg) at the end of the delayed wave which was delayed by the time td from the dominant wave in the $(n-1)^{th}$ symbol and that are related to the delayed wave ISI components included in the demodulation vectors $Y'_n$. FIG. 7(h) is a schematic diagram showing the passband of the filter of the extraction unit 57 in the time domain. FIG. 7(i) schematically shows, as a signal in the time domain, the interference vectors $E1'^2_n$ in the frequency domain output by the extraction unit 57.

The following describes the passband of the filter of the extraction unit 57 with reference to FIG. 8A. FIG. 8A is a diagram for explaining the passband of the filter of the extraction unit 57 shown in FIG. 6, and shows the passband of the filter of the extraction unit 57 in the time domain. In FIG. 8A, Tu denotes the useful symbol period, Tg denotes the guard interval period, and the upsampling factor, i.e. the upsampling rate, is 2.

If the extraction unit 57 can extract signal components exceeding (Tu/Tg)/2, the interference components can be removed. Thus, when seen in the time domain, the left end of the passband of the filter needs to be set so as to be able to extract the signal components exceeding (Tu/Tg)/2. However, it is preferable to set the right end of the passband such that aliasing components are not included in the passband of the filter, since the aliasing components cause deterioration to the interference vectors $E1'^2_n$.

Note that since the extraction unit 57 performs signal processing in the frequency domain, a filter coefficient of the filter of the extraction unit 57 in the frequency domain can be determined based on the above description.

The downsampling unit 58 downsamples the interference vectors $E1'^2_n$ supplied from the extraction unit 57 by a factor of ½, and supplies interference vectors $E1'_n$ resultant from the downsampling to the phase rotation unit 59. FIG. 7(j) schematically shows, as a signal in the time domain, the interference vectors $E1'_n$ in the frequency domain output by the downsampling unit 58. As shown in FIG. 7(j), when expressed as a signal in the time domain, the interference vectors $E1'_n$ are represented by a periodic signal with a periodicity of the duration Tu of the useful symbol period.

The phase rotation unit 59 phase-rotates the interference vectors $E1'_n$ supplied from the downsampling unit 58 on the per-carrier basis to time shift the interference vectors $E1'_n$ by −Tg in the time domain, and supplies interference vectors $E1'^{rot}_n$ resultant from the phase rotation to the subtraction unit 64. FIG. 7(k) schematically shows, as a signal in the time domain, the interference vectors $E1'^{rot}_n$ in the frequency domain output by the phase rotation unit 59. As is apparent from FIGS. 7(a) and (k), temporal positions of the delayed wave ISI components included in the interference vectors $E1'^{rot}_n$ coincide with temporal positions of the delayed wave ISI components included in the demodulation vectors $Y_n$.

Note that the processing of phase-rotating the interference vectors $E1'_n$ to time shift the interference vectors $E1'_n$ by −Tg in the time domain on the per-carrier basis is processing of phase-rotating the interference vectors $E1'_n$ by $2\pi \times (-Tg/Tu) \times f$ in the frequency domain on the per-carrier basis in a case where the periodicity of the signal is Tu, i.e. the discrete frequency interval is 1/Tu, where f denotes the carrier number in the frequency domain (f being an integer equal to or greater than 0 and smaller than $N_{FFT}$, and $N_{FFT}$ being the number of samples of the discrete Fourier transform by the OFDM demodulation unit 13). Note that the same can be said for a case of phase-rotating other vectors so as to make the other vectors time shift by −Tg in the time domain on the per-carrier basis.

(Calculation of Delayed Wave ICI Components)

The phase rotation unit 53 phase-rotates the equalization vectors $X'_n$ corresponding to the $n^{th}$ symbol supplied by the equalization unit 14 on the per-carrier basis to time shift the equalization vectors $X'_n$ by Tg in the time domain, and supplies equalization vectors $X'^{rot}_n$ resultant from the phase rotation to the subtraction unit 64. FIG. 7(i) schematically shows, as a signal in the time domain, the equalization vectors $X'^{rot}_n$ in the frequency domain output by the phase rotation unit 53.

Note that the processing of phase-rotating the equalization vectors $X'_n$ to time shift the equalization vectors $X'_n$ by Tg in the time domain on the per-carrier basis is processing of phase-rotating the interference vectors $E1'_n$ by $2\pi \times (-Tg/Tu) \times f$ in the frequency domain on the per-carrier basis in a case where the periodicity of the signal is Tu, i.e. the discrete frequency interval is 1/Tu, where f denotes the carrier number in the frequency domain (f being an integer equal to or greater than 0 and smaller than $N_{FFT}$, and $N_{FFT}$ being the number of samples of the discrete Fourier transform by the OFDM demodulation unit 13). Note that the same can be said for a case of phase-rotating other vectors so as to make the other vectors time shift by Tg in the time domain on the per-carrier basis.

The upsampling unit 54 upsamples the equalization vectors $X'^{rot}_n$ supplied from the phase rotation unit 53 by a factor of 2, and supplies equalization vectors $X'^{rot2}_n$ resultant from the upsampling to the multiplication unit 60. FIG. 7(m) schematically shows, as a signal in the time domain, the equalization vectors $X'^{rot2}_n$ in the frequency domain output from the upsampling unit 54. Since the equalization vectors $X'^{rot2}_n$ are generated by upsampling the equalization vectors $X'^{rot}_n$ having the discrete frequency interval of 1/Tu by the factor of 2, the discrete frequency interval of the equalization vectors $X'^{rot2}_n$ is 1/(2×Tu). As shown in FIG. 7(m), when expressed as a signal in the time domain, the equalization vectors $X'^{rot2}_n$ in the frequency domain are represented by a periodic signal with a periodicity of twice the duration Tu of the useful symbol period.

The upsampling unit 55 upsamples the channel response vectors $H'_n$ corresponding to the $n^{th}$ symbol supplied from the equalization unit 14 by a factor of 2, and outputs the channel response vectors $H'^2_n$ resultant from the upsampling to the multiplication unit 60 (see FIG. 2(f)). Note that this processing is shared by the calculation of the delayed wave ISI components, and is not performed separately therefrom.

The multiplication unit 60 multiplies the equalization vector equalization vectors $X'^{rot2}_n$ supplied from the upsampling unit 54 and the channel response vector channel response vectors $H'^2_n$ supplied from the upsampling unit 55 on the per-carrier basis, and supplies demodulation vectors $Y2'^2_n$ resultant from the multiplication to the extraction unit 61. FIG. 7(n) schematically shows, as a signal in the time domain, the demodulation vectors $Y2'^2_n$ output by the multiplication unit 60. The upper part of FIG. 7(n) shows signal components related to the dominant wave, while the lower part of FIG. 7(n) shows signal components related to delayed wave. The time domain signal shown in FIG. 7(n) is obtained by convolving the time domain signal shown in FIG. 7(m) and the time domain signal shown in FIG. 7(f).

As shown by FIG. 7(n), upsampling the equalization vectors $X'^{rot2}_n$ and the channel response vectors $H'_n$ by the factor of 2 and then multiplying these vectors prevents periodic components on the right and the left apart from each other by 2×Tu from interfering with each other when the delay time td of the delayed wave with respect to the dominant wave is within the duration Tu of the useful symbol period. As a result, the delayed wave ISI components which are missing from the demodulation vectors $Y_n$ can be independently monitored using the demodulation vectors $Y2'^2_n$.

The extraction unit 61 is constituted from, for example, an FIR filter, and has the same transfer function of the passband as the extraction unit 57. The extraction unit 61 (i) extracts the delayed wave ICI components related to the demodulation vectors $Y_n$ from the demodulation vectors $Y2'^2_n$ supplied from the multiplication unit 60, by performing filter processing on the demodulation vectors $Y2'^2_n$, (ii) generates interference vectors $E2'^2_n$ indicating the extracted delayed wave ICI components, and (iii) supplies the generated interference vectors $E2'^2_n$ to the downsampling unit 62. The delayed wave ICI components extracted by the extraction unit 61 are, among signal components included in the demodulation vectors $Y2'^2_{(n-1)}$, signal components that belong to a period with a duration of (td−Tg) at the end of the delayed wave which was delayed by the time td from the dominant wave in the $(n-1)^{th}$ symbol, and that are related to the delayed wave ICI components missing from the demodulation vectors $Y'_n$. The extraction of these signal components is realized by phase-rotating the equalization vectors X', with the guard interval period taken into consideration. FIG. 7(o) is a schematic diagram showing the passband of the filter of the extraction unit 61 in the time domain. FIG. 7(p) schematically shows, as a signal in the time domain, the interference vectors $E2'^2_n$ in the frequency domain output by the extraction unit 61.

The downsampling unit 62 downsamples the interference vectors $E2'^2_n$ supplied from the extraction unit 61 by a factor of ½, and supplies interference vectors $E2'_n$ resultant from the downsampling to the phase rotation unit 63. FIG. 7(q) schematically shows, as a signal in the time domain, the interference vectors $E2'_n$ in the frequency domain output by the downsampling unit 62. As shown in FIG. 7(q), when expressed as a signal in the time domain, the interference vectors $E2'_n$ are represented by a periodic signal with a periodicity of the duration Tu of the useful symbol period.

The phase rotation unit 63 phase-rotates the interference vectors $E2'_n$ supplied from the downsampling unit 62 on a per-carrier basis to time shift the interference vectors $E2'_n$ by −Tg in the time domain, and supplies interference vectors $E2'^{rot}_n$ resultant from the phase rotation to the subtract ion unit 64. FIG. 7(r) schematically shows, as a signal in the time domain, the interference vectors $E2'^{rot}_n$ in the frequency domain output by the phase rotation unit 63. As is apparent from FIGS. 7(a) and (r), temporal positions of the delayed wave ICI components included in the interference vectors $E2'^{rot}_n$ coincide with temporal positions of the delayed wave ICI components included in the demodulation vectors $Y_n$.

(Interference Removal Processing)

The subtraction unit 64 subtracts the interference vectors $E2'^{rot}_n$ supplied from the phase rotation unit 63, from the interference vectors $E1'^{rot}_n$ supplied from the phase rotation unit 59, and supplies interference vectors $E1'^{rot}_n - E2'^{rot}_n$ resultant from the subtraction to the subtraction unit 65. The subtraction unit 65 subtracts the interference vectors $E1'^{rot}_n - E2'^{rot}_n$ supplied from the subtraction unit 64, from the demodulation vectors $Y_n$ corresponding to the $n^{th}$ symbol supplied from the OFDM demodulation unit 13, and supplies demodulation vectors $Y'_n (=Y_n - E1'^{rot}_n + E2'^{rot}_n)$ resultant from the subtraction to the equalization unit 16. FIG. 7(s) schematically shows, as a signal in the time domain, the demodulation vectors $Y'_n$ in the frequency domain output by the subtraction unit 77.

According to the above-described receiver 1, even in an environment where a delayed wave whose delay period exceeds the guard interval period, interference components pertaining to ISI and ICI due to the delayed wave can be removed from the demodulation vectors Y. Consequently, deterioration in image quality due to these components can be effectively suppressed. Additionally, even if the receiver receives three or more incoming waves, the interference components pertaining to ISI and ICI due to delayed waves can be removed from the demodulation vectors Y.

Furthermore, according to the above-described receiver 1, the removal processing of the interference components pertaining to ISI and ICI due to the delayed wave is performed in the frequency domain. Accordingly, the circuit scale and the calculation amount can be significantly reduced compared with a case where the removal processing is performed in the time domain.

Furthermore, according to the above-described receiver 1, channel equalization is performed again after removing errors caused by ISI and ICI due to the delayed wave, from the demodulation vectors Y. Accordingly, the channel response vectors corresponding to the same time as the demodulation vectors Y can be used for the interference removal processing performed on the demodulation vectors Y. As a result, the interference removal processing is not affected by time variance of the channel, and is robust against variance due to such as frequency deviation among transmission stations.

Note that the receiver 1 is capable of removing ISI and ICI which occur when a Fourier transform window for the OFDM transmission signals r(t) is not set at an appropriate location. Note that when the location of the Fourier transform window varies between symbols, correction can be made by performing phase rotation for each carrier based on the variance value.

Second Embodiment

The following describes a second embodiment of the present invention with reference to the drawings. Note that the receiver of the present embodiment includes an interference removal unit 15a whose inner structure is modified with respect to that of the interference removal unit 15 of the first embodiment, and components other than the interference removal unit 15a are substantially the same as those of the receiver 1. Accordingly, only the interference removal unit 15a will be described in the following. Note also that the components substantially the same as those of the first embodiment are assigned the same reference signs and description thereof is omitted, as the description in the first embodiment can be referred to.

[Structure and Operations of Interference Removal Unit 15a]

Figure 9:
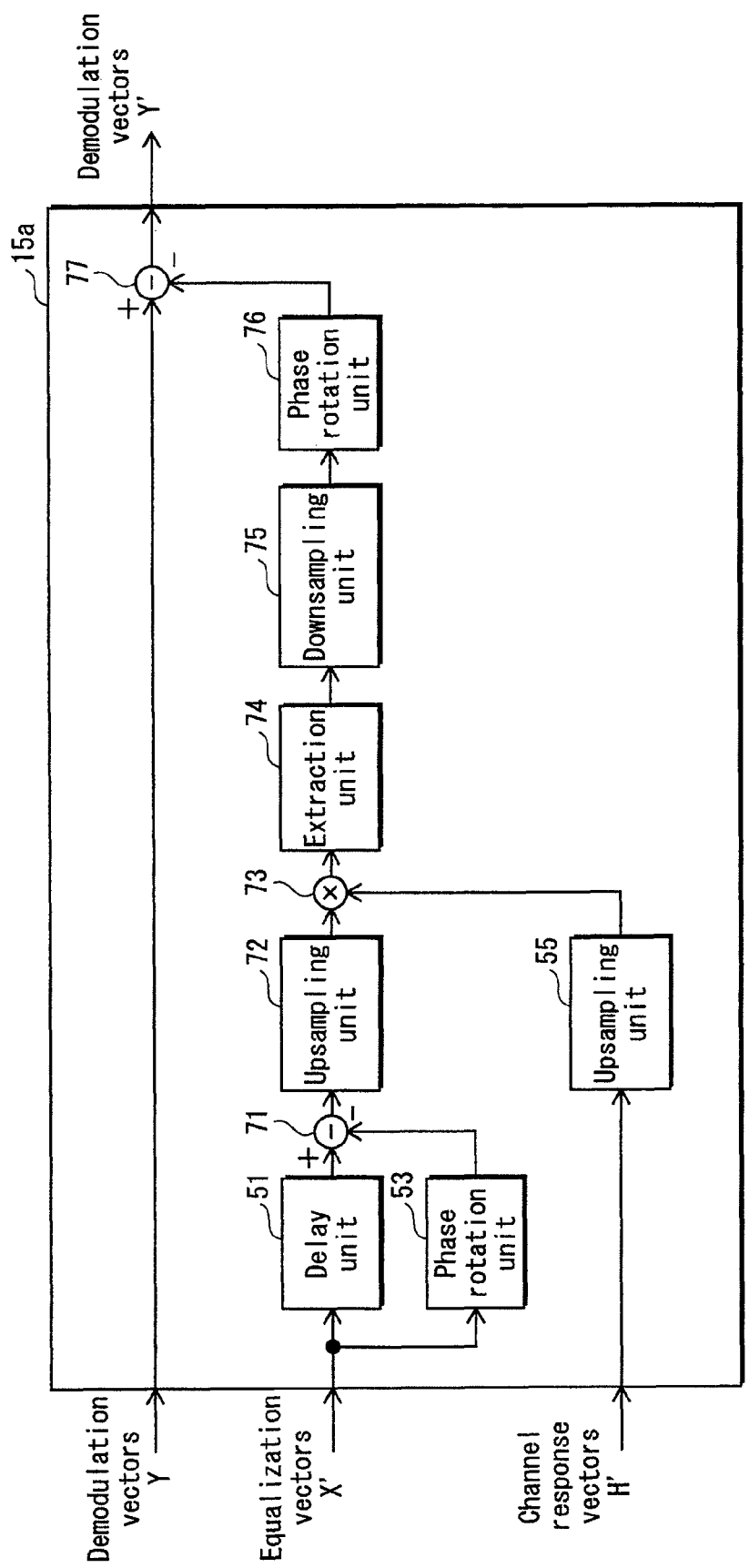
FIG. 9 shows a structure of an interference removal unit 15a of a second embodiment.
Figure 10:
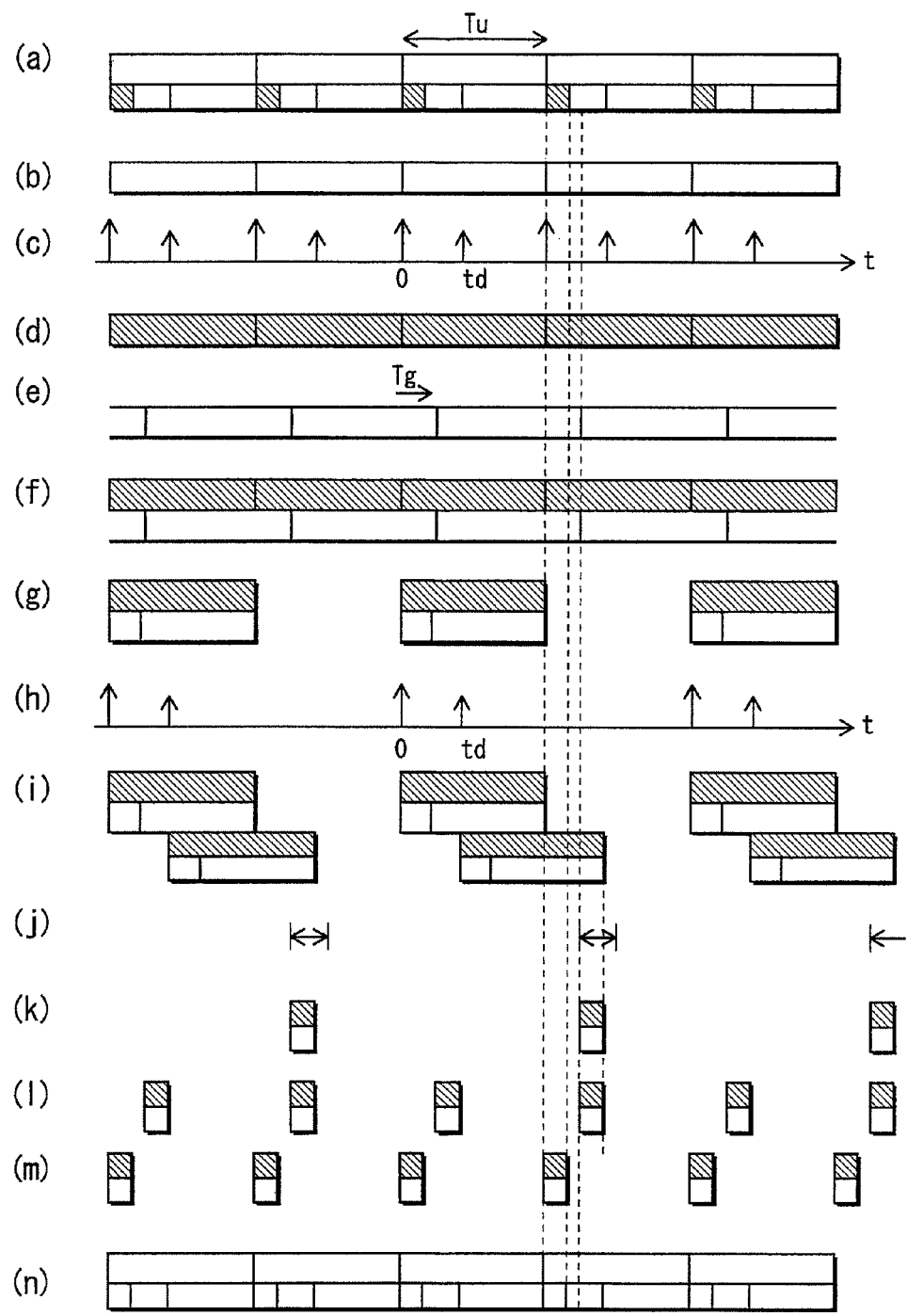

The structure and the operations of the interference removal unit 15a are described in the following with reference to FIGS. 9 and 10(a)-(n). FIG. 9 shows the structure of the interference removal unit 15a; and FIG. 10(a)-(n) is a diagram for explaining processing by the interference removal unit 15a shown in FIG. 9.

The interference removal unit 15a includes the delay unit 51, the phase rotation unit 53, a subtraction unit 71, an upsampling unit 72, the upsampling unit 55, a multiplication unit 73, an extraction unit 74, a downsampling unit 75, a phase rotation unit 76, and a subtraction unit 77. Note that the interference removal unit 15 separately processes the delayed wave ISI components and the delayed wave ICI components. On the other hand, the interference removal unit 15a processes the delayed wave ISI components and the delayed wave ICI components in an integrated manner to reduce the circuit scale and the calculation amount.

The demodulation vectors Y output from the OFDM demodulation unit 13 are supplied to the subtraction unit 77 in the interference removal unit 15a. The equalization vectors X' output from the equalization unit 14 are supplied to the delay unit 51 and the phase rotation unit 53 in the interference removal unit 15a, and the channel response vectors H' output from the equalization unit 14 are supplied to the upsampling unit 55 in the interference removal unit 15a. FIG. 10(a) schematically shows, as a signal in the time domain, the demodulation vectors $Y_n$ in the frequency domain output by the OFDM demodulation unit 13 in the $n^{th}$ symbol, and signal components from the OFDM transmission signal $s_{(n-1)}(t)$ in the $(n-1)^{th}$ symbol are hatched with backward diagonal lines. FIG. 10(b) schematically shows, as a signal in the time domain, the equalization vectors $X'_n$ in the frequency domain output by the equalization unit 14 in the $n^{th}$ symbol. FIG. 10(c) schematically shows, as a signal in the time domain, the channel response vectors $H'_n$ in the frequency domain output from the equalization unit 14 in the $n^{th}$ symbol. Note that when expressed as a signal in the time domain, the demodulation vectors $Y_n$, the equalization vectors $X'_n$, and the channel response vectors $H'_n$ are a periodic signal with the periodicity of the duration Tu of the useful symbol period, as shown in FIGS. 10(a), (b), and (c), respectively.

Note that hereinafter, the explanation is provided on, as an example, processing by the respective units in the interference removal unit 15a when the demodulation vectors $Y_n$, the equalization vectors $X'_n$, and the channel response vectors $H'_n$ corresponding to the $n^{th}$ symbol are supplied to the interference removal unit 15a.

The delay unit 51 delays the equalization vectors X' supplied from the equalization unit 14 by a period of time equivalent to a processing period of one symbol, and outputs the delayed equalization vectors X'. As a result, when the demodulation vectors $Y_n$, the equalization vectors $X'_n$, and the channel response vectors $H'_n$ corresponding to the $n^{th}$ symbol are supplied to the interference removal unit 15a and are to be processed by the interference removal unit 15a, the equalization vectors $X'_{(n-1)}$ corresponding to the $(n-1)^{th}$ symbol are supplied to the subtraction unit 71 from the delay unit 51. FIG. 10(d) schematically shows, as a signal in the time domain, the equalization vectors $X'_{(n-1)}$ in the frequency domain output by the delay unit 51. Note that in FIGS. 10(d), (f), (g), (i), (k), (l), and (m), the signal components related to the equalization vectors $X'_{(n-1)}$ are hatched with backward diagonal lines.

The phase rotation unit 53 phase-rotates the equalization vectors $X'_n$ corresponding to the $n^{th}$ symbol supplied by the equalization unit 14 on the per-carrier basis to time shift the equalization vectors $X'_n$ by Tg in the time domain, and supplies equalization vectors $X'^{rot}_n$ resultant from the phase rotation to the subtraction unit 71. FIG. 10(e) schematically shows, as a signal in the time domain, the equalization vectors $X'^{rot}_n$ in the frequency domain output by the phase rotation unit 53.

The subtraction unit 71 subtracts the equalization vectors $X'^{rot}_n$ supplied from the phase rotation unit 53 from the equalization vectors $X'_{(n-1)}$ supplied from the delay unit 51, and supplies difference equalization vectors $XA'_{(n-1),n}$ (=$X'_{(n-1)}$−$X'^{rot}_n$) resultant from the subtraction to the upsampling unit 72. FIG. 10(f) schematically shows, as a signal in the time domain, the difference equalization vectors $XA'_{(n-1),n}$ in the frequency domain output by the subtraction unit 71. FIG. 10(f) schematically shows the signal components corresponding to the equalization vectors $X'_{(n-1)}$ (portion hatched with backward diagonal lines) and the signal components corresponding to the equalization vectors $X'^{rot}_n$ (portion without hatch) on top of each other. However, in reality, the signal components represented by the difference equalization vectors $XA'_{(n-1),n}$ are signal components obtained by subtracting the signal components of the lower part from the signal components of the upper part.

The upsampling unit 72 upsamples difference equalization vectors $XA'_{(n-1),n}$ by a factor of 2, and supplies difference equalization vectors $XA'^2_{(n-1),n}$ resultant from the upsampling to the multiplication unit 73. FIG. 10(g) schematically shows, as a signal in the time domain, the difference equalization vectors $XA'^2_{(n-1),n}$ in the frequency domain output from the upsampling unit 72.

The upsampling unit 55 upsamples the channel response vectors $H'_n$ corresponding to the $n^{th}$ symbol supplied from the equalization unit 14 by a factor of 2, and outputs channel response vectors $H'^2_n$ resultant from the upsampling to the multiplication unit 73. FIG. 10(h) shows, as a signal in the time domain, the channel response vectors $H'^2_n$ in the frequency domain output by the upsampling unit 55.

The multiplication unit 73 multiplies the difference equalization vectors $XA'^2_{(n-1),n}$ supplied from the upsampling unit 72 and the channel response vectors $H'^2_n$ supplied from the upsampling unit 55, and supplies difference demodulation vectors $YA'^2_{(n-1),n}$ resultant from the multiplication to the extraction unit 74. FIG. 10(i) schematically shows, as a signal in the time domain, the difference demodulation vectors $YA'^2_{(n-1),n}$ in the frequency domain output by the multiplication unit 73. The upper part of FIG. 10(i) shows signal components related to the dominant wave; and the lower part of FIG. 10(i) shows signal components related to the delayed wave.

The extraction unit 74 is constituted from, for example, an FIR filter, and has the same transfer function of the passband as the extraction unit 57. The extraction unit 74 (i) extracts the delayed wave ISI components related to the demodulation vectors $Y_n$ from the difference demodulation vectors $YA'^2_{(n-1),n}$ supplied from the multiplication unit 73, by performing filter processing on the difference demodulation vectors $YA'^2_{(n-1),n}$, (ii) generates interference vectors $EA'^2_n$ indicating the extracted delayed wave ISI components and delayed wave ICI components related thereto, and (iii) supplies the generated interference vectors $EA'^2_n$ to the downsampling unit 75. FIG. 10(j) is a schematic diagram showing the passband of the filter of the extraction unit 74 in the time domain. FIG. 10(k) schematically shows, as a signal in the time domain, the interference vectors $EA'^2_n$ in the frequency domain output by the extraction unit 74.

The downsampling unit 75 downsamples the interference vectors $EA'^2_n$ supplied from the extraction unit 74 by a factor of ½, and supplies interference vectors $EA'_n$ resultant from the downsampling to the phase rotation unit 76. FIG. 10(l) schematically shows, as a signal in the time domain, the interference vectors $EA'_n$ in the frequency domain output by the downsampling unit 75.

The phase rotation unit 76 phase-rotates the interference vectors $EA'_n$ supplied from the downsampling unit 62 on the per-carrier basis to time shift the interference vectors $EA'_n$ by $-Tg$ in the time domain, and supplies interference vectors $EA'^{rot}_n$ resultant from the phase rotation to the subtraction unit 77. FIG. 10(m) schematically shows, as a signal in the time domain, the interference vectors $EA'^{rot}_n$ in the frequency domain output by the phase rotation unit 76. As is apparent from FIGS. 10(a) and (m), temporal positions of the delayed wave ISI components and the delayed wave ICI components included in the interference vectors $EA'^{rot}_n$ coincide with temporal positions of the delayed wave ISI components and the delayed wave ICI components included in the demodulation vectors $Y_n$.

The subtraction unit 77 subtracts the interference vectors $EA'^{rot}_n$ supplied from the phase rotation unit 76, from the demodulation vector $Y_n$ corresponding to the $n^{th}$ symbol supplied from the OFDM demodulation unit 13, and supplies demodulation vectors $Y'_n(=Y_n-EA'^{rot}_n)$ resultant from the subtraction to the equalization unit 16. FIG. 10(n) schematically shows, as a signal in the time domain, the demodulation vectors $Y'_n$ in the frequency domain output by the subtraction unit 77.

Note that the delay unit 51, the subtraction unit 71, the upsampling unit 72, the upsampling unit 55, the multiplication unit 73, the extraction unit 74, the downsampling unit 75, the phase rotation unit 76, and the subtraction unit 77 realize the function of removing ISI due to the delayed wave. The phase rotation unit 53, the subtraction unit 71, the upsampling unit 72, the upsampling unit 55, the multiplication unit 73, the extraction unit 74, the downsampling unit 75, the phase rotation unit 76, and the subtraction unit 77 realize the function of removing ICI due to the delayed wave.

Third Embodiment

The following describes a third embodiment of the present invention with reference to the drawings. The receiver of each embodiment described above removes only ISI and ICI due to delayed waves. On the other hand, a receiver 1b of the present embodiment removes ISI and ICI due to preceding waves, in addition to ISI and ICI due to the delayed waves. Note that the components substantially the same as those of the above-described embodiments are assigned the same reference signs and description thereof is omitted, as the description in the above-described embodiments can be referred to.

<Outline of ISI and ICI Due to Preceding Wave>

Before describing a structure and operations of the receiver 1b of the present embodiment, an outline of ISI and ICI due to preceding waves is described using an example case in which one preceding wave arrives at the receiver earlier than the dominant wave by a time that exceeds the guard interval period Tg, with reference to FIG. 11(a)-(g). FIG. 11(a)-(g) is a diagram for explaining the outline of ISI and ICI due to preceding waves. In each of FIG. 11(a)-(g), the horizontal axis represents time.

Figure 11:
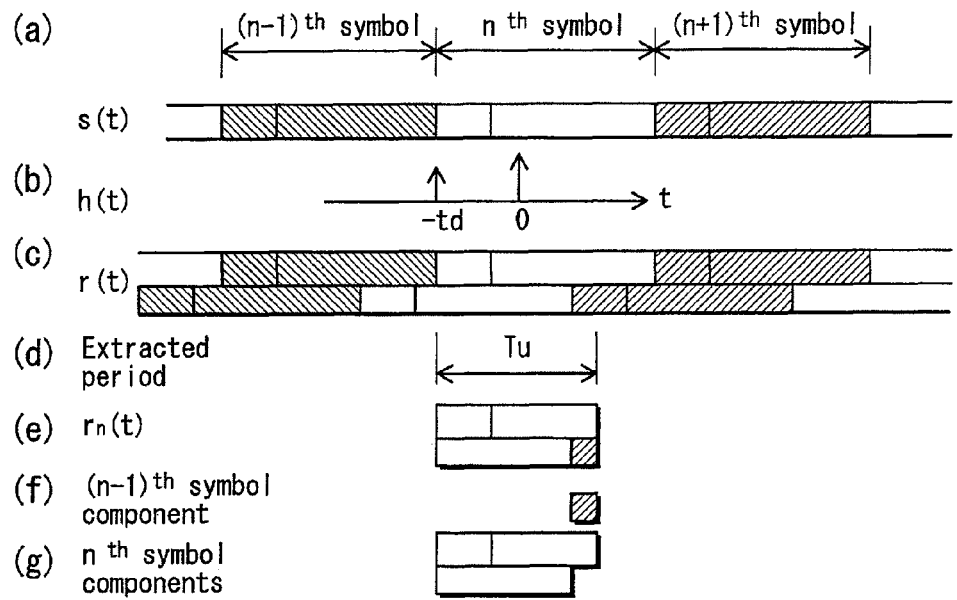
FIG. 11(a)-(g) is a diagram for explaining an outline of ISI and ICI due to preceding waves.

FIG. 11(a) schematically shows the plurality of consecutively transmitted symbols of the OFDM transmission signals s(t), and in this case, it is assumed that the transmission station transmits the plurality of symbols of the OFDM transmission signal consecutively. Here, the explanation is given with focus on the $n^{th}$ symbol. Note that in FIG. 11(a), in order to distinguish the OFDM transmission signal $S_n(t)$ in the focused $n^{th}$ symbol from the OFDM transmission signal $S_{(n-1)}(t)$ in the adjacent $(n-1)^{th}$ symbol and the OFDM transmission signal $S_{(n+1)}(t)$ in the adjacent $(n+1)^{th}$ symbol, the OFDM transmission signal $S_{(n-1)}(t)$ in the adjacent $(n-1)^{th}$ symbol is hatched with backward diagonal lines, and the OFDM transmission signal $S_{(n+1)}(t)$ in the adjacent $(n+1)^{th}$ symbol is hatched with forward diagonal lines.

FIG. 11(b) schematically shows a channel response signal h(t) indicating a channel response. The channel response signal h(t) shown in FIG. 11(b) as an example indicates the following case: two incoming waves arrive at the receiver; an arrival time t of the incoming wave which arrives second and whose reception level is higher (dominant wave) is assumed to be "0" (t=0); and the first incoming wave (preceding wave) precedes the dominant wave by a time td. Note that here, the time difference td between the arrival times of these incoming waves is greater than the guard interval period Tg.

FIG. 11(c) schematically shows OFDM transmission signals r(t) received by the receiver. While the second-arriving incoming wave (dominant wave) and the first-arriving incoming wave whose arrival precedes the dominant wave by the time td (preceding wave) are shown on top of each other as the upper part and the lower part, respectively, these incoming waves are in an additively convoluted state when received. Note that FIGS. 11(e) and (g) show the incoming waves in a similar manner. In FIG. 11(c), signal components from the OFDM transmission signal $s_{(n-1)}(t)$ are hatched with backward diagonal lines, and signal components from the OFDM transmission signal $s_{(n+1)}(t)$ are hatched with forward diagonal lines. FIGS. 11(e) and (f) are hatched in a similar manner.

The receiver that receives the OFDM transmission signal extracts, for each symbol, an OFDM transmission signal part having the duration Tu of the useful symbol period from the received OFDM transmission signals r(t) and demodulates the extracted OFDM transmission signal part. In the $n^{th}$ symbol, the receiver extracts an OFDM transmission signal part $r_n(t)$ shown in FIG. 11(e) having the duration Tu of the useful symbol period shown in FIG. 11(d), from the OFDM transmission signal r(t) shown in FIG. 11(c).

FIG. 11(f) shows a signal component from the OFDM transmission signal $s_{(n+1)}(t)$ in the $(n+1)^{th}$ symbol, included in the OFDM transmission signal part $r_n(t)$ shown in FIG. 11(e). This signal component from the OFDM transmission signal $s_{(n+1)}(t)$ in the $(n+1)^{th}$ symbol is the interference component pertaining to ISI due to the preceding wave in the OFDM transmission signal part $r_n(t)$ in the $n^{th}$ symbol. The interference component pertaining to ISI due to the preceding wave in the OFDM transmission signal part $r_n(t)$ in the $n^{th}$ symbol is a signal component of a period (td−Tg) from the start of the guard interval of the preceding wave related to the OFDM transmission signal $s_{(n+1)}(t)$ in the $(n+1)^{th}$ symbol. Note that this signal component is equivalent to a signal component having the period (td−Tg) starting from a temporal position that precedes, by the period Tg, the end of the preceding wave related to the OFDM transmission signal $s_{(n+1)}(t)$ in the $(n+1)^{th}$ symbol, and in the present embodiment, the interference component pertaining to the ISI due to the preceding wave is removed using the latter signal component.

FIG. 11(g) shows signal components from the OFDM transmission signal $s_n(t)$ in the $n^{th}$ symbol, included in the OFDM transmission signal part $r_n(t)$ shown in FIG. 11(e). As FIG. 11(g) shows, in the preceding wave, the duration of the signal components from the OFDM transmission signal $s_n(t)$ in the $n^{th}$ symbol included in the OFDM transmission signal part $r_n(t)$ is shorter than the duration Tu of the useful symbol period. Because the duration of the signal components of this preceding wave is shorter than the duration Tu of the useful symbol period, the carriers constituting the OFDM transmission signal part $r_n(t)$ cannot maintain their orthogonality, causing ICI when each carrier is demodulated. The signal component missing from the signal components of the preceding wave corresponding to the OFDM transmission signal $s_n(t)$ in the $n^{th}$ symbol is the interference component pertaining to ICI due to the preceding wave in the OFDM transmission signal part $r_n(t)$ in the $n^{th}$ symbol. The interference component pertaining to ICI due to the preceding wave in the OFDM transmission signal part $r_n(t)$ in the $n^{th}$ symbol is a signal component having the period (td−Tg) from the start of the preceding wave corresponding to the OFDM transmission signal $s_n(t)$ in the $n^{th}$ symbol.

<Structure and Operations of Receiver 1b>

Figure 12:
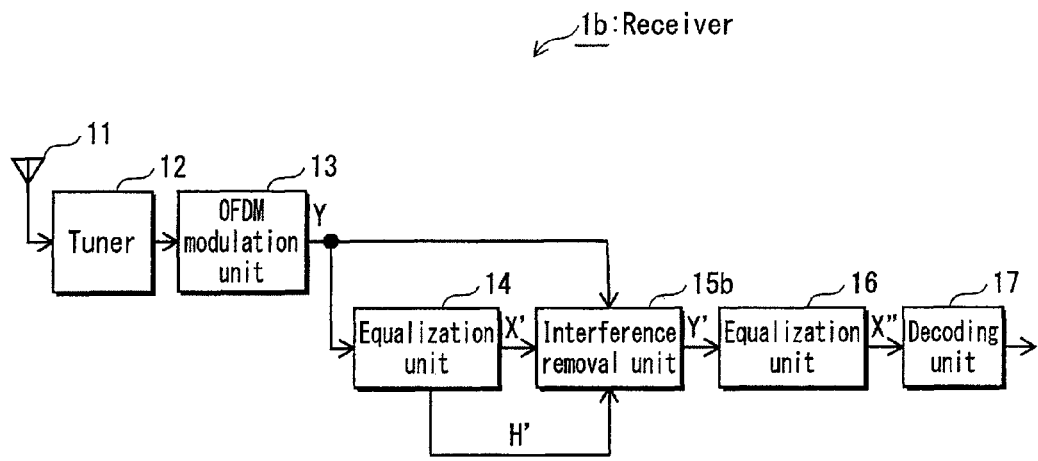
FIG. 12 shows a structure of a receiver 1b of a third embodiment.

The following describes the structure and the operations of the receiver 1b of the present embodiment with reference to FIGS. 12 and 13(a)-(g). FIG. 12 shows the structure of the receiver 1b of the present embodiment, and FIGS. 13(a)-(g) is a diagram for explaining processing by the receiver 1b shown in FIG. 12.

The receiver 1b includes the antenna 11, the tuner 12, the OFDM demodulation unit 13, the equalization unit 14, the interference removal unit 15b, the equalization unit 16, and the decoding unit 17. Processing by these units are substantially the same as those described in the first embodiment except the interference removal unit 15b, and detailed explanation of the interference removal unit 15b will be given later with reference to FIGS. 14 and 15(a)-(o). Note that processing by the antenna 11, the tuner 12, the OFDM demodulation unit 13, and the equalization unit 14 are described here.

The antenna 11 receives OFDM transmission signals transmitted from a transmission station (not shown), and supplies the received OFDM transmission signals to the tuner 12. The tuner 12 selects OFDM transmission signals r(t) of a desired channel from among the OFDM transmission signals supplied from the antenna 11, and outputs the selected OFDM transmission signals r(t) to the OFDM demodulation unit 13.

Figure 13:
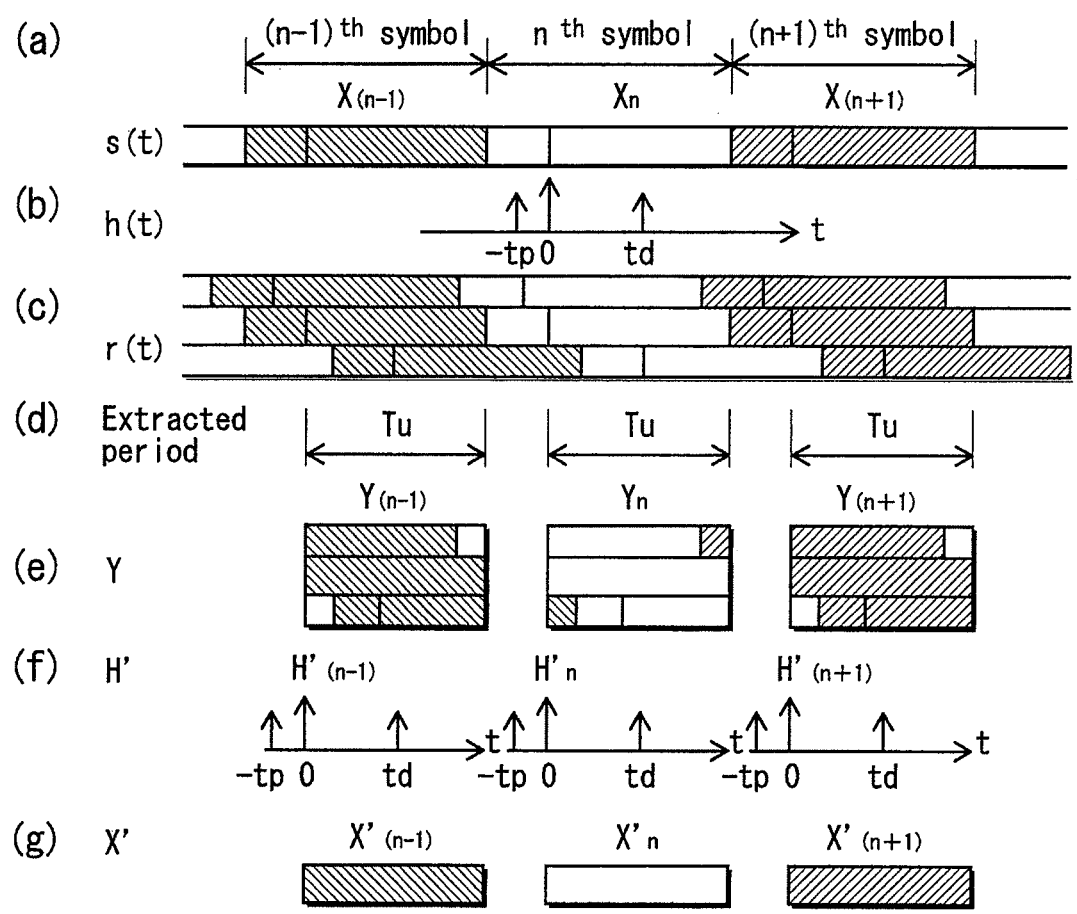
FIG. 13(a)-(g) is a diagram for explaining processing performed by the receiver 1b shown in FIG. 12.

FIG. 13(a) schematically shows the OFDM transmission signal s(t) transmitted from the transmission station. $X_{(n-1)}$, $X_n$, and $X_{(n+1)}$ in FIG. 13(a) indicate modulation vectors of modulated carriers in the $(n-1)^{th}$, $n^{th}$, and $(n+1)^{th}$ symbols, respectively. The OFDM transmission signal $s_{(n-1)}(t)$ in the $(n-1)^{th}$ symbol is hatched with backward diagonal lines, and the OFDM transmission signal $s_{(n+1)}(t)$ in the $(n+1)^{th}$ symbol is hatched with forward diagonal lines.

FIG. 13(b) schematically shows a channel response signal h(t). The channel response signal h(t) shown in FIG. 13(b) as an example indicates the following case: three incoming waves arrive at the receiver 1b; an arrival time t of the second-arriving incoming wave with the highest reception level (dominant wave) among the three is assumed to be "0" (t=0); the first-arriving incoming wave (preceding wave) precedes the dominant wave by a time tp; and the third-arriving incoming wave (delayed wave) is delayed from the dominant wave by a time td. Note that the arrival time difference (tp+td) between the preceding wave and the delayed wave is greater than the guard interval period Tg here.

FIG. 13(c) schematically shows OFDM transmission signals r(t) which were received and selected by the receiver 1b. In FIG. 13(c), the first-arriving incoming wave (preceding wave), the second-arriving incoming wave (dominant wave), and the third-arriving incoming wave (delayed wave) are shown on top each other as the upper part, the middle part, and the lower part, respectively. In reality, however, these incoming waves are received in an additively convoluted state. In FIG. 13(c), signal components from the OFDM transmission signal $s_{(n-1)}(t)$ in the $(n-1)^{th}$ symbol are hatched with backward diagonal lines, and signal components from the OFDM transmission signal $s_{(n+1)}(t)$ in the $(n+1)^{th}$ symbol are hatched with forward diagonal lines.

The OFDM demodulation unit 13 extracts, for each symbol, an OFDM transmission signal part having the duration Tu of the useful symbol period as shown in FIG. 13(d), from the OFDM transmission signals r(t), shown in FIG. 13(c), supplied from the tuner 12. Following that, the OFDM demodulation unit 13 performs discrete Fourier transform on the extracted OFDM transmission signal part. The OFDM demodulation unit 13 then supplies demodulation vectors Y in the frequency domain resultant from the discrete Fourier transform, to the equalization unit 14 and the interference removal unit 15b. FIG. 13(e) schematically shows, as signals in the time domain, the demodulation vectors Y in the frequency domain output from the OFDM demodulation unit 13. Note that the signs $Y_{(n-1)}$, $Y_n$, and $Y_{(n+1)}$ respectively indicate the demodulation vectors Y in the $(n-1)^{th}$, $n^{th}$, and $(n+1)^{th}$ symbols output by the OFDM demodulation unit 13. Here, signal components from the OFDM transmission signal $s_{(n-1)}(t)$ are hatched with backward diagonal lines, while signal components from the OFDM transmission signal $s_{(n+1)}(t)$ are hatched with forward diagonal lines.

The equalization unit 14 estimates the channel response vectors H' based on the demodulation vectors Y supplied from the OFDM demodulation unit 13, calculates the equalization vectors X' by equalizing the demodulation vectors Y based on the estimated channel response vectors H', and supplies the channel response vectors H' and the equalization vectors X' to the interference removal unit 15b. FIG. 13(f) schematically shows, as signals in the time domain, the channel response vectors X' in the frequency domain output from the equalization unit 14. FIG. 13(g) schematically shows, as signals in the time domain, the equalization vectors X' in the frequency domain output from the equalization 14. Note that $H'_{(n-1)}$, $H'_n$, and $H'_{(n+1)}$ in FIG. 13(f) respectively indicate the channel response vectors H' in the $(n-1)^{th}$, $n^{th}$, and $(n+1)^{th}$ symbols output from the equalization unit 14. Note also that $X'_{(n-1)}$, $X'_n$, and $X'_{(n+1)}$ in FIG. 13(g) respectively indicate the channel response vectors X' in the $(n-1)^{th}$, $n^{th}$, and $(n+1)^{th}$ symbols output from the equalization unit 14. Here, the equalization vectors $X'_{(n-1)}$ are hatched with backward diagonal lines, while the equalization vectors $X'_{(n+1)}$ are hatched with forward diagonal lines.

The equalization vectors X' output from the equalization unit 14 are reproduction of the modulation vectors X which have been modulated by the transmitter, by means of such as channel equalization processing. However, in an environment where the time difference between a delayed wave and a preceding wave exceeds the guard interval period Tg, the equalization vectors X' output from the equalization unit 14 include interference components pertaining to ISI and ICI due to the delayed wave and the preceding wave, with respect to the modulation vectors X.

[Structure and Operations of Interference Removal Unit 15b]

Figure 14:
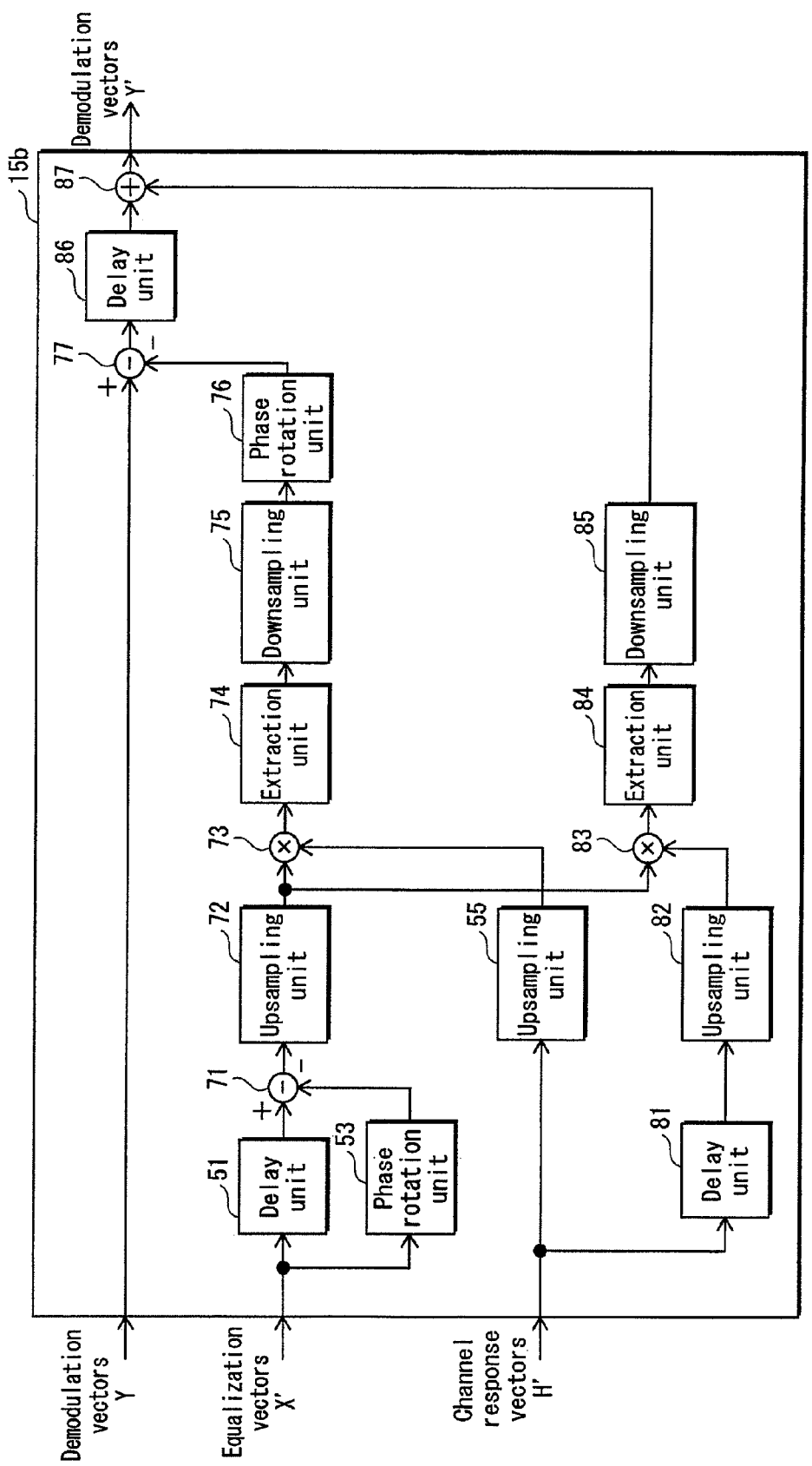
FIG. 14 shows a structure of an interference removal unit 15b shown in FIG. 12.

The following describes the structure and the operations of the interference removal unit 15b shown in FIG. 12, with reference to FIGS. 14 and 15(a)-(o). FIG. 14 shows the structure of the interference removal unit 15a shown in FIG. 12; and FIGS. 15(a)-(o) is a diagram for explaining processing performed by the interference removal unit 15b.

The interference removal unit 15b is structured substantially the same as the interference removal unit 15a. However, in addition, the interference removal unit 15b also includes a delay unit 81, an upsampling unit 82, a multiplication unit 83, an extraction unit 84, a downsampling unit 85, a delay unit 86, and an addition unit 87.

The demodulation vectors Y output from the OFDM demodulation unit 13 are supplied to the subtraction unit 77 in the interference removal unit 15b. The equalization vectors X' output from the equalization unit 14 are supplied to the delay unit 51 and the phase rotation unit 53 in the interference removal unit 15b, and the channel response vectors H' output from the equalization unit 14 are supplied to the upsampling unit 55 and the delay unit 81 in the interference removal unit 15b. FIG. 15(a) schematically shows, as a signal in the time domain, the demodulation vectors $Y_n$ in the frequency domain output by the OFDM demodulation unit in the $n^{th}$ symbol. Signal components from the OFDM transmission signal $s_{(n-1)}(t)$ in the $(n-1)^{th}$ symbol are hatched with backward diagonal lines; and signal components from the OFDM transmission signal $s_{(n+1)}(t)$ in the $(n+1)^{th}$ symbol are hatched with forward diagonal lines. FIG. 15(b) schematically shows, as a signal in the time domain, the equalization vectors $X'_n$ in the frequency domain in the $n^{th}$ symbol. FIG. 15(c) schematically shows, as a signal in the time domain, the channel response vectors $H'_n$ in the frequency domain output from the equalization unit 14 in the $n^{th}$ symbol.

The following describes the structure and the operations of the interference removal unit 15b in two parts as follows: removal of ISI and ICI due to a delayed wave; removal of ISI and ICI due to a preceding wave. Note that the explanation is provided on, as an example, processing by the respective units in the interference removal unit 15b when the demodulation vectors $Y_n$, the equalization vectors $X'_n$, and the channel response vectors $H'_n$ corresponding to the $n^{th}$ symbol are supplied to the interference removal unit 15b.

(Removal of ISI and ICI Due to Delayed Wave)

The delay unit 51, the phase rotation unit 53, the subtraction unit 71, the upsampling unit 72, the upsampling unit 55, the multiplication unit 73, the extraction unit 74, the downsampling unit 75, the phase rotation unit 76, and the subtraction unit 77 perform the processing as described above, and the subtraction unit 77 supplies the demodulation vectors $YB'_n(=Y_n-EA'^{rot}_n)$ to the delay unit 86. Note that although the demodulation vectors $YB'_n$ are the same as the demodulation vectors Y' output by the subtraction unit 77 in the second embodiment, the different signs are used for convenience of explanation. FIG. 15(d) schematically shows, as a signal in the time domain, the demodulation vectors $YB'_n$ in the frequency domain output by the subtraction unit 77, and signal components from the OFDM transmission signal $s_{(n+1)}(t)$ in the $(n+1)^{th}$ symbol are hatched with forward diagonal lines. In a case where both a preceding wave and a delayed wave are to be processed, it is preferable that the passband of the extraction unit 74 be set, in addition to the manner the passband of the filter of the extraction unit 57 is set, not to overlap with the passband of the filter of the extraction unit 84 performing processing on the preceding waves.

(Removal of ISI and ICI Due to Preceding Wave)

The delay unit 51, the phase rotation unit 53, the subtraction unit 71, and the upsampling unit 72 perform the processing as described above, and the upsampling unit 72 supplies the difference equalization vectors $XA'^2_{(n-1),n}$ to the multiplication unit 83. Note that these processing are shared by the removal processing of ISI and ICI due to the delayed wave and are not performed separately therefrom.

FIG. 15(e) schematically shows a signal in the time domain, the equalization vectors $X'_{(n-1)}$ in the frequency domain output from the delay unit 51. FIG. 15(f) schematically shows, as a signal in the time domain, the equalization vectors $X'^{rot}_n$ in the frequency domain output from the phase rotation unit 53. FIG. 15(g) schematically shows, as a signal in the time domain, the difference equalization vectors $XA'_{(n-1),n}$ in the frequency domain output from the subtraction unit 71. FIG. 15(h) schematically shows, as a signal in the time domain, the difference equalization vectors $XA'^2_{(n-1),n}$ in the frequency domain output from the upsampling unit 72. Note that in FIGS. 15(e), (g), (h), (j), (l), and (m), signal components related to the equalization vectors $X'_{(n-1)}$ are hatched with backward diagonal lines.

The delay unit 81 delays the channel response vectors H' supplied from the equalization unit 14 by a period of time equivalent to a processing period of one symbol, and outputs the delayed channel response vectors $H'_n$. As a result, when the demodulation vectors $Y_n$, the equalization vectors $X'_n$, and the channel response vectors $H'_n$ corresponding to the $n^{th}$ symbol are supplied to the interference removal unit 15b and are to be processed by the interference removal unit 15b, the channel response vectors $H'_{(n-1)}$ corresponding to the $(n-1)^{th}$ symbol are supplied to the upsampling unit 82 from the delay unit 81.

The upsampling unit 82 upsamples the channel response vectors $H'_{(n-1)}$ by a factor of 2, and supplies channel response vectors $H'^2_{(n-1)}$ resultant from the upsampling to the multiplication unit 83. FIG. 15(i) schematically shows, as a signal in the time domain, the channel response vectors $H'^2_{(n-1)}$ in the frequency domain output by the upsampling unit 82. Because the channel response vectors $H'^2_{(n-1)}$ are generated by upsampling the channel response vectors $H'_{(n-1)}$ with the discrete frequency interval of $1/Tu$ by the factor of 2, the discrete frequency interval of the channel response vectors $H'^2_{(n-1)}$ is $1/(2\times Tu)$. As shown in FIG. 15(i), when expressed as a signal in the time domain, the channel response vectors $H'^2_{(n-1)}$ are represented by a periodic signal with a periodicity of twice the duration Tu of the useful symbol period.

The multiplication unit 82 multiplies the difference equalization vectors $XA'^2_{(n-1),n}$ supplied from the upsampling unit 72 and the channel response vectors $H'^2_{(n-1)}$ supplied from the upsampling unit 82 on the per-carrier basis, and supplies difference demodulation vectors $YB'^2_{(n-1),n}$ resultant from the upsampling to the extraction unit 84. FIG. 15(j) schematically shows, as a signal in the time domain, the difference demodulation vectors $YB'^2_{(n-1),n}$ in the frequency domain output by the multiplication unit 83. The upper part of FIG. 15(j) shows signal components related to the preceding wave; the middle part of FIG. 15(j) shows signal components related to the dominant wave; and the lower part of FIG. 15(j) shows signal components related to the delayed wave. The time domain signal shown in FIG. 15(j) is obtained by convolving the time domain signal shown in FIG. 15(h) and the time domain signal shown in FIG. 15(i).

Figure 15:
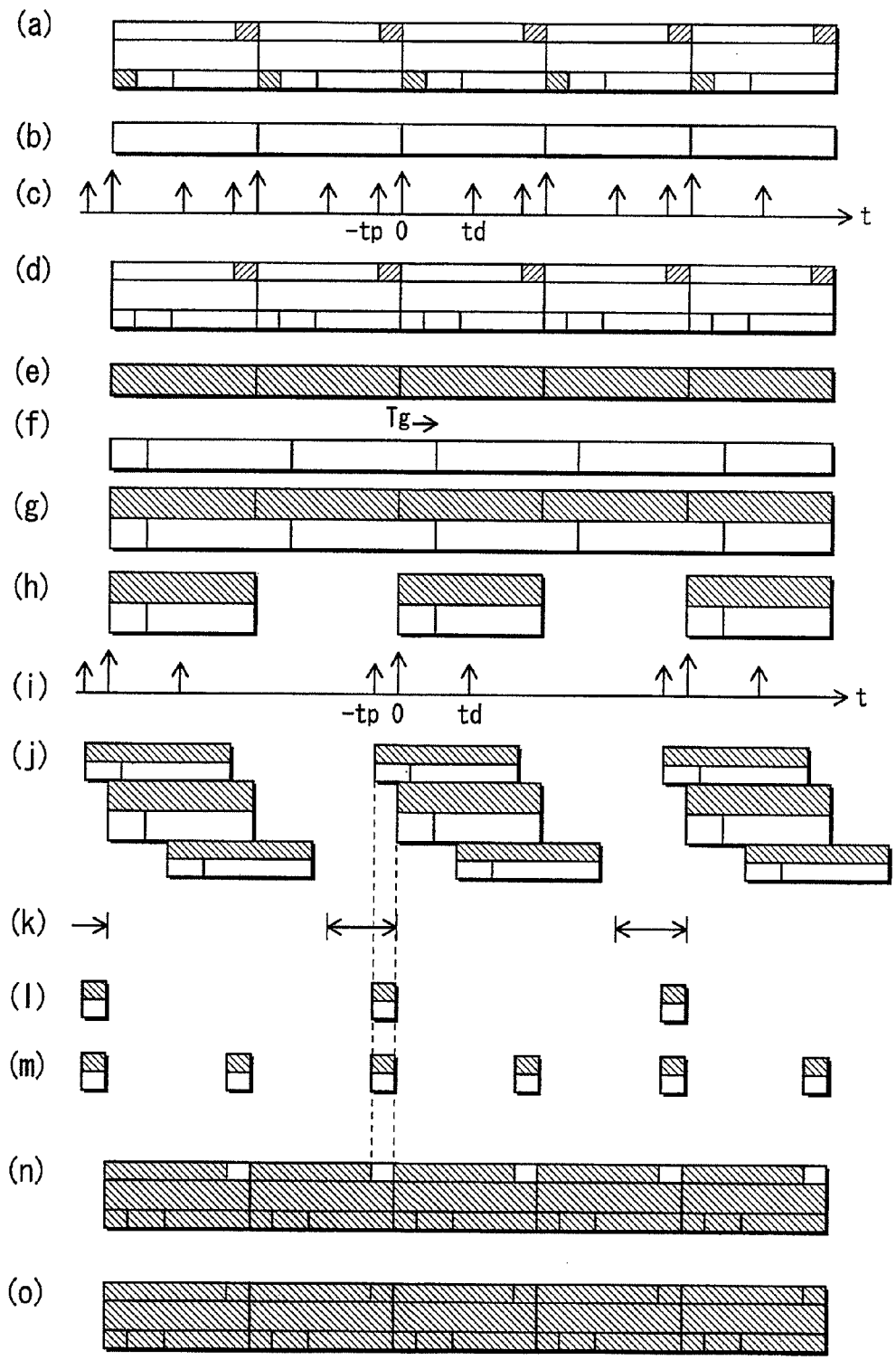
FIG. 15(a)-(o) is a diagram for explaining processing performed by the interference removal unit 15b.

The extraction unit 84 is constituted from, for example, an FIR filter, and has a transfer function of a passband described below. The extraction unit 84 extracts the following from the difference demodulation vectors $YB'^2_{(n-1),n}$ by performing filter processing on the difference demodulation vectors $YB'^2_{(n-1),n}$ supplied from the multiplication unit 83: interference components pertaining to ISI due to the preceding wave related to the demodulation vectors $Y_{(n-1)}$ (hereinafter, referred to as "preceding wave ISI components"); and related interference components pertaining to ICI due to the preceding wave (hereinafter, referred to as "preceding wave ICI components". The extraction unit 84 then generates interference vectors $EB'^2_{(n-1)}$ indicating the extracted preceding wave ISI components and preceding wave ICI components related thereto, and supplies the generated interference vectors $EB'^2_{(n-1)}$ to the downsampling unit 85. FIG. 15(*k*) is a schematic diagram showing the passband of the filter of the extraction unit 84 in the time domain. FIG. 15*l* schematically shows, as a signal in the time domain, the interference vectors $EB'^2_{(n-1)}$ in the frequency domain output by the extraction unit 84.

The following describes the passband of the filter of the extraction unit 84 with reference to FIG. 8B. FIG. 8B is a diagram for explaining the passband of the filter of the extraction unit 84 shown in FIG. 14, and shows the passband of the filter of the extraction unit 84 in the time domain. In FIG. 8B, Tu denotes the useful symbol period, Tg denotes the guard interval period, and the upsampling factor, i.e. the upsampling rate, is 2.

If the extraction unit 84 can extract signal components exceeding −(Tu/Tg)/2, the interference components can be removed. Thus, when seen in the time domain, the right end of the passband of the filter needs to be set so as to be able to extract signal components exceeding −(Tu/Tg)/2. However, it is preferable to set the left end of the passband such that aliasing components are not included in the passband of the filter, since the aliasing components cause deterioration to the interference vectors $EB'^2_{(n-1)}$. In a case where both the preceding wave and the delayed wave are to be processed, it is preferable that the passband of the extraction unit 84 be set not to overlap with the passband of the filter of the extraction unit 74 performing processing on the delayed waves.

Note that since the extraction unit 84 performs signal processing in the frequency domain, a filter coefficient of the filter of the extraction unit 84 in the frequency domain can be determined based on the above description.

The downsampling unit 85 downsamples the interference vectors $EB'^2_{(n-1)}$ supplied from the extraction unit 84 by a factor of ½, and supplies interference vectors $EB'_{(n-1)}$ resultant from the downsampling to the addition unit 87. FIG. 15(*m*) schematically shows, as a signal in the time domain, the interference vectors $EB'_{(n-1)}$ in the frequency domain output by the downsampling unit 86. As shown in FIG. 15(*m*), when expressed as a signal in the time domain, the interference vectors $EB'_{(n-1)}$ are represented by a periodic signal with a periodicity of the duration Tu of the useful symbol period.

The delay unit 86 delays the demodulation vectors YB' supplied from the subtraction unit 77 by a period of time equivalent to a processing period of one symbol, and outputs the delayed demodulation vectors YB'. As a result, when the demodulation vectors $Y_n$, the equalization vectors $X'_n$, and the channel response vectors $H'_n$ corresponding to the $n^{th}$ symbol are supplied to the interference removal unit 15*b* and are to be processed by the interference removal unit 15*b*, the demodulation vectors $YB'_{(n-1)}$ are supplied from the delay unit 86 to the addition unit 87. The demodulation vectors $YB'_{(n-1)}$ were supplied from the subtraction unit 77 to the delay unit 86 when the demodulation vectors $Y_{(n-1)}$, the equalization vectors $X'_{(n-1)}$, and the channel response vectors $H'_{(n-1)}$ corresponding to the $(n-1)^{th}$ symbol were supplied to the interference removal unit 15*b* and processed by the interference removal unit 15*b*. FIG. 15(*n*) schematically shows, as a signal in the time domain, the demodulation vectors $YB'_{(n-1)}$ in the frequency domain output by the delay unit 86. As is apparent from FIGS. 15(*m*) and (*n*), temporal positions of the preceding wave ISI components and the preceding wave ICI components included in the interference vectors $EB'_{(n-1)}$ coincide with temporal positions of the preceding wave ISI components and the preceding wave ICI components included in the demodulation vectors $YB'_{(n-1)}$.

The addition unit 87 adds the demodulation vectors $YB'_{(n-1)}$ supplied from the delay unit 86 to the corresponding interference vectors $EB'_{(n-1)}$ supplied from the phase downsampling unit 85, respectively, and supplies demodulation vectors $Y'_{(n-1)}(=YB'_{(n-1)}+EB'_{(n-1)})$ resultant from the addition to the equalization unit 16.

Note that the phase rotation unit 53, the subtraction unit 71, the upsampling unit 72, the delay unit 81, the upsampling unit 82, the multiplication unit 83, the extraction unit 84, the downsampling unit 85, the delay unit 86, and the addition unit 87 realize the function of removing ISI due to the preceding wave. In a case of removing only ISI due to the preceding wave, it is sufficient to have the phase rotation unit 53, the subtraction unit 71, the upsampling unit 72, the delay unit 81, the upsampling unit 82, the multiplication unit 83, the extraction unit 84, the downsampling unit 85, the delay unit 86, and the addition unit 87. Note that the above-described structure can be modified by removing the subtraction unit 71 and replacing the addition unit 87 with a subtraction unit in a manner that the resultant structure equates to the subtraction unit 71 and the addition unit 87.

The delay unit 51, the subtraction unit 71, the upsampling unit 72, the delay unit 81, the upsampling unit 82, the multiplication unit 83, the extraction unit 84, the downsampling unit 85, the delay unit 86, and the addition unit 87 realize the function of removing ICI due to the preceding wave. In a case of removing only ICI due to the preceding wave, it is sufficient to have the upsampling unit 72, the upsampling unit 82, the multiplication unit 83, the extraction unit 84, the downsampling unit 85, the delay unit 86, and the addition unit 87.

According to the above-described receiver 1*b*, even in an environment where there is a preceding wave whose preceding time exceeds the guard interval period, interference components pertaining to ISI and ICI due to the preceding wave can be removed from the demodulation vectors Y. Consequently, deterioration in reception quality due to these components can be effectively suppressed. Additionally, even when the receiver receives two or more preceding waves, the interference components pertaining to ISI and ICI due to the preceding waves can be removed from the demodulation vectors Y.

Fourth Embodiment

The following describes a fourth embodiment of the present invention with reference to the drawings. An interference removal unit 15*c* of the present embodiment is substantially the same as the interference removal unit 15*b* of the third embodiment. However, the structure of a block of the interference removal unit 15*c* for removing ISI and ICI due to preceding waves is modified with respect to the interference removal unit 15*b*. Note that the components substantially the same as those of the above-described embodiments are assigned the same reference signs and description thereof is omitted, as the description in the above-described embodiments can be referred to.

[Structure and Operations of Interference Removal Unit 15c]

Figure 16:
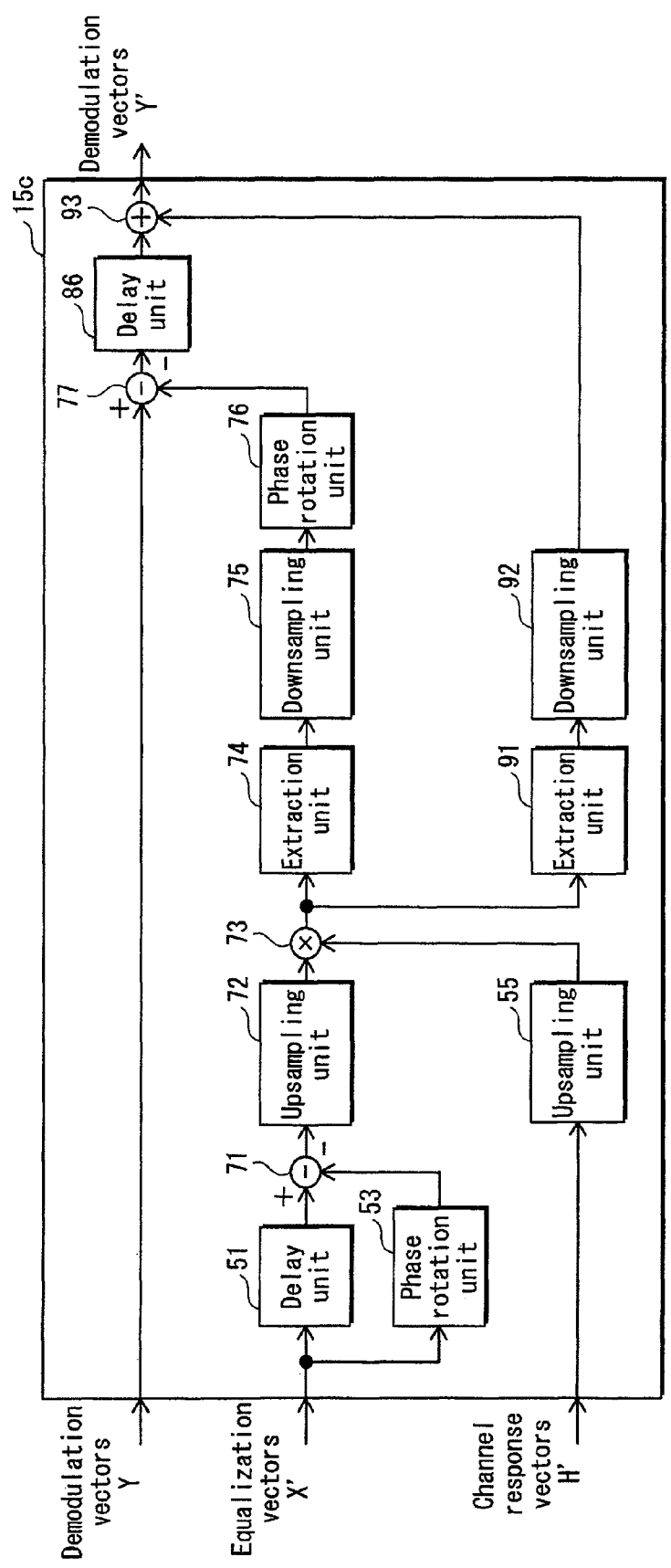
FIG. 16 shows a structure of an interference removal unit 15c of a fourth embodiment.

The structure and the operations of the interference removal unit 15c are described in the following with reference to FIG. 16. FIG. 16 shows the structure of the interference removal unit 15c.

The interference removal unit 15c is structured to include a processing block composed of an extraction unit 91, a downsampling unit 92, and an addition unit 93, instead of a processing block composed of the delay unit 81, the upsampling unit 82, the multiplication unit 83, the extraction unit 84, the downsampling unit 85, and the addition unit 87 included in the interference removal unit 15b shown in FIG. 14.

The removal of ISI and ICI due to a delayed wave is the same as that of the third embodiment, and accordingly, only the removal of ISI and ICI due to a preceding wave is described here. Note that the explanation is provided on, as an example, processing by the respective units in the interference removal unit 15c when the demodulation vectors $Y_n$, the equalization vectors $X'_n$, and the channel response vectors $H'_n$ corresponding to the $n^{th}$ symbol are supplied to the interference removal unit 15c.

(Removal of ISI and ICI Due to Preceding Wave)

The delay unit 51, the phase rotation unit 53, the subtraction unit 71, the upsampling unit 72, the upsampling unit 55, and the multiplication unit 73 perform the processing as described above, and the multiplication unit 73 supplies the difference demodulation vectors $YA'^2_{(n-1),n}$ to the extraction unit 91.

The extraction unit 91 is constituted from, for example, an FIR filter, and has the transfer function of the same passband as that of the extraction unit 84. The extraction unit 91 (i) extracts the preceding wave ISI components and the preceding wave ICI components pertaining to the demodulation vectors $Y_{(n-1)}$ from the difference demodulation vectors $YA'^2_{(n-1),n}$ by performing filter processing on the difference demodulation vectors $YA'^2_{(n-1),n}$ supplied from the multiplication unit 73, (ii) generates interference vectors $EC'^2_{(n-1)}$ indicating the extracted preceding wave ISI components and preceding wave ICI components related thereto, and (iii) supplies the generated interference vectors $EC'^2_{(n-1)}$ to the downsampling unit 92.

The downsampling unit 92 downsamples the interference vectors $EC'^2_{(n-1)}$ supplied from the extraction unit 91 by a factor of ½, and supplies interference vectors $EC'_{(n-1)}$ resultant from the downsampling to the addition unit 93.

The delay unit 86 delays the demodulation vectors YB' supplied from the subtraction unit 77 by a period of time equivalent to a processing period of one symbol, and outputs the delayed demodulation vectors YB'. As a result, when the demodulation vectors $Y_n$, the equalization vectors $X'_n$, and the channel response vectors $H'_n$ corresponding to the $n^{th}$ symbol are supplied to the interference removal unit 15c and are to be processed by the interference removal unit 15c, the demodulation vectors $YB'_{(n-1)}$ are supplied from the delay unit 86 to the addition unit 93. The demodulation vectors $YB'_{(n-1)}$ were supplied from the subtraction unit 77 to the delay unit when the demodulation vectors $Y_{(n-1)}$, the equalization vectors $X'_{(n-1)}$, and the channel response vectors $H'_{(n-1)}$ corresponding to the $(n-1)^{th}$ symbol were supplied to the interference removal unit 15c and processed by the interference removal unit 15c.

The addition unit 93 adds the demodulation vectors $YB'_{(n-1)}$ supplied from the delay unit 86 to the corresponding interference vectors $EC'_{(n-1)}$ supplied from the phase downsampling unit 92, respectively, and supplies demodulation vectors $Y'_{(n-1)}(=YB'_{(n-1)}+EC'_{(n-1)})$ resultant from the addition to the equalization unit 16.

The interference removal unit 15c of the present embodiment removes ISI and ICI due to the preceding wave using channel response vectors corresponding to a symbol that is immediately follows the symbol to which the demodulation vectors correspond. Accordingly, in a case that frequency deviation exists among transmission stations or channel responses vary in time due to movement of the receiver, the reception quality may deteriorate slightly. However, because the delay unit 81, the upsampling unit 82, and the multiplication unit 83 can be eliminated, the circuit scale and calculation amount can be reduced.

Fifth Embodiment

The following describes a fifth embodiment of the present invention with reference to the drawings. An interference removal unit 15d of the present embodiment is substantially the same as the interference removal unit 15b of the third embodiment except that the methods for removing ISI due to delayed waves and ICI due to preceding waves are modified. Note that the components substantially the same as those of the above-described embodiments are assigned the same reference signs and description thereof is omitted, as the description in the above-described embodiments can be referred to.

[Structure and Operations of Interference Removal Unit 15d]

Figure 17:
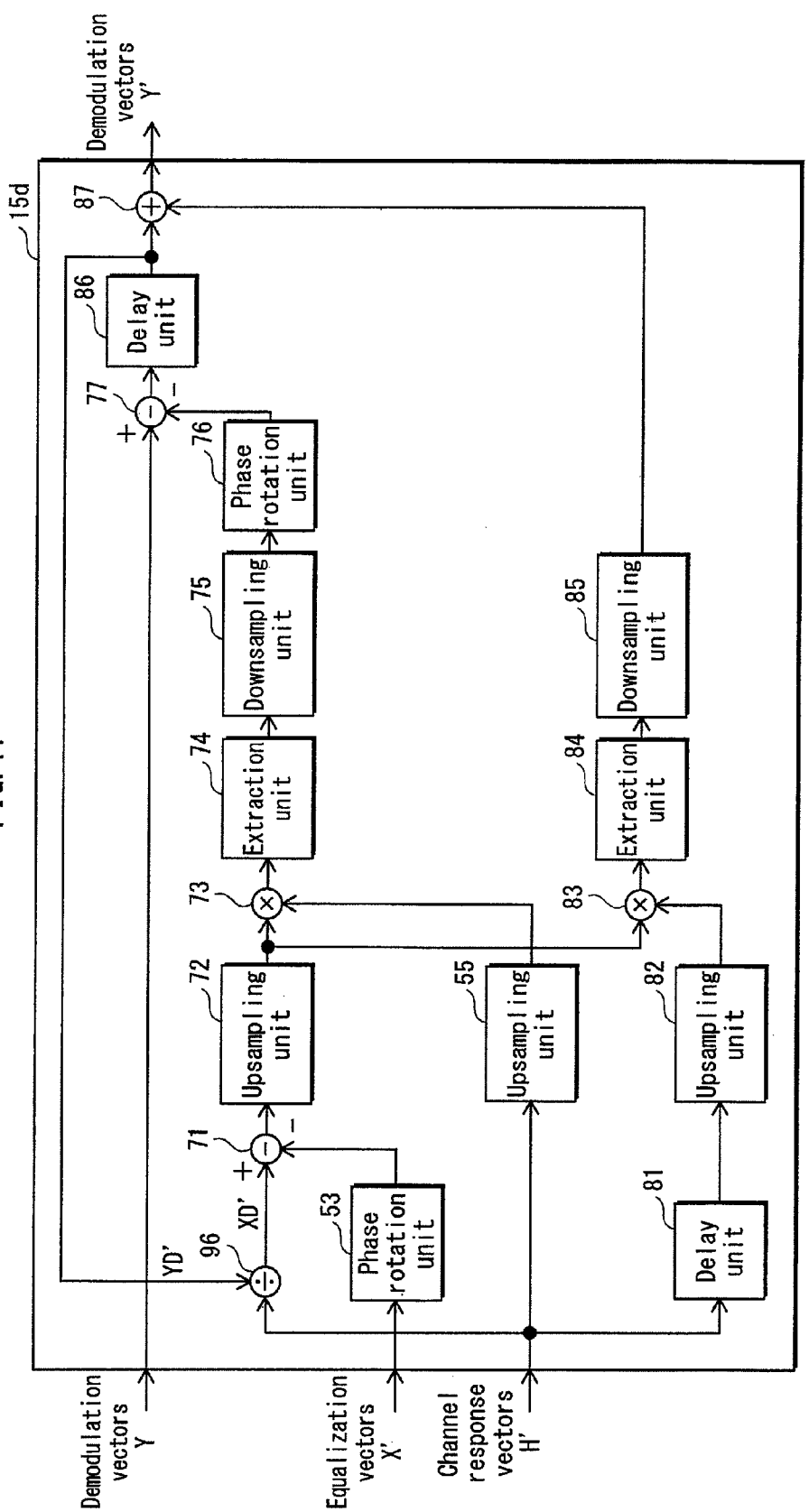
FIG. 17 shows a structure of an interference removal unit 15d of a fifth embodiment.

The structure and the operations of the interference removal unit 15d are described in the following with reference to FIG. 17. FIG. 17 shows the structure of the interference removal unit 15d, and the interference removal unit 15d includes a division unit 96 instead of the delay unit 51 included in the interference removal unit 15b shown in FIG. 14.

The following describes the structure and the operations of the interference removal unit 15d in two parts as follows: removal of ISI and ICI due to a delayed wave; and removal of ISI and ICI due to a preceding wave. Note that the explanation is provided on, as an example, processing by the respective units in the interference removal unit 15d when the demodulation vectors $Y_n$, the equalization vectors $X'_n$, and the channel response vectors $H'_n$ corresponding to the $n^{th}$ symbol are supplied to the interference removal unit 15d.

(Removal of ISI and ICI Due to Delayed Wave)

The delay unit 86 delays the demodulation vectors YD' supplied from the subtraction unit 77 by a period of time equivalent to a processing period of one symbol, and outputs the delayed demodulation vector YD'. As a result, when the demodulation vectors $Y_n$, the equalization vectors $X'_n$, and the channel response vectors $H'_n$ corresponding to the $n^{th}$ symbol are supplied to the interference removal unit 15d and are to be processed by the interference removal unit 15d, the demodulation vectors $YD'_{(n-1)}$ are supplied from the delay unit 86 to the addition unit 93 and the division unit 96. The demodulation vectors $YD'_{(n-1)}$ were supplied from the subtraction unit 77 to the delay unit 86 when the demodulation vectors $Y_{(n-1)}$, the equalization vectors $X'_{(n-1)}$, and the channel response vectors $H'_{(n-1)}$ corresponding to the $(n-1)^{th}$ symbol were supplied to the interference removal unit 15d and processed by the interference removal unit 15d.

The division unit 96 divides the demodulation vectors $YD'_{(n-1)}$ supplied by the delay unit 86 by the channel response vectors $H'_n$ corresponding to the $n^{th}$ symbol supplied from the equalization unit 14, respectively, and supplies the division results as equalization vectors $XD'_{(n-1)}$ to the subtraction unit 71. The phase rotation unit 53 phase-rotates the equalization vectors X'$_n$ corresponding to the n$^{th}$ symbol supplied by the equalization unit 14 on the per-carrier basis to time shift the equalization vectors X'$_n$ by Tg in the time domain, and supplies equalization vectors X'$^{rot}_n$ resultant from the phase rotation to the subtraction unit 71. The subtraction unit 71 subtracts the equalization vectors X'$^{rot}_n$ supplied from the phase rotation unit 53 from the corresponding equalization vectors XD'$_{(n-1)}$ supplied from the division unit 96, and supplies difference equalization vectors XD'$_{(n-1)}$–X'$^{rot}_n$ resultant from the subtraction to the upsampling unit 72.

The upsampling unit 72, the upsampling unit 55, the multiplication unit 73, the extraction unit 74, the downsampling unit 75, the phase rotation unit 76, and the subtraction unit 77 perform substantially the same processing as the processing described above, and the subtraction unit 77 supplies the demodulation vectors YD'$_n$ to the delay unit 86.

(Removal of ISI and ICI Due to Delayed Wave)

The delay unit 86, the division unit 96, the phase rotation unit 53, the subtraction unit 71, the upsampling unit 72, the delay unit 81, the upsampling unit 82, the multiplication unit 83, the extraction unit 84, the downsampling unit 85, and the addition unit 87 perform the processing described above or substantially the same processing as the processing described above, and the addition unit 87 supplies the demodulation vectors Y'$_{(n-1)}$ to the equalization unit 16. Note that the processing by the delay unit 86, the division unit 96, the phase rotation unit 53, the subtraction unit 71, and the upsampling unit 72 are shared by the removal processing of ISI and ICI due to the delayed wave and are not performed separately therefrom.

The interference removal unit 15d generates the equalization vectors XD'$_{(n-1)}$ by dividing the demodulation vectors YD'$_{(n-1)}$, from which ISI due to the delayed wave and ICI due to the delayed wave have been removed, by the corresponding channel response vectors H$_n$, and removes ISI due to the delayed wave and ICI due to the preceding wave using the generated equalization vectors XD'$_{(n-1)}$. Accordingly, ISI due to the delayed wave and ICI due to the preceding wave can be removed more efficiently compared with a case where the equalization vectors X'$_{(n-1)}$ are used as they are. Additionally, although the division unit 96 is added, because the delay unit 51 is removed, a memory capacity corresponding to one symbol can be reduced.

Sixth Embodiment

The following describes a sixth embodiment of the present invention with reference to the drawings. An interference removal unit 15e of the present embodiment is substantially the same as the interference removal unit 15d of the fifth embodiment except that a function of selecting demodulation vectors in accordance with reception quality is added thereto. Note that the components substantially the same as those of the above-described embodiments are assigned the same reference signs and description thereof is omitted, as the description in the above-described embodiments can be referred to.

[Structure and Operations of Interference Removal Unit 15e]

Figure 18:
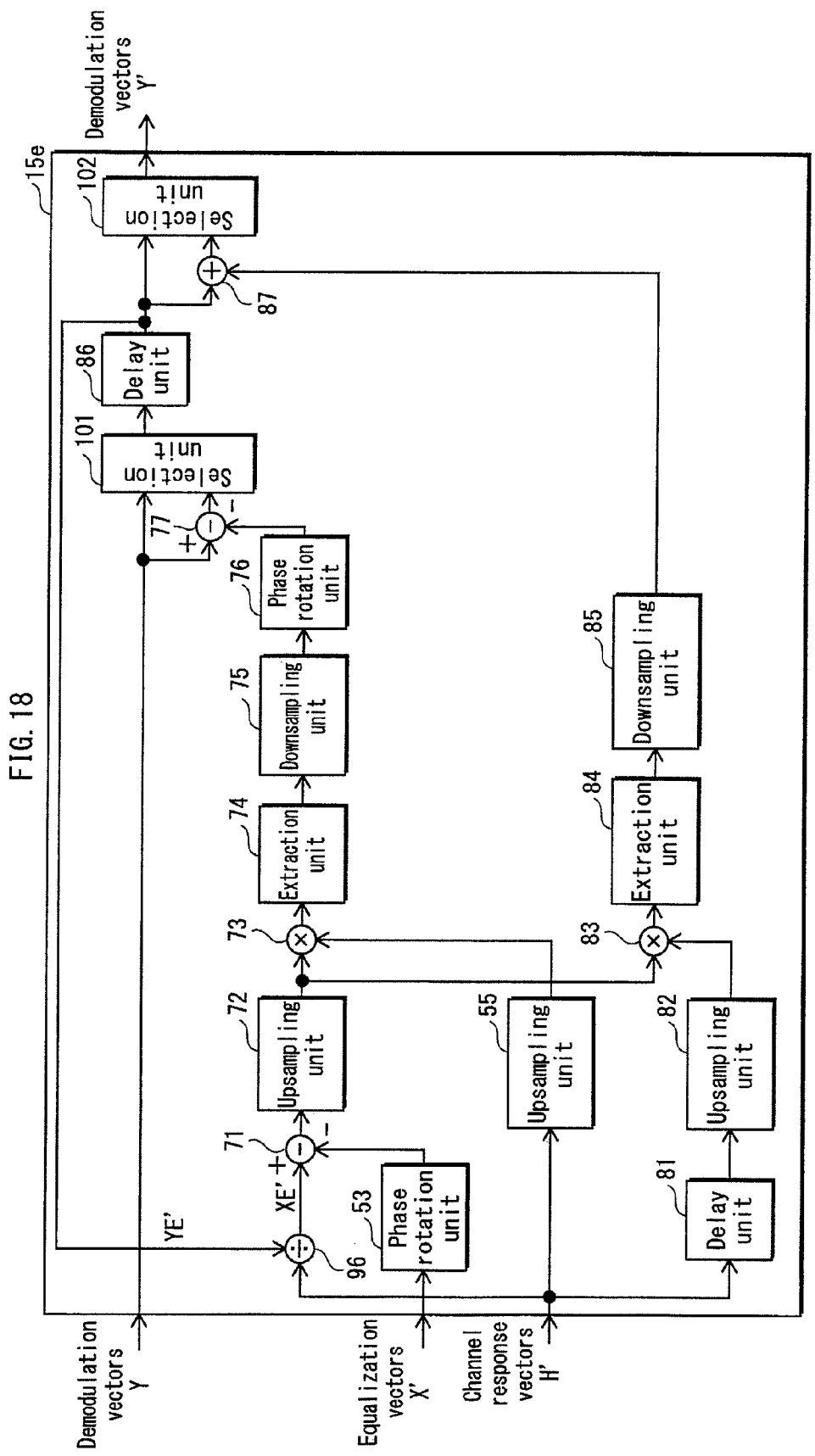
FIG. 18 shows a structure of an interference removal unit 15e of a sixth embodiment.

The structure and the operations of the interference removal unit 15e are described in the following with reference to FIG. 18. FIG. 18 shows the structure of the interference removal unit 15e.

The interference removal unit 15e is structured to include a processing block composed of the subtraction unit 77, a selection unit 101, the delay unit 86, the addition unit 87, and a selection unit 102 instead of a processing block composed of the subtraction unit 77, the delay unit 86, and the addition unit 87.

The following describes the structure and the operations of the interference removal unit 15e in two parts as follows: removal of ISI and ICI due to a delayed wave; and removal of ISI and ICI due to preceding waves. Note that the explanation is provided on, as an example, processing by the respective units in the interference removal unit 15e when the demodulation vectors Y$_n$, the equalization vectors X'$_n$, and the channel response vectors H'$_n$ corresponding to the n$^{th}$ symbol are supplied to the interference removal unit 15e.

The delay unit 86 delays demodulation vectors YD' supplied from the selection unit 101 by a period of time equivalent to a processing period of one symbol, and outputs the delayed demodulation vectors YD'. As a result, when the demodulation vectors Y$_n$, the equalization vectors X'$_n$, and the channel response vectors H'$_n$ corresponding to the n$^{th}$ symbol are supplied to the interference removal unit 15e and are to be processed by the interference removal unit 15e, the demodulation vectors YE'$_{(n-1)}$ are supplied from the delay unit 86 to the addition unit 87, the selection unit 102, and the division unit 96. The demodulation vectors YE'$_{(n-1)}$ were supplied from the selection unit 101 to the delay unit 86 when the demodulation vectors Y$_{(n-1)}$, the equalization vectors X'$_{(n-1)}$, and the channel response vectors H'$_{(n-1)}$ corresponding to the (n–1)$^{th}$ symbol were supplied to the interference removal unit 15e and processed by the interference removal unit 15e.

The division unit 96 divides the demodulation vectors YE'$_{(n-1)}$ supplied by the delay unit 86 by the channel response vectors H'$_n$ corresponding to the n$^{th}$ symbol supplied from the equalization unit 14, respectively, and supplies the division result as equalization vectors XE'$_{(n-1)}$ to the subtraction unit 71. The phase rotation unit 53 phase-rotates the equalization vectors X'$_n$ corresponding to the n$^{th}$ symbol supplied by the equalization unit 14 on the per-carrier basis to time shift the equalization vectors X'$_n$ by Tg in the time domain, and supplies equalization vectors X'$^{rot}_n$ resultant from the phase rotation to the subtraction unit 71. The subtraction unit 71 subtracts the equalization vectors X'$^{rot}_n$ supplied from the phase rotation unit 53 from the corresponding equalization vectors XE'$_{(n-1)}$ supplied from the division unit 96, and supplies difference equalization vectors XE'$_{(n-1)}$–X'$^{rot}_n$ resultant from the subtraction to the upsampling unit 72.

The upsampling unit 72, the upsampling unit 55, the multiplication unit 73, the extraction unit 74, the downsampling unit 75, the phase rotation unit 76, and the subtraction unit 77 perform substantially the same processing as the processing described above, and the subtraction unit 77 supplies the demodulation vectors YE1'$_n$ to the selection unit 101.

The selection unit 101 compares the reception quality of the demodulation vectors Y'$_n$ corresponding to the n$^{th}$ symbol supplied from the OFDM demodulation unit 13 and the reception quality of the demodulation vectors YE1'$_n$ supplied from the subtraction unit 77, and supplies the demodulation vectors with better reception quality to the delay unit 86 as demodulation vectors YE'$_n$. Note that the evaluation of the reception quality can be realized by, for example, calculating C/N values of data carriers, pilot carriers, and the like using the demodulation vectors and the channel response vectors.

(Removal of ISI and ICI Due to Preceding Wave)

The delay unit 86, the division unit 96, the phase rotation unit 53, the subtraction unit 71, the upsampling unit 72, the delay unit 81, the upsampling unit 82, the multiplication unit 83, the extraction unit 84, the downsampling unit 85, and the addition unit 87 perform the processing described above or substantially the same processing as the processing described above, and the addition unit 87 supplies the demodulation vector YE2'$_{(n-1)}$ to the selection unit 102. Note that the processing by the delay unit 86, the division unit 96, the phase rotation unit 53, the subtraction unit 71, and the upsampling unit 72 are shared by the removal processing of ISI and ICI due to the delayed wave, and are not performed separately therefrom.

The selection unit 102 compares the reception quality of the demodulation vectors YE'$_{(n-1)}$ supplied from the delay unit 86 and the demodulation vectors YE2'$_{(n-1)}$ supplied from the addition unit 87, and supplies the demodulation vectors with better reception quality to the equalization unit 16 as the demodulation vectors Y'$_{(n-1)}$. Note that the evaluation of the reception quality can be realized by, for example, calculating C/N values of data carriers, pilot carriers, and the like using the demodulation vectors and the channel response vectors.

When at least one of the calculated delayed wave ISI components, delayed wave ICI components, preceding wave ISI components, and preceding wave ICI components differs from the real delayed wave ISI components, delayed wave ICI components, preceding wave ISI components, and preceding wave ICI components, the interference removal processing on the demodulation vectors may increase an error in the demodulation vectors.

However, the interference removal unit 15e can suppress the deterioration of the reception quality due to the interference removal processing effectively by selecting either the demodulation vectors before the interference removal processing or the demodulation vectors after the interference removal processing with better reception quality.

For example, in a reception environment where there is no ISI and ICI due to a delayed wave or a preceding wave, despite the fact that the interference components pertaining to these interferences are 0, interference components calculated based on noise such as AWGN (Additive White Gaussian Noise) is not 0. In this case, removing the interference components which were not 0 due to the noise such as AWGN (Additive White Gaussian Noise) results in adding an error to the demodulation vectors. Accordingly, selecting demodulation vectors on which the interference removal processing has not been performed can effectively suppress the deterioration of the reception quality due to the interference removal processing.

Seventh Embodiment

The following describes a seventh embodiment of the present invention with reference to the drawings. An interference removal unit 15f of the present embodiment is substantially the same as the interference removal unit 15c of the third embodiment except that a function of revising equalization data supplied from the equalization unit 14 by making a hard decision on the equalization data is added. Note that the components substantially the same as those of the above-described embodiments are assigned the same reference signs and description thereof is omitted, as the description in the above-described embodiments can be referred to.

[Structure and Operations of Interference Removal Unit 15f]

Figure 19:
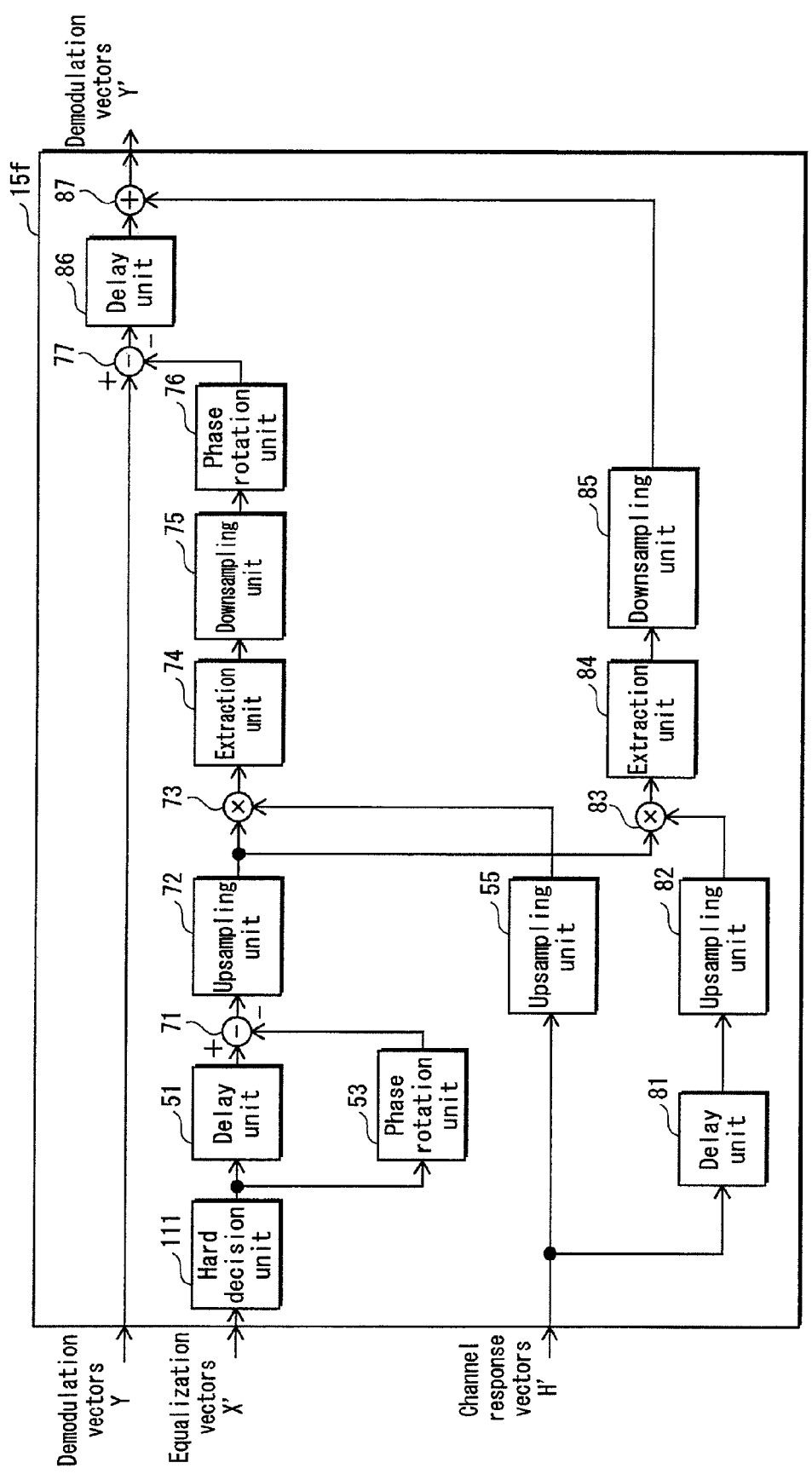
FIG. 19 shows a structure of an interference removal unit 15f of a seventh embodiment.

The structure and the operations of the interference removal unit 15f are described in the following with reference to FIG. 19. FIG. 19 shows the structure of the interference removal unit 15f.

The interference removal unit 15f is substantially the same as the interference removal unit 15b shown in FIG. 14. However, the interference removal unit 15f further includes a hard decision unit 111. The hard decision unit 111 revises the equalization vectors X' supplied from the equalization unit 14 by making a hard decision on the equalization vectors X', and supplies equalization vectors, which have been revised as a result of the hard decision, to the delay unit 51 and the phase rotation unit 53 as the equalization vectors X'.

The equalization vectors X' supplied from the equalization unit 14 to the interference removal unit 15f include estimation errors due to ISI, ICI, channel estimation errors, thermal noise, and the like. Accordingly, calculating interference components pertaining to ISI and ICI due to delayed waves and preceding waves using the equalization vectors X' as they are causes the interference components pertaining to ISI and ICI due to the delayed waves and the preceding waves to include calculation errors because of the estimation errors included in the equalization vectors X'.

The interference removal unit 15f is able to reduce the estimation errors of the equalization vectors X' by making a hard decision on the equalization vectors X'. Consequently, the calculation errors of the interference components pertaining to ISI and ICI due to the delayed waves and the preceding waves can be reduced, improving the reception quality.

Note that the channel response vectors H' also include estimation errors due to ISI, ICI, channel estimation errors, thermal noise, and the like. Accordingly, the following means can be added: a means for improving the estimation accuracy of the channel response vectors H' by performing extrapolation of channel response vectors at the positions outside the useful carriers when upsampling the channel response vectors H'. Note that the means for improve the channel estimation accuracy is not limited to this.

Eighth Embodiment

The following describes an eighth embodiment of the present invention with reference to the drawings. The interference removal unit 15b of the third embodiment signal processing in the frequency domain. On the other hand, an interference removal unit 15g of the present embodiment transforms a signal in the frequency domain to a signal in the time domain, and then removes interference by performing signal processing in the time domain.

[Structure and Operations of Interference Removal Unit 15g]

Figure 20:
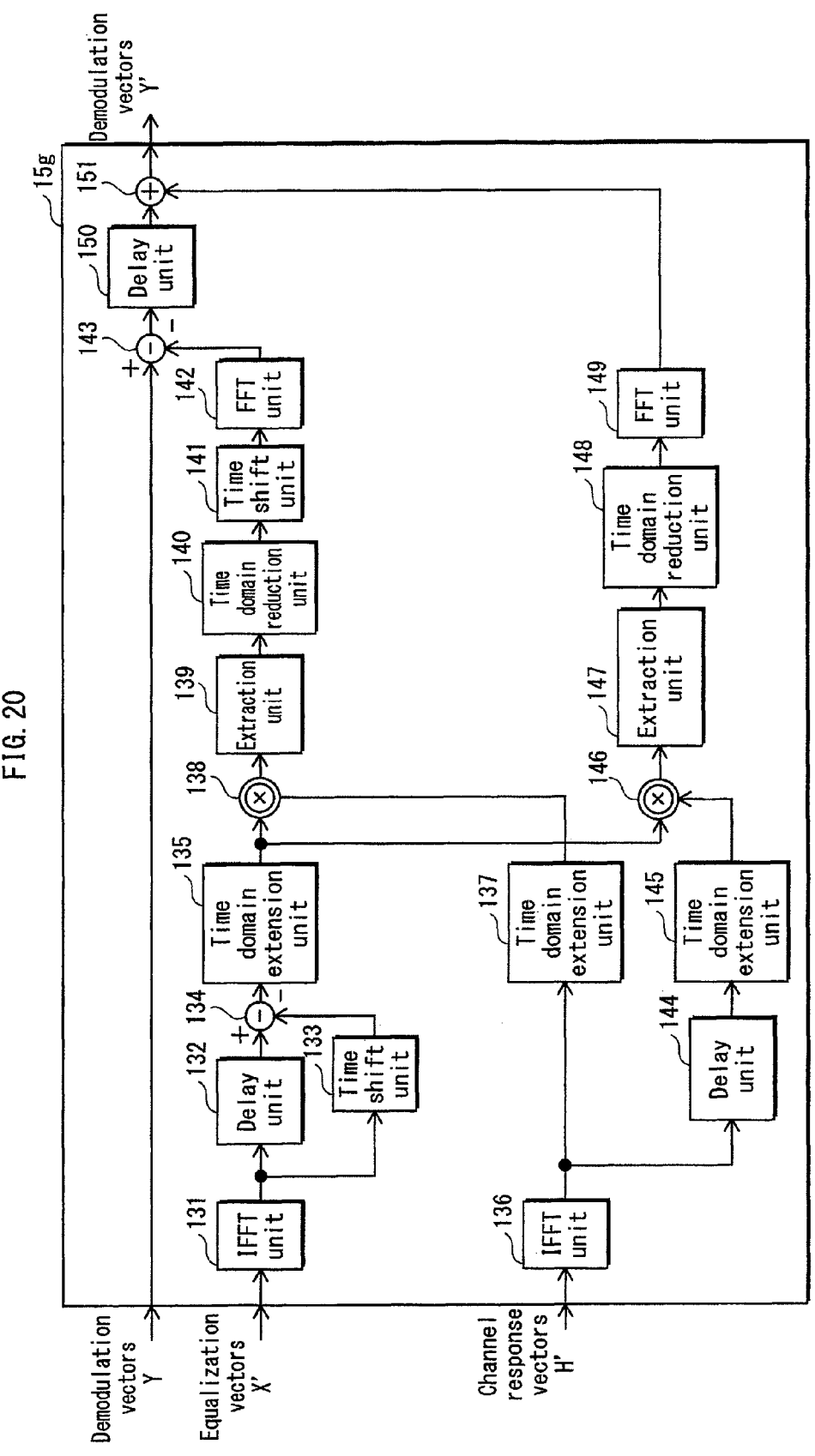
FIG. 20 shows a structure of an interference removal unit 15g of a eighth embodiment.

The structure and the operations of the interference removal unit 15g are described in the following with reference to FIG. 20. FIG. 20 shows the structure of the interference removal unit 15g.

The interference removal unit 15g includes an IFFT unit 131, a delay unit 132, a time shift unit 133, a subtraction unit 134, a time domain extension unit 135, an IFFT unit 136, a time area extension unit 137, a convolution multiplication unit 138, an extraction unit 139, a time domain reduction unit 140, a time shift unit 141, an FFT unit 142, a subtraction unit 143, a delay unit 144, a time domain extension unit 145, a convolution multiplication unit 146, an extraction unit 147, a time domain reduction unit 148, an FFT unit 149, a delay unit 150, and an addition unit 151.

The following describes the structure and the operations of the interference removal unit 15g in two parts as follows: removal of ISI and ICI due to a delayed wave; and removal of ISI and ICI due to a preceding wave. Note that the explanation is provided on, as an example, processing by the respective units in the interference removal unit 15g when the demodulation vectors Y$_n$, the equalization vectors X'$_n$, and the channel response vectors H'$_n$ corresponding to the n$^{th}$ symbol are supplied to the interference removal unit 15g.

(Removal of ISI and ICI Due to Delayed Wave)

The IFFT unit 131 performs an IFFT on the equalization vectors X' in the frequency domain corresponding to the $n^{th}$ symbol supplied from the equalization unit 14 and supplies equalized signals $x'_n$ resultant from the IFFT in the time domain to the delay unit 132 and the time shift unit 133.

The delay unit 132 delays the equalized signals $x'_n$ supplied from the IFFT unit 13 by a period of time equivalent to a processing period of one symbol, and outputs the delayed equalized signals $x'_n$. As a result, when the demodulation vectors $Y_n$, the equalization vectors $X'_n$, and the channel response vectors $H'_n$ corresponding to the $n^{th}$ symbol are supplied to the interference removal unit 15g and are to be processed by the interference removal unit 15g, the equalized signals $x'_{(n-1)}$ corresponding to the $(n-1)^{th}$ symbol are supplied from the delay unit 132 to the subtraction unit 134.

The time shift unit 133 time shifts the equalized signal $x'_n$ supplied from the IFFT unit 131 by Tg in the time domain, and supplies equalized signals $x'^{shift}_n$ resultant from the shift to the subtraction unit 134.

The subtraction unit 134 subtracts the equalized signals $x'^{shift}_n$ supplied from the time shift unit 133 from the equalized signals $x'_{(n-1)}$ supplied from the IFFT unit 131, and supplies difference equalized signals $xg'_{(n-1),n}$ resultant from the subtraction to the time domain extension unit 135.

The time domain extension unit 135 performs, on the difference equalized signals $xg'_{(n-1),n}$ having the time domain of Tu supplied from the subtraction unit 134, processing of extending the time domain to twice its size, and supplies difference equalized signals $xg'^2_{(n-1),n}$ having the time domain of 2×Tu resultant from the extension to the convolution multiplication unit 138. Note that the processing of extending the time domain to twice its size is processing of adding a signal "0" to each of durations Tu/2 respectively positioned outside the ends of the time domain of the difference equalized signals $xg'^2_{(n-1),n}$. Processing of extending the time domain to twice its size can be realized by other components in a similar manner. Note that the processing of doubling the time domain in size is a known technique, and no further detailed explanation is given here.

The IFFT unit 136 performs an IFFT on the channel response vectors $H'_n$ in the frequency domain corresponding to the $n^{th}$ symbol supplied from the equalization unit 14 and supplies channel response signals $h'_n$ in the time domain resultant from the IFFT to the time domain extension unit 137.

The time domain extension unit 137 performs, on the channel response signals $h'_n$ corresponding to the $n^{th}$ symbol supplied from the equalization unit 14, processing of extending the time domain to twice its size, and supplies channel response signals $h'^2_n$ resultant from the extension to the convolution multiplication unit 138.

The convolution multiplication unit 138 performs convolution multiplication on the difference equalized signals $xg'^2_{(n-1),n}$ supplied from the time domain extension unit 135 and the channel response signals $h'^2_n$ supplied from the time domain extension unit 137, and supplies difference demodulated signals $yg'^2_{(n-1),n}$ resultant from the convolution multiplication to the extraction unit 139.

The extraction unit 139 extracts, from the difference demodulated signals $yg'^2_{(n-1),n}$, the delayed wave ISI components related to the demodulation vectors Y' and the delayed wave ICI components related thereto, by setting signal components of the difference demodulated signals $yg'^2_{(n-1),n}$ supplied from the convolution multiplication unit 138 to be "0" for signal components in the period other than the passband seen in the time domain of the filter of the extraction unit 74 of the third embodiment. The extraction unit 139 then generates interference signals $eg1'^2_n$ indicating the extracted delayed wave ISI components and delayed wave ICI components, and supplies the generated interference signals $eg1'^2_n$ to the time domain reduction unit 140.

The time domain reduction unit 140 performs, on the interference signals $eg1'^2_n$ having the time domain of 2×Tu supplied from the extraction unit 139, processing of reducing the time domain to half its size, and supplies interference signals $eg1'_n$ having the time domain of Tu to the time shift unit 141.

The time shift unit 141 time shifts the interference signals $eg1'_n$ supplied from the time domain reduction unit 140 in the time domain by −Tg, and supplies interference signals $eg1'^{shift}_n$ resultant from the shift to the FFT unit 142.

The FFT unit 142 performs an FFT on the interference signals $eg1'^{shift}_n$ supplied from the time shift unit 141, and supplies interference vectors $EG1'^{shift}_n$ in the frequency domain resultant from the FFT to the subtraction unit 143.

The subtraction unit 143 subtracts the interference vectors $EG1'^{shift}_n$ supplied from the FFT unit 142 from the demodulation vectors $Y_n$ corresponding to the $n^{th}$ symbol supplied from the OFDM demodulation unit 13, and supplies the subtraction results as demodulation vectors $YG'_n(=Y_n - EG1'^{shift}_n)$ to the delay unit 150.

(Removal of ISI and ICI Due to Preceding Wave)

The IFFT unit 131, the delay unit 132, the time shift unit 133, the subtraction unit 134, and the time domain extension unit 135 perform the above-described processing, and the time domain extension unit 135 supplies the difference equalized signals $xg'^2_{(n-1),n}$ to the convolution multiplication unit 146. Note that these processing are shared by the removal processing of the delayed wave ISI components and the delayed wave ICI components, and are not performed separately therefrom.

The IFFT unit 136 performs an IFFT on the channel response vectors $H'_n$ in the frequency domain corresponding to the $n^{th}$ symbol supplied from the equalization unit 14, and supplies channel response signals $h'_n$ in the time domain resultant from the IFFT to the delay unit 144. Note that these processing are shared by the removal of the delayed wave ISI components and the delayed wave ICI components, and are not performed separately therefrom.

The delay unit 144 delays the channel response signals $h'_n$ supplied from the IFFT unit 136 by a period of time equivalent to a processing period of one symbol, and outputs the channel response signals $h'_n$. As a result, when the demodulation vectors $Y_n$, the equalization vectors $X'_n$, and the channel response vectors $H'_n$ corresponding to the $n^{th}$ symbol are supplied to the interference removal unit 15g and are to be processed by the interference removal unit 15g, the channel response signals $h'_{(n-1)}$ corresponding to the $(n-1)^{th}$ symbol are supplied from the delay unit 144 to the subtraction unit 145.

The time domain extension unit 145 performs, on the channel response signals $h'_{(n-1)}$ having the time domain of Tu supplied from the subtraction unit 144, processing of extending the time domain to twice its size, and supplies channel response signals $h'^2_{(n-1),n}$ having the time domain of 2×Tu, to the convolution multiplication unit 146.

The convolution multiplication unit 146 performs convolution multiplication on the difference equalized signals $xg'^2_{(n-1),n}$ supplied from the time domain extension unit 135 and the channel response signals $h'^2_{(n-1)}$ supplied from the time domain extension unit 145, and supplies difference demodulated signals $yg2'^2_{(n-1),n}$ to the extraction unit 147.

The extraction unit 147 extracts, from the difference demodulated signals $yg2'^2_{(n-1),n}$, the delayed wave ISI components related to the demodulation vectors $Y_{(n-1)}$ and the delayed wave ICI components related thereto, by setting signal components of the difference demodulated signals $yg2'^2_{(n-1),n}$ supplied from the convolution multiplication unit 146 to be "0" for signal components in the period other than the passband seen in the time domain of the filter of the extraction unit 84 of the third embodiment. The extraction unit 147 then generates interference signals $eg2'^2_{(n-1)}$ indicating the extracted preceding wave ISI components and preceding wave ICI components, and supplies the generated interference signals $eg2'^2_{(n-1)}$ to the time domain reduction unit 148.

The time domain reduction unit 148 performs, on the interference signals $eg2'^2_{(n-1)}$ having the time domain of 2×Tu supplied from the extraction unit 147, processing of reducing the time domain to half its size, and supplies interference signals $eg2'_{(n-1)}$ having the time domain of Tu to the FFT unit 149.

The FFT unit 149 performs an FFT on the interference signals $eg2'_{(n-1)}$ supplied from the time domain reduction unit 148, and supplies interference vectors $EG2'_{(n-1)}$ in the frequency domain resultant from the FFT to the addition unit 151.

The delay unit 150 delays the demodulation vectors YG' supplied from the subtraction unit 143 by a period of time equivalent to a processing period of one symbol, and outputs the delayed demodulation vectors YG'. As a result, when the demodulation vectors $Y_n$, the equalization vectors $X'_n$, and the channel response vectors $H'_n$ corresponding to the $n^{th}$ symbol are supplied to the interference removal unit 15g and are to be processed by the interference removal unit 15g, the demodulation vectors $YG'_{(n-1)}$ are supplied from the delay unit 150 to the addition unit 151. The demodulation vectors $YG'_{(n-1)}$ were supplied from the subtraction unit 143 to the delay unit 150 when the demodulation vectors $Y_{(n-1)}$, the equalization vectors $X'_{(n-1)}$, and the channel response vectors $H'_{(n-1)}$ corresponding to the $(n-1)^{th}$ symbol were supplied to the interference removal unit 15g and processed by the interference removal unit 15g.

The addition unit 151 adds the demodulation vectors $YG'_{(n-1)}$ supplied from the delay unit 150 to the corresponding interference vectors $EG2'_{(n-1)}$ supplied from the FFT unit 149, respectively, and supplies the addition results as demodulation vectors $Y'_{(n-1)}(=YG'_{(n-1)}-EG2'_{(n-1)})$ to the equalization unit 16.

Ninth Embodiment

The following describes a ninth embodiment of the present invention with reference to the drawings. While the receiver of the first embodiment is configured to perform the interference removal processing in one stage, a receiver 1h of the present embodiment is configured to perform the interference removal processing in two stages. Note that the components substantially the same as those of the above-described embodiments are assigned the same reference signs and description thereof is omitted, as the description in the above-described embodiments can be referred to.

<Structure and Operations of Receiver 1h>

Figure 21:
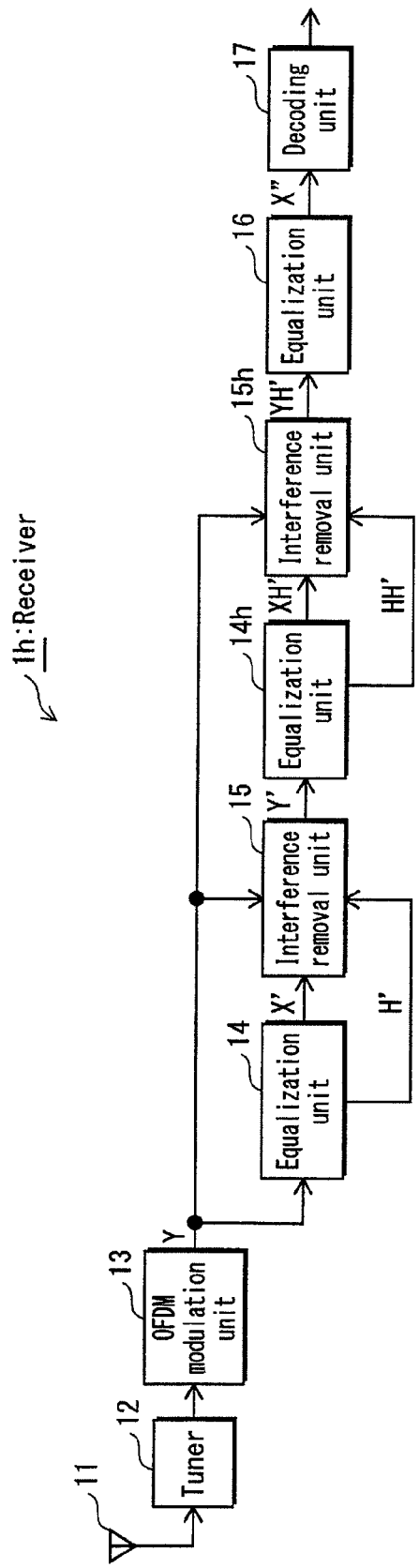
FIG. 21 shows a structure of a receiver 1h of a ninth embodiment.

The following describes the structure and the operations of the receiver 1h of the present embodiment with reference to FIG. 21. FIG. 21 shows the structure of the receiver 1h of the present embodiment. The receiver 1h is substantially the same as the receiver 1 shown in FIG. 3; however, the receiver 1h further includes an equalization unit 14h and an interference removal unit 15h.

The antenna 11, the tuner 12, the OFDM demodulation unit 13, the equalization unit 14, and the interference removal unit 15 perform the above-described processing; the OFDM demodulation unit 13 supplies the demodulation vectors Y to the equalization unit 14, the interference removal unit 15, and the interference removal unit 15h; and the interference removal unit 15 supplies the demodulation vectors Y' to the equalization unit 14h.

The equalization unit 14h (i) estimates channel response vectors HH' based on the demodulation vectors Y' supplied from the interference removal unit 15, (ii) calculates equalization vectors XH' by equalizing the demodulation vectors Y' based on the estimated channel response vectors HH', and (iii) supplies the channel response vectors HH' and the equalization vectors XH' to the interference removal unit 15h. Note that a structure in which the demodulation vectors Y' are input in FIG. 5 instead of the demodulation vectors Y can be applied to the equalization unit 14h.

The interference removal unit 15h, with use of the channel response vectors HH' and the equalization vectors XH' supplied from the equalization unit 14h, performs processing of removing ISI and ICI from the demodulation vectors Y supplied from the OFDM demodulation unit 13, and supplies the resultant demodulation vectors YH' to the equalization unit 16. Note that a structure in which the demodulation vectors Y, the equalization vectors XH', and the channel response vectors HH' are input in FIG. 6 instead of the demodulation vectors Y, the equalization vectors X', and the channel response vectors H' can be applied to the interference removal unit 15h.

The equalization unit 16 and the decoding unit 17 perform substantially the same processing as the above-described processing.

The receiver 1h of the present embodiment performs the removal processing of error components pertaining to ISI and ICI with respect to the demodulation vectors in two stages. Accordingly, ISI and ICI can be removed more efficiently, which leads to an improvement in the reception quality. Additionally, because the receiver 1h has a feed-forward structure, the block used for performing the interference removal processing can be easily connected.

Tenth Embodiment

The following describes a tenth embodiment of the present invention with reference to the drawings. A receiver 1i of the present embodiment is substantially the same as the receiver 1 of the first embodiment except that the structure used by the interference removal unit 15 for generating the equalization vectors and the channel response data is simplified to reduce the circuit scale and the calculation amount. Note that the components substantially the same as those of the above-described embodiments are assigned the same reference signs and description thereof is omitted, as the description in the above-described embodiments can be referred to.

<Structure and Operations of Receiver 1i>

Figure 22:
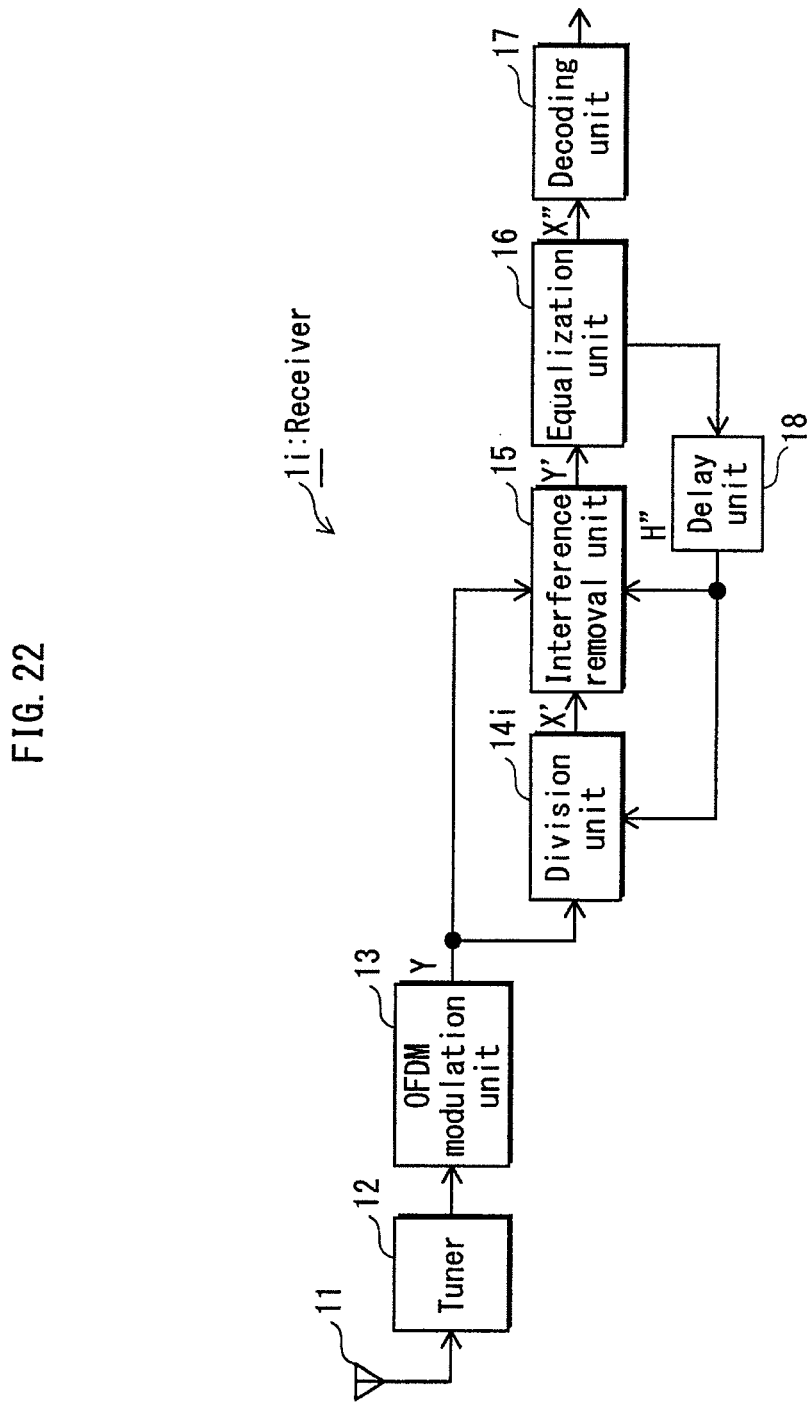
FIG. 22 shows a structure of a receiver 1i of a tenth embodiment.

The following describes the structure and the operations of the receiver 1i of the present embodiment with reference to FIG. 22. FIG. 22 shows the structure of the receiver 1i of the present embodiment. The receiver 1i is substantially the same as the receiver 1 shown in FIG. 3; however, the receiver 1i includes a division unit 14i instead of the equalization unit 14, and includes a delay unit 18 for delaying the channel response vectors H" output by the equalization unit 16 and supplying the delayed channel response vectors H" to the division unit 14i and the interference removal unit 15.

The antenna 11, the tuner 12, and the OFDM demodulation unit 13 perform the above-described processing, and the OFDM demodulation unit 13 supplies the demodulation vectors Y to the division unit 14i and the interference removal unit 15.

Here, the explanation is provided on, as an example, the processing by the division unit 14i and the interference removal unit 15 when the demodulation vectors $Y_n$ are supplied to the division unit 14i and the interference removal unit 15.

The delay unit 18 delays the channel response vectors H" supplied from the equalization unit 16 by a period of time equivalent to a processing period of one symbol, and outputs the delayed channel response vectors H". As a result, when the demodulation vectors $Y_n$ are supplied to the division unit 14i and the interference removal unit 15, channel response vectors $H''_m$ corresponding to the $m^{th}$ symbol are supplied from the delay unit 18 to the division unit 14i and the interference removal unit 15. The channel response vectors $H''_m$ corresponding to the $m^{th}$ symbol were supplied from the equalization unit 16 to the delay unit 18 when the demodulation vectors $Y_{(n-1)}$ corresponding to the $(n-1)^{th}$ symbol were supplied to the division unit 14i and interference removal unit 15 and processed by the division unit 14i, the interference removal unit 15, and the equalization unit 16. Note that with consideration given to being delayed by the division unit 14i, the interference removal unit 15, and the equalization unit 16, the channel response vectors supplied from the equalization unit 16 to the delay unit 18 are expressed as the $m^{th}$ symbol.

The division unit 14i divides the demodulation vectors $Y_n$ supplied from the OFDM demodulation unit 13 by the corresponding channel response vectors $H''_m$ supplied from the delay unit 18, respectively, and supplies the division results, i.e. the equalization vectors $X'_n$ to the interference removal unit 15.

The interference removal unit 15, with use of the equalization vectors $X'_n$ supplied from the division unit 14i and the channel response vectors $H''_m$ supplied from the OFDM demodulation unit 13, performs processing of removing ISI and ICI from the demodulation vectors $Y'_n$ supplied from the OFDM demodulation unit 13, and supplies the resultant demodulation vectors $Y'_n$ to the equalization unit 16. Note that the processing by the interference removal unit 15 of the present embodiment is performed with the equalization vectors X' supplied from the equalization unit 14 replaced with the equalization vectors X' supplied from the division unit 14i, and the channel response vectors H' supplied from the equalization unit 14 replaced with the channel response vectors H" supplied from the delay unit 18.

The equalization unit 16 estimates channel response vectors H" based on the demodulation vectors Y' supplied from the interference removal unit 15, and calculates equalization vectors X" by equalizing the demodulation vectors Y' based on the estimated channel response vectors H". The equalization unit 16 then supplies the equalization vectors X" to the decoding unit 17 and the channel response vectors H" to the delay unit 18. The decoding unit 17 performs substantially the same processing as the above-described processing and outputs transmission information.

The receiver 1i of the present embodiment performs, on the demodulation vectors Y, the processing for removing ISI and ICI using the channel response vectors H" estimated based on the demodulation vectors Y' from which ISI and ICI have been removed. Accordingly, interference components pertaining to ISI and ICI are calculated with better accuracy, which leads to an improvement in the reception quality. Also, because the equalization unit 16 is the only component which performs channel equalization, the circuit scale and the calculation amount can be reduced.

Furthermore, the channel response vectors H" are estimated using the demodulation vectors Y' generated by performing the processing of removing the interference components, and demodulation vectors Y' are generated by performing the processing of removing the interference components on the demodulation vectors Y with the estimated channel response vectors H" fed back. Accordingly, an effect of repeatedly removing interference components is achieved for the channel response vectors H", whereby the reception quality is improved.

Note that the division unit 14i and the interference removal unit 15 perform processing using the channel response vectors H" which temporally precede the demodulation vectors Y to be processed. Accordingly, in a case where frequency deviation exists among transmission stations or channel responses vary in time due to movement of the receiver, the quality of the received image deteriorates. In view of this, the channel response data may be predicted using such as extrapolation processing to improve robustness against frequency variance.

Eleventh Embodiment

The following describes an eleventh embodiment of the present invention with reference to the drawings. A receiver 1j of the present embodiment is substantially the same as the receiver 1 of the first embodiment. However, the structure for removing interference is modified with respect to that of the receiver 1. Note that the components substantially the same as those of the above-described embodiments are assigned the same reference signs and description thereof is omitted, as the description in the above-described embodiments can be referred to.

<Structure and Operations of Receiver 1j>

Figure 23:
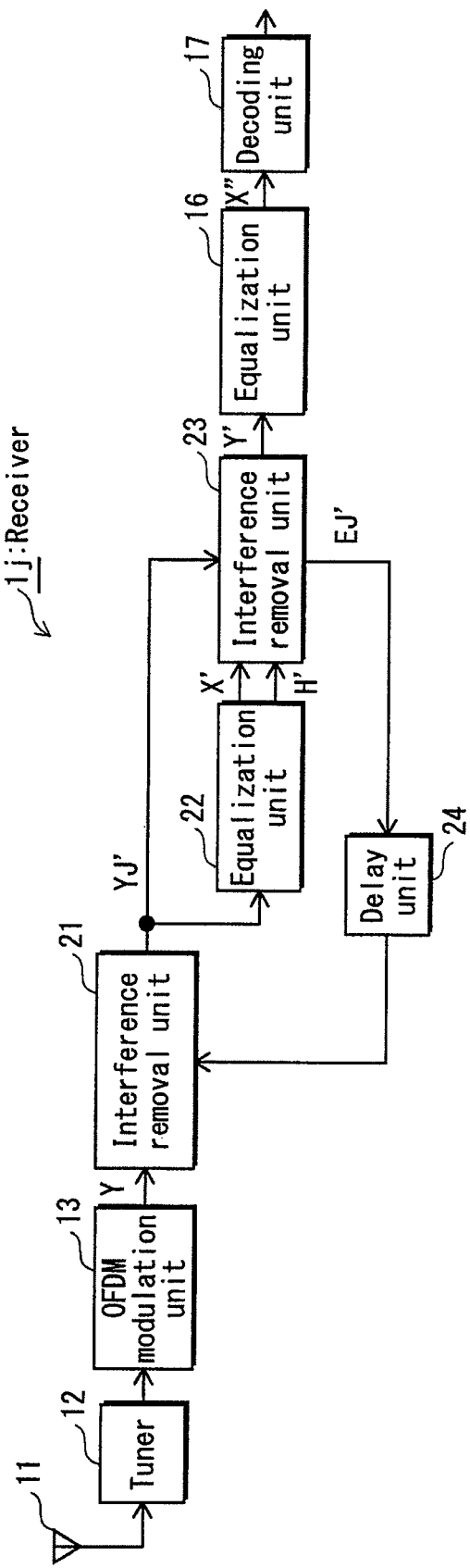
FIG. 23 shows a structure of a receiver 1j of an eleventh embodiment.

The following describes the structure and the operations of the receiver 1j of the present embodiment with reference to FIG. 23. FIG. 23 shows the structure of the receiver 1j of the present embodiment. The receiver 1i is substantially the same as the receiver 1 shown in FIG. 3; however, the receiver 1i includes a block composed of an interference removal unit 21, an equalization unit 22, an interference removal unit 23, and a delay unit 24 instead of a block composed of the equalization unit 14 and the interference removal unit 15.

The antenna 11, the tuner 12, and the OFDM demodulation unit 13 perform the above-described processing, and the OFDM demodulation unit 13 supplies the demodulation vectors Y to the interference removal unit 21.

Here, the explanation is provided on, as an example, processing by the interference removal unit 21 and the like when the demodulation vectors $Y_n$ are supplied to the interference removal unit 21.

The delay unit 24 delays the delay ISI vectors EJ' indicating interference components pertaining to ISI due to a delayed wave by a period of time equivalent to a processing period of one symbol, and outputs the delayed delay ISI vectors EJ'. As a result, when the demodulation vectors $Y_n$ are supplied to the interference removal unit 21, delay ISI vectors $EJ'_n$ indicating the interference components pertaining to ISI related to the demodulation vectors $Y_n$ are supplied from the delay unit 24 to the interference removal unit 21. The delay ISI vectors $EJ'_n$ were supplied from the interference removal unit 23 to the delay unit 24 when the demodulation vectors $Y_{(n-1)}$ corresponding to the $(n-1)^{th}$ symbol were supplied to the interference removal unit 21 and processed by the interference removal unit 21, the equalization unit 22, and the interference removal unit 23.

Figure 24:
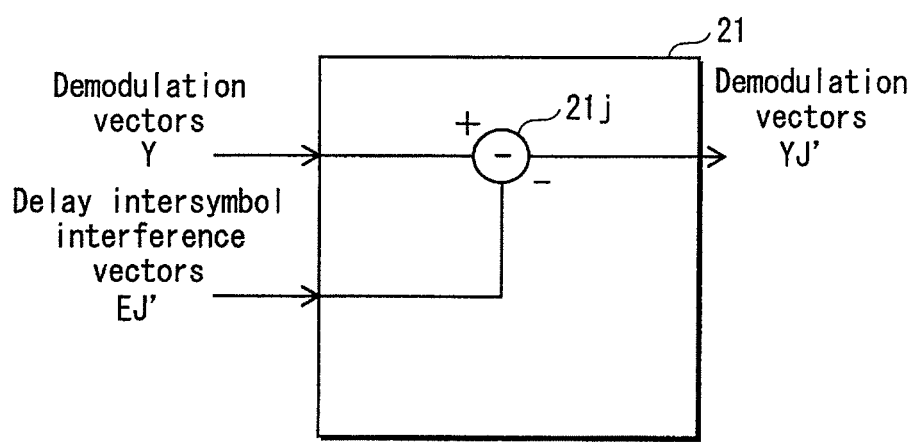
FIG. 24 shows a structure of an interference removal unit 21 shown in FIG. 23.

The interference removal unit 21 includes a subtraction unit 21j as shown in FIG. 24. The subtraction unit 21j in the interference removal unit 21 subtracts, from the demodulation vectors $Y_n$ corresponding to the $n^{th}$ symbol supplied from the OFDM demodulation unit 13, corresponding delay ISI vectors $EJ'_n$ indicating the interference components pertaining to ISI due to the delayed wave related to the demodulation vectors $Y_n$ supplied from the delay unit 24, respectively, and supplies demodulation vectors $YJ'_n$ ($=Y_n-EJ'_n$) resultant from the subtraction to the equalization unit 22 and the interference removal unit 23.

The equalization unit 22 estimates the channel response vectors H' based on the demodulation vectors YJ' supplied from the interference removal unit 21, and calculates the equalization vectors X' by equalizing the demodulation vectors YJ' based on the estimated channel response vectors H'. The equalization unit 22 then supplies the estimated channel response vectors H' and the calculated equalization vectors X' to the interference removal unit 23. As a result, the equalization vectors $X'_n$ and the channel response vectors $H'_n$ are supplied from the equalization unit 22 to the interference removal unit 23. Note that a structure in which the demodulation vectors Y' are input in FIG. 5 instead of the demodulation vectors Y can be applied to the equalization unit 22.

The interference removal unit 23, with use of the equalization vectors $X'_n$ and the channel response vectors $H'_n$ supplied from the equalization unit 22, supplies delay ISI vectors $EJ'_{(n+1)}$ indicating the interference components pertaining to ISI due to the delayed wave related to the demodulation vectors $Y_{(n+1)}$ to the delay unit 24. The interference removal unit 23 also performs, with use of the equalization vectors $X'_n$ and the channel response vectors $H'_m$ supplied from the equalization unit 22, processing of removing, from the demodulation vectors $YJ'_n$, the interference components pertaining to ICI due to the delayed waves and interference components pertaining to ISI and ICI due to the preceding wave, and supplies the resultant demodulation vectors $Y'_n$ to the equalization unit 16.

The equalization unit 16 and the decoding unit 17 perform substantially the same processing as the above-described processing.

[Structure and Operations of Interference Removal Unit 23]

Figure 25:
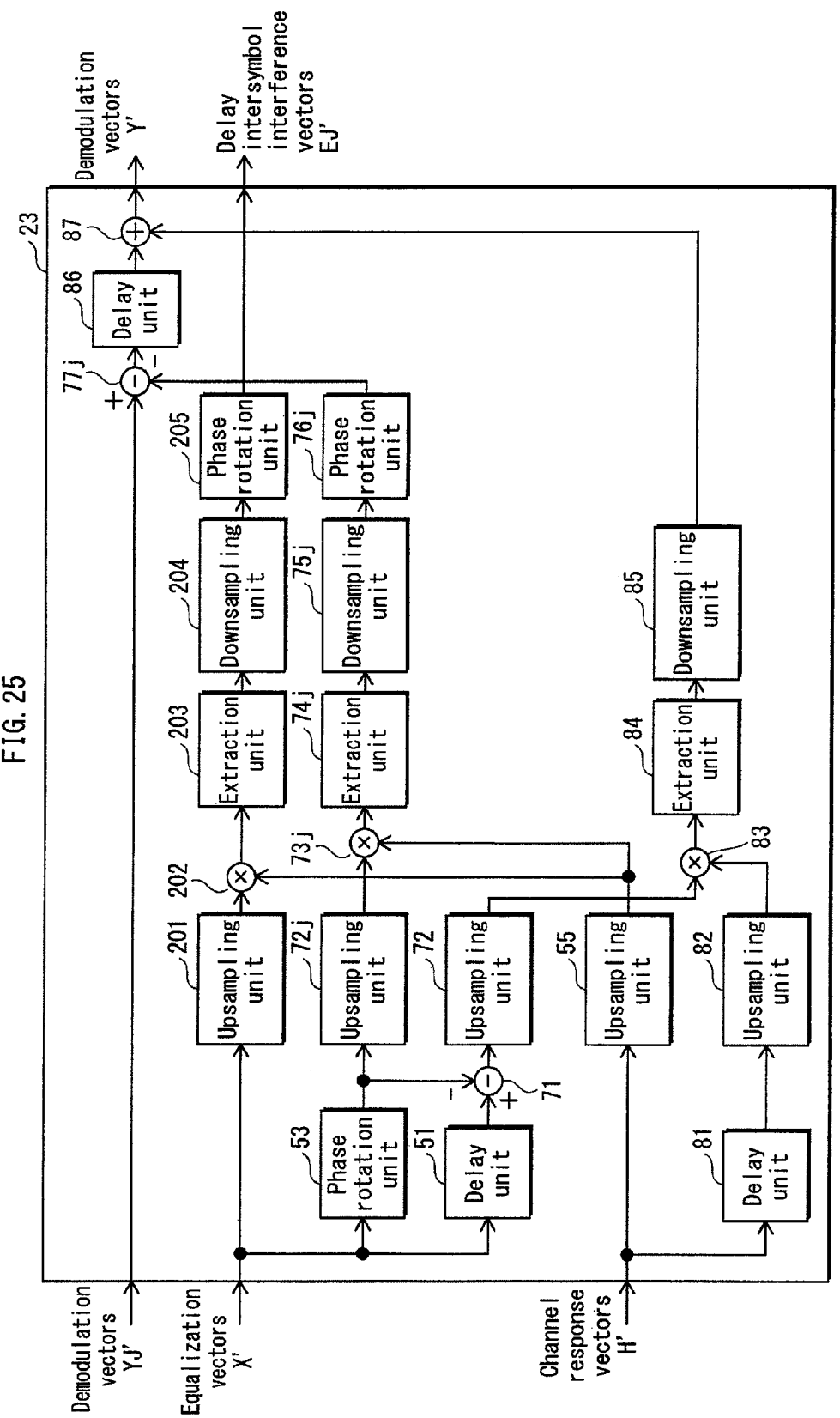
FIG. 25 shows a structure of an interference removal unit 23 shown in FIG. 23.

The structure and the operations of the interference removal unit 23 shown in FIG. 23 are described in the following with reference to FIG. 25. FIG. 25 shows the structure of the interference removal unit 23 shown in FIG. 23.

The interference removal unit 23 includes the delay unit 51, the phase rotation unit 53, the subtraction unit 71, the upsampling unit 72, the delay unit 81, the upsampling unit 82, the multiplication unit 83, the extraction unit 84, the downsampling unit 85, the delay unit 86, the addition unit 87, the upsampling unit 55, an upsampling unit 72j, a multiplication unit 73j, an extraction unit 74j, a downsampling unit 75j, a phase rotation unit 76j, a subtraction unit 77j, an upsampling unit 201, a multiplication unit 202, an extraction unit 203, a downsampling unit 204, and a phase rotation unit 205.

The following describes the structure and the operations of the interference removal unit 23 in three parts as follows: calculation of interference components pertaining to ISI due to a delayed wave; removal of ICI due to the delayed wave; and removal of ISI and ICI due to a preceding wave. Note that the explanation is provided on, as an example, processing by the respective units in the interference removal unit 23 when the demodulation vectors $YJ_n$, the equalization vectors $X'_n$, and the channel response vectors $H'_n$ corresponding to the $n^{th}$ symbol are supplied to the interference removal unit 23.

(Calculation of Interference Components Pertaining to Intersymbol Interference Due to Delayed Wave)

The upsampling unit 201 upsamples the equalization vectors $X'_n$ corresponding to the $n^{th}$ symbol supplied from the equalization unit 22 by a factor of 2, and supplies equalization vectors $X'^2_n$ resultant from the upsampling to the multiplication unit 202.

The upsampling unit 55 upsamples the channel response vectors $H'_n$ corresponding to the $n^{th}$ symbol supplied from the equalization unit 22 by a factor of 2, and supplies channel response vectors $H'^2_n$ resultant from the upsampling to the multiplication unit 202.

The multiplication unit 202 multiplies the equalization vectors $X'^2_n$ supplied from the upsampling unit 201 by the corresponding channel response vectors $H'^2_n$ supplied from the upsampling unit 55, respectively, and supplies demodulation vectors $YJ1'^2_n$ resultant from the multiplication to the extraction unit 203.

The extraction unit 203 is constituted from, for example, an FIR filter, and has the transfer function of the same passband as that of the extraction unit 84 of the third embodiment. The extraction unit 203 (i) extracts the delayed wave ISI components related to demodulation vectors $Y_{(n+1)}$ from the demodulation vectors $YJ1'^2_n$ by performing filter processing on the demodulation vectors $YJ1'^2_n$ supplied from the multiplication unit 202, (ii) generates delay ISI vectors $EJ1'^2_{(n+1)}$ indicating the extracted delayed wave ISI components, and (iii) supplies the generated delay ISI vectors $EJ1'^2_{(n+1)}$ to the downsampling unit 204.

The downsampling unit 204 downsamples the delay ISI vectors $EJ1'^2_{(n+1)}$ supplied from the extraction unit 203 by a factor of ½, and supplies delay ISI vectors $EJ1'_{(n+1)}$ resultant from the downsampling to the phase rotation unit 205.

The phase rotation unit 205 phase-rotates the delay ISI vectors $EJ1'_{(n+1)}$ supplied from the downsampling unit 205 on a per-carrier basis to time shift the delay ISI vectors $EJ1'_{(n+1)}$ by $-Tg$ in the time domain, and supplies delay ISI vectors $EJ1'^{rot}_{(n+1)}$ resultant from the phase rotation as the delay ISI vectors $EJ'_{(n+1)}$ to the delay unit 24.

(Removal of ICI Due to Delayed Wave)

The phase rotation unit 53 phase-rotates the equalization vectors $X'_n$ corresponding to the $n^{th}$ symbol supplied by the equalization unit 22 on the per-carrier basis to time shift the equalization vectors $X'_n$ by $Tg$ in the time domain, and supplies equalization vectors $X'^{rot}_n$ resultant from the phase rotation to the upsampling unit 72j.

The upsampling unit 72j upsamples the equalization vectors $X'^{rot}_n$ supplied from the phase rotation unit 53 by a factor of 2, and supplies equalization vectors $X'^{rot2}_n$ resultant from the upsampling to the multiplication unit 73j.

The upsampling unit 55 upsamples the channel response vectors $H'_n$ corresponding to the $n^{th}$ symbol supplied by the equalization unit 22 by a factor of 2, and outputs channel response vectors $H'^2_n$ resultant from the upsampling to the multiplication unit 73j. Note that this processing is shared by the calculation of the delayed wave ISI components, and is not performed separately therefrom.

The multiplication unit 73j multiplies the equalization vector equalization vectors $X'^{rot2}_n$ supplied from the upsampling unit 72j by the channel response vector channel response vectors $H'^2_n$ supplied from the upsampling unit 55 on the per-carrier basis, and supplies demodulation vectors $YJ2'^2_n$ resultant from the multiplication to the extraction unit 74j.

The extraction unit 74j is constituted from, for example, an FIR filter, and has the same transfer function of the passband as the extraction unit 84 of the third embodiment. The extraction unit 74j (i) extracts the delayed wave ICI components related to the demodulation vectors $Y_n$ from the demodulation vectors $YJ2'^2_n$ supplied from the multiplication unit 73j by performing filter processing on the demodulation vectors $YJ2'^2_n$, (ii) generates interference vectors $EJ2'^2_n$ indicating the extracted delayed wave ICI components, and (iii) supplies the generated interference vectors $EJ2'^2_n$ to the downsampling unit 75j.

The downsampling unit 75j downsamples the interference vectors $EJ2'^2_n$ supplied from the extraction unit 74j by a factor of ½, and supplies interference vectors $EJ2'_n$ resultant from the downsampling to the phase rotation unit 76j.

The phase rotation unit 76j phase-rotates the interference vectors $EJ2'_n$ supplied from the downsampling unit 75j on the per-carrier basis to time shift the interference vectors $EJ2'_n$ by $-Tg$ in the time domain, and supplies interference vectors $EJ2'^{rot}_n$ resultant from the phase rotation to the subtraction unit 77J.

The subtraction unit 77j subtracts the interference vectors $EJ2'^{rot}_n$ supplied from the phase rotation unit 76j, from the corresponding demodulation vectors $YJ_n$ supplied from the phase rotation unit 76j, respectively, and outputs the subtraction results as demodulation vectors $YJA'_n (=YJ_n-EJ2'^{rot}_n)$.

(Removal of ISI and ICI Due to Preceding Wave)

The delay unit 51, the phase rotation unit 53, the subtraction unit 71, the upsampling unit 72, the delay unit 81, the upsampling unit 82, the multiplication unit 83, the extraction unit 84, and the downsampling unit 85 perform the above-described processing, and the downsampling unit 85 supplies the interference vectors $EB'_{(n-1)}$ to the addition unit 87. Note that the processing by the phase rotation unit 53 is shared by the removal of ICI due to the delayed wave, and are not performed separately therefrom.

The delay unit 86 delays demodulation vectors YJA' supplied from the subtraction unit 77j by a period of time equivalent to a processing period of one symbol, and outputs the delayed demodulation vector YJA'. As a result, when the demodulation vectors $YJ'_n$, the equalization vectors $X'_n$, and the channel response vectors $H'_n$ corresponding to the $n^{th}$ symbol are supplied to the interference removal unit 23 and are to be processed by the interference removal unit 23, demodulation vectors $YJA'_{(n-1)}$ are supplied from the delay unit 86 to the addition unit 87. The demodulation vectors $YJA'_{(n-1)}$ were supplied from the subtraction unit 77j to the delay unit 86 when the demodulation vectors $YJ'_{(n-1)}$, the equalization vectors $X'_{(n-1)}$, and the channel response vectors $H'_{(n-1)}$ corresponding to the $(n-1)^{th}$ symbol were supplied to the interference removal unit 23 and processed by the interference removal unit 23.

The addition unit 87 adds the demodulation vector $YJA'_{(n-1)}$ supplied from the delay unit 86 to the corresponding interference vectors $EB'_{(n-1)}$ supplied from the phase downsampling unit 85, respectively, and supplies the addition results as demodulation vectors $Y'_{(n-1)} (=YJA'_{(n-1)}+EB'_{(n-1)})$ to the equalization unit 16.

The receiver 1j of the present embodiment first removes the interference components pertaining to ISI due to a delayed wave from the demodulation vectors, then with use of the demodulation vectors from which the interference components pertaining to ISI due to the delayed wave have been removed, calculates the interference components pertaining to ICI due to the delayed wave, ISI due to a preceding wave, and ICI due to the preceding wave. Accordingly, the interference components can be calculated more accurately, achieving an improvement in the reception quality.

Twelfth Embodiment

The following describes a twelfth embodiment of the present invention with reference to the drawings. While the third embodiment processes OFDM transmission signals each having an guard interval period attached thereto, the present embodiment processes OFDM transmission signals having no guard interval period attached thereto. Note that the components substantially the same as those of the above-described embodiments are assigned the same reference signs and description thereof is omitted, as the description in the above-described embodiments can be referred to.

[Structure and Operations of Interference Removal Unit 15k]

Figure 26:
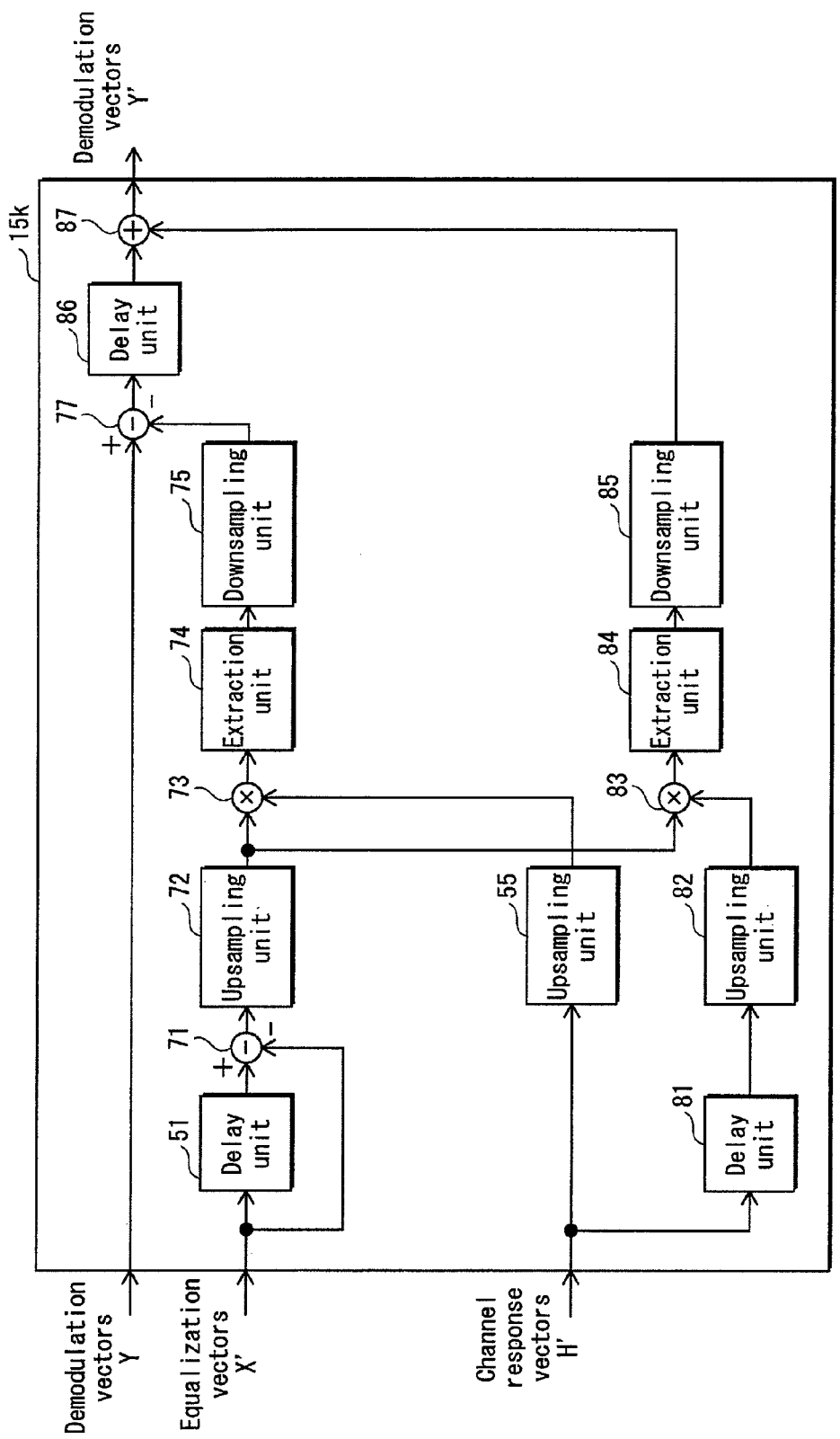
FIG. 26 shows a structure of an interference removal unit 15k of a twelfth embodiment.

The structure and the operations of the interference removal unit 15k are described in the following with reference to FIG. 26. FIG. 26 shows the structure of the interference removal unit 15k.

The present embodiment processes OFDM transmission signals having no guard interval period attached thereto. Accordingly, the present embodiment has a structure in which the phase rotation unit 53 and the phase rotation unit 76 are removed from the interference removal unit 15b shown in FIG. 14. Note that the passband of the transfer function of the filter processing by the extraction unit 74 and the extraction unit 84 is the same as the passband described with reference to FIG. 8 except that Tg=0 in the present embodiment.

<<Additional Notes>>

The present invention is not limited to the above embodiments, and may be implemented in any forms as long as the aim of the present invention and other relevant/accompanying aims can be achieved. The following cases are also possible.

(1) Each of the embodiments above is described by taking an example of the OFDM transmission method. However, the transmission method is not limited to this, and the present invention can be applied to a frequency division multiplexing transmission method using a plurality of carriers which are not orthogonal to each other.

(2) According to each of the embodiments above, the equalization unit 14 has the structure shown in FIG. 5. However, the structure of the equalization unit 14 is not limited to this, and can have any structure as long as it is able to estimate channel response vectors and calculate equalization vectors, with use of the demodulation vectors Y. Note that the same can be said for the other equalization units.

(3) The embodiments above adopt a combination of upsampling processing by a factor of 2 and downsampling processing by a factor of ½. However, not limited to this, the combination can be a combination of upsampling processing by a factor of N (a number greater than 1 except for 2) and downsampling processing by a factor of 1/N. Note that it is preferable that N be set in a manner that adjacent periodic components in the output signals of the multiplication units 56 and 60 do not interfere with each other.

Also, the eighth embodiment adopts a combination of the processing of extending the time domain to twice its size and the processing of reducing the time domain to half its size. However, not limited to this, the combination can be a combination of processing of extending the time domain to N times its size (N being a number greater than 1 except for 2) and processing of reducing the time domain to 1/N its size.

(4) The sequential order of the components in each of the embodiments above can be changed as long as the output signals are the same. For example, in terms of order, the delay unit 51 and the upsampling unit 52 are interchangeable; the phase rotation unit 53 and the upsampling unit 54 are interchangeable; the downsampling unit 58 and the phase rotation unit 59 are interchangeable; and the downsampling unit 62 and the phase rotation unit 63 are interchangeable. Also, in each of the second and third embodiments, the order of the downsampling unit 75 and the phase rotation unit 76 can be interchanged. It should be noted that when performing the phase rotation by −Tg or Tg in the time domain on the per-carrier basis, it is necessary to change the amount of the phase rotation in the frequency domain appropriately with discrete frequency intervals taken into consideration.

(5) In the sixth embodiment above, the description is given on the exemplary case where the selection units 101 and 102 are added to the interference removal unit 15d of the fifth embodiment. However, the structure is not limited to this, and the following selection unit may be added to an interference removal unit described in another embodiment or described as a modification: a selection unit which compares the reception quality of the demodulation vectors before the interference removal and the reception quality of the demodulation vectors after the interference removal, and selects and outputs the demodulation vectors with better reception quality.

(6) In the seventh embodiment, the description is given on the case where the hard decision unit 111 is added to the interference removal unit 15b of the third embodiment. However, the structure is not limited to this, and for example, the hard decision unit 111 may be added to an interference removal unit which receives equalization vectors, described in another embodiment or described as a modification.

(7) The interference removal unit 15b of the eighth embodiment is a modification of the interference removal unit 15b of the third embodiment, and performs the calculation of the interference components in the time domain. However, the modification is not limited to this, and an interference removal unit described in another embodiment or described as a modification may be modified to perform the calculation of the interference components in the time domain. Note that although IFFT is used for transforming the signals in the frequency domain to the signals in the time domain, the method is not limited to this, and any method can be adopted as long as it is able to transform signals in the frequency domain to signals in the time domain. Also, although FFT is used for transforming the signals in the time domain to the signals in the frequency domain, the method is not limited to this, and any method can be adopted as long as it is able to transform signals in the time domain to signals in the frequency domain.

(8) In the ninth embodiment, the receiver 1h performs the interference removal processing in two stages including the block composed of the equalization unit 14 and the interference removal unit 15 and the block composed of the equalization unit 14h and the interference removal unit 15h. However, the structure is not limited to this, and the interference removal processing may be performed in three or more stages. Similarly, the receivers 1i and 1j of the tenth and eleventh embodiments may include two or more blocks of components to perform the interference removal processing in two or more stages.

(9) In the ninth embodiment, the receiver 1h includes, as its interference removal units, the interference removal unit 15 of the first embodiment and the interference removal unit 15h which is equivalent to the interference removal unit 15; and in the tenth embodiment, the receiver 1i includes the interference removal unit 15 of the first embodiment as its interference removal unit. However, the structures are not limited to these, and for example, these interference removal units may be replaced with interference removal units, described in other embodiments or described as modifications, which receive demodulation vectors, equalization vectors, and channel response vectors.

(10) The interference removal units in the embodiments above except the interference removal unit 15b of the third embodiment can be changed to an interference removal unit for OFDM transmission signals having no guard interval period attached thereto by removing the phase rotation unit and the shift unit.

(11) Appropriate addition or removal can be performed with respect to the components in the embodiments above so as to be able to remove only the interference components desired to be removed, among from the ICI components due to the delayed wave, the ICI components due to the delayed wave, the ISI components due to the preceding wave, and the ICI components due to the preceding wave.

(12) In the embodiments above, the passband of the filter of each extraction unit which operates in the frequency domain is fixed. However, not limited to this, the passband of the filter may be adjusted adaptively according to the propagation channel status. Also, in the embodiments above, the time domain extracted by each extraction unit which operates in the time domain is fixed; however, the time domain to be extracted may be changed adaptively according to the channel propagation status.

(13) The structures of the embodiments and the like above may be typically realized as a LSI (Large Scale Integration) which is an integrated circuit. These structures may be separately accumulated as an individual chip. Or, part or all of these structures may be included on one chip.

Here, the LSI may be an IC, a system LSI, a super LSI, or ultra LSI, depending on the degree of integration.

Furthermore, the integration of circuits is not limited to being realized with LSI, but may be realized with a dedicated circuit or a general-use processor. Alternatively, the integration may be realized with use of an FPGA (Field Programmable Gate Array) that is programmable after manufacturing of the LSI, or a re-configurable processor that enables re-configuration of the connection and settings of circuit cells in the LSI.

Additionally, if a semiconductor technology or related technologies give birth to a new circuit-integrating technology that would replace the LSI, such technologies may be used for integrating the functional blocks. One such possibility is an application of biotechnology.

INDUSTRIAL APPLICABILITY

The present invention is applicable to a receiver that removes ISI and ICI from transmission signals including a plurality of carriers frequency-division multiplexed therein.

The invention claimed is:
1. A receiver that receives transmission signals, which have been generated by multiplexing a plurality of modulated carriers, and that demodulates the received transmission signals, the receiver comprising:
 a transform unit operable to extract, for each symbol, a transmission signal having a duration of a useful symbol period from the received transmission signals in a time domain, and operable to transform the extracted transmission signal into demodulated data in a frequency domain;
 an equalization unit operable to estimate channel response data in the frequency domain based on the demodulated data, and operable to calculate equalized data in the frequency domain by equalizing the demodulated data based on the estimated channel response data; and an interference removal unit operable to, for each symbol, (i) perform upsample processing on the equalized data and the estimated channel response data so as to respectively obtain upsampled equalized data and upsampled channel response data, (ii) calculate, interference data indicating an interference component pertaining to at least one of intersymbol interference and intercarrier interference based on the upsampled equalized data and the upsampled channel response data, and (iii) perform, on the demodulated data, removal processing of the interference component based on the interference data, the intersymbol interference being caused by a signal component of at least one of a preceding symbol that precedes the symbol and a succeeding symbol that succeeds the symbol being mixed in the useful symbol period of the symbol, and the intercarrier interference being caused by a signal component of the symbol being shorter than the useful symbol period.

2. The receiver of claim 1, wherein the interference removal unit includes:
  a delay upsample unit operable to generate first equalized data having a discrete frequency interval of 1/(N×Tu) by performing delay processing and upsample processing on the equalized data corresponding to one symbol, and operable to output the generated first equalized data, where N is a number greater than 1, and Tu represents a duration of the useful symbol period;
  an upsample unit operable to generate first channel response data having the discrete frequency interval of 1/(N×Tu) by performing upsample processing on the channel response data corresponding to the one symbol;
  a multiplication unit operable to generate first demodulated data by multiplying the first equalized data by the first channel response data on a per-carrier basis;
  an extraction unit operable to extract, from the first demodulated data, a first interference component pertaining to intersymbol interference due to a delayed wave, by performing filter processing on the first demodulated data based on a predetermined transfer function, and operable to generate first interference data indicating the first interference component;
  an interference component generation unit operable to generate the interference data indicating the interference component, by performing downsample processing on the first interference data; and
  a removal unit operable to subtract the interference data from the demodulated data corresponding to the one symbol.

3. The receiver of claim 2, wherein the interference component generation unit performs, on the first interference data, in addition to the downsample processing, phase rotation processing based on a value obtained by multiplying a duration of a guard interval period by −1, on the per-carrier basis.

4. The receiver of claim 1, wherein the interference removal unit includes:
  a first upsample unit operable to generate first equalized data having a discrete frequency interval of 1/(N×Tu) by performing upsample processing on the equalized data corresponding to one symbol, and operable to output the generated first equalized data, where N is a number greater than 1, and Tu represents a duration of a useful symbol period;
  a second upsample unit operable to generate first channel response data having the discrete frequency interval of 1/(N×Tu) by performing upsample processing on the channel response data corresponding to the one symbol;
  a multiplication unit operable to generate first demodulated data by multiplying the first equalized data by the first channel response data on a per-carrier basis;
  an extraction unit operable to extract, from the first demodulated data, a first interference component pertaining to intercarrier interference due to a delayed wave, by performing filter processing on the first demodulated data based on a predetermined transfer function, and operable to generate first interference data indicating the first interference component;
  an interference component generation unit operable to generate the interference data indicating the interference component, by performing downsample processing on the first interference data; and
  a removal unit operable to add the interference data to the demodulated data corresponding to the one symbol.

5. The receiver of claim 4,
  wherein the interference removal unit further includes a phase rotation unit operable to generate second equalized data by performing phase rotation processing on the equalized data corresponding to the one symbol or the first equalized data on the per-carrier basis, based on a duration of a guard interval period,
  wherein, when the phase rotation unit performs the phase rotation processing on the equalized data corresponding to the one symbol, the first upsample unit generates the first equalized data by performing the upsample processing on the second equalized data instead of on the equalized data corresponding to the one symbol,
  wherein, when the phase rotation unit performs the phase rotation processing on the first equalized data, the multiplication unit generates the first demodulated data by multiplying the second equalized data, instead of the first equalized data, by the first channel response data, on the per-carrier basis, and
  wherein, the interference component generation unit performs, on the first interference data, in addition to the downsample processing, phase rotation processing based on a value obtained by multiplying the duration of the guard interval period by −1, on the per-carrier basis.

6. The receiver of claim 1, wherein the interference removal unit includes:
  a delay unit operable to generate delayed equalized data by performing delay processing on the equalized data corresponding to one symbol;
  a difference unit operable to generate difference equalized data indicating a subtraction result by subtracting the equalized data corresponding to the one symbol from the delayed equalized data;
  a first upsample unit operable to generate first difference equalized data having a discrete frequency interval of 1/(N×Tu) by performing upsample processing on the difference equalized data, where N is a number greater than 1, and Tu represents a duration of a useful symbol period;
  a second upsample unit operable to generate first channel response data having the discrete frequency interval of 1/(N×Tu) by performing upsample processing on the channel response data corresponding to the one symbol;
  a multiplication unit operable to generate difference demodulated data by multiplying the first difference equalized data by the first channel response data on the per-carrier basis;
  an extraction unit operable to extract a first interference component pertaining to intersymbol interference due to a delayed wave and intercarrier interference due to the delayed wave, from the difference demodulated data, by performing filter processing on the difference demodulated data based on a predetermined transfer function, and operable to generate first interference data indicating the first interference component;

an interference component generation unit operable to generate the interference data indicating the interference component by performing downsample processing on the first interference data; and a removal unit operable to subtract the interference data from the demodulated data corresponding to the one symbol.

7. The receiver of claim 6, wherein the interference removal unit further includes a phase rotation unit operable to generate first equalized data by performing phase rotation processing on the equalized data corresponding to the one symbol on the per-carrier basis, based on a duration of a guard interval period, wherein the difference unit generates the difference equalized data by subtracting the first equalized data, instead of the equalized data corresponding to the one symbol, from the delayed equalized data, and wherein the interference component generation unit performs, on the first interference data, in addition to the downsample processing, phase rotation processing based on a value obtained by multiplying the duration of the guard interval period by −1, on the per-carrier basis.

8. The receiver of claim 6, wherein the interference removal unit further includes:

a first extraction unit operable to extract, from the difference demodulated data, a second interference component pertaining to intersymbol interference due to a preceding wave and intercarrier interference due to the preceding wave, by performing, on the difference demodulated data, filter processing based on a predetermined transfer function, and operable to generate second interference data indicating the second interference component;

a first interference component generation unit operable to generate third interference data indicating a third interference component pertaining to the intersymbol interference due to the preceding wave and the intercarrier interference due to the preceding wave;

a first delay unit operable to perform delay processing on first demodulated data resultant from processing by the removal unit, and operable to output first delayed demodulated data; and a first removal unit operable to add the first delayed demodulated data to the third interference data.

9. The receiver of claim 6, wherein the interference removal unit further includes:

a delay upsample unit operable to generate second channel response data having the discrete frequency interval of 1/(N×Tu) by performing delay processing and upsample processing on the channel response data corresponding to the one symbol, and operable to output the generated second channel response data;

a first multiplication unit operable to generate first difference demodulated data by multiplying the first difference equalized data by the second channel response data on the per-carrier basis;

a first extraction unit operable to extract, from the first difference demodulated data, a second interference component pertaining to intersymbol interference due to a preceding wave and intercarrier interference due to the preceding wave, by performing, on the first difference demodulated data, filter processing based on a predetermined transfer function, and operable to generate second interference data indicating the second interference component;

a first interference component generation unit operable to generate third interference data indicating a third interference component pertaining to the intersymbol interference due to the preceding wave and the intercarrier interference due to the preceding wave;

a first delay unit operable to perform delay processing on first demodulated data resultant from processing by the removal unit, and operable to output first delayed demodulated data; and a first removal unit operable to add the first delayed demodulated data to the third interference data.

10. The receiver of claim 1, wherein the interference removal unit includes:

a division unit operable to generate first equalized data by dividing supplied first delayed demodulated data by the channel response data corresponding to one symbol;

an interference component generation unit operable to (i) calculate a first interference component pertaining to intersymbol interference due to a delayed wave based on the first equalized data and the channel response data corresponding to the one symbol, (ii) calculate a second interference component pertaining to intercarrier interference due to the delayed wave based on the equalized data corresponding to the one symbol and the channel response data corresponding to the one symbol, and (iii) generate the interference data by calculating the interference component, by subtracting the second interference component from the first interference component;

a subtraction unit operable to subtract the interference data from the demodulated data corresponding to the one symbol and output first demodulated data; and a delay unit operable to perform processing on the first demodulated data and supply the delayed first demodulated data for a next symbol, to the division unit.

11. The receiver of claim 1, further comprising a selection unit operable to compare a reception quality of the demodulated data and a reception quality of first demodulated data obtained as a result of the removal processing by the interference removal unit, and operable to output one of the demodulated data and the first demodulated data that has a better reception quality.

12. The receiver of claim 1, wherein the interference removal unit performs the removal processing by performing hard decision processing on the equalized data.

13. The receiver of claim 1, further comprising a plurality of processing blocks which are cascade-connected in series, each processing block being composed of the equalization unit and the interference removal unit.

14. A receiver that receives transmission signals, which have been generated by multiplexing a plurality of modulated carriers, and that demodulates the received transmission signals, the receiver comprising:

a transform unit operable to extract, for each symbol, a transmission signal having a duration of a useful symbol period from the received transmission signals in a time domain, and operable to transform the extracted transmission signal into demodulated data in a frequency domain;

an equalization unit operable to estimate channel response data in the frequency domain based on the demodulated data, and operable to calculate equalized data in the frequency domain by equalizing the demodulated data based on the estimated channel response data and an interference removal unit operable to, for each symbol, (i) transform the equalized data in the frequency domain and the channel response data in the frequency domain so as to respectively obtain an equalized signal in the time domain and a channel signal in the time domain, (ii) perform processing of extending, in the time domain, the equalized signal in the time domain and the channel signal in the time domain so as to respectively obtain an extended time-domain equalized signal and an extended time-domain channel signal, (iii) calculate, based on the extended time-domain equalized signal and the extended time-domain channel signal, an interference signal indicating an interference component pertaining to at least one of intersymbol interference and intercarrier interference, and (iv) perform, on the demodulated data, removal processing of the interference component based on the interference signal, the intersymbol interference being caused by a signal component of at least one of a preceding symbol that precedes the symbol and a succeeding symbol that succeeds the symbol being mixed in the useful symbol period of the symbol, and the intercarrier interference being caused by a signal component of the symbol being shorter than the useful symbol period.

15. A receiver that receives transmission signals, which have been generated by multiplexing a plurality of modulated carriers, and that demodulates the received transmission signals, the receiver comprising:

a transform unit operable to transform, for each symbol, received transmission signals corresponding to the symbol in a time domain into demodulated data in a frequency domain;

a division unit operable to generate, for each symbol, equalized data by dividing the demodulated data by supplied delay channel response data;

an interference removal unit operable to, for each symbol, (i) perform upsample processing on the equalized data and the supplied delay channel response data so as to respectively obtain upsampled equalized data and upsampled channel response data, (ii) generate first demodulated data by calculating interference data indicating an interference component pertaining to at least one of intersymbol interference and intercarrier interference, based on the upsampled equalized data and the upsampled channel response data, and (iii) perform, on the demodulated data, removal processing of the interference component based on the interference data;

an equalization unit operable to estimate channel response data in the frequency domain based on the first demodulated data, and calculate equalized data in the frequency domain by equalizing the demodulated data based on the estimated channel response data; and a delay unit operable to perform delay processing on the channel response data and supply the delayed channel response data for a next symbol to the division unit and the interference removal unit.

16. A receiver that receives transmission signals, which have been generated by multiplexing a plurality of modulated carriers, and that demodulates the received transmission signals, the receiver comprising:

a transform unit operable to transform, for each symbol, received transmission signals corresponding to the symbol in a time domain into demodulated data in a frequency domain;

a first interference removal unit operable to generate, for each symbol, first demodulated data by subtracting supplied delay interference data indicating an interference component pertaining to intersymbol interference due to a delayed wave, from the demodulated data;

an equalization unit operable to estimate channel response data in the frequency domain based on the first demodulated data, and operable to calculate equalized data in the frequency domain by equalizing the demodulated data based on the estimated channel response data;

a second interference removal unit operable to, for each symbol, calculate an interference component pertaining to intersymbol interference due to the delayed wave based on the equalized data and the channel response data, generate interference data indicating the interference component, and perform interference removal processing on the first demodulated data; and a delay unit operable to perform delay processing on the interference data and supply the delayed interference data for a next symbol to the first interference removal unit.

17. An integrated circuit that receives transmission signals, which have been generated by multiplexing a plurality of modulated carriers, and that demodulates the received transmission signals, the integrated circuit comprising:

a transform unit operable to extract, for each symbol, a transmission signal having a duration of a useful symbol period from the received transmission signals in a time domain, and operable to transform the extracted transmission signal into demodulated data in a frequency domain;

an equalization unit operable to estimate channel response data in the frequency domain based on the demodulated data, and operable to calculate equalized data in the frequency domain by equalizing the demodulated data based on the estimated channel response data; and an interference removal unit operable to, for each symbol, (i) perform upsample processing on the equalized data and the estimated channel response data so as to respectively obtain upsample equalized data and upsampled channel response data, (ii) calculate interference data indicating an interference component pertaining to at least one of intersymbol interference and intercarrier interference based on the upsampled equalized data and the upsampled channel response data, and (iii) perform, on the demodulated data, removal processing of the interference component based on the interference data, the intersymbol interference being caused by a signal component of at least one of a preceding symbol that precedes the symbol and a succeeding symbol that succeeds the symbol being mixed in the useful symbol period of the symbol, and the intercarrier interference being caused by a signal component of the symbol being shorter than the useful symbol period.

18. A reception method used by a receiver that receives transmission signals, which have been generated by multiplexing a plurality of modulated carriers, and that demodulates the received transmission signals, the reception method comprising:

a transforming step of extracting, for each symbol, a transmission signal having a duration of a useful symbol period from the received transmission signals in a time domain, and transforming the extracted transmission signal into demodulated data in a frequency domain;

an equalizing step of estimating channel response data in the frequency domain based on the demodulated data, and calculating equalized data in the frequency domain by equalizing the demodulated data based on the estimated channel response data; and an interference removing step of, for each symbol, (i) performing upsample processing on the equalized data and the estimated channel response data so as to respectively obtain upsampled equalized data and upsampled channel response data, (ii) calculating interference data indicating an interference component pertaining to at least one of intersymbol interference and intercarrier interference based on the upsampled equalized data and the upsampled channel response data, and (iii) performing, on the demodulated data, removal processing of the interference component based on the interference data, the intersymbol interference being caused by a signal component of at least one of a preceding symbol that precedes the symbol and a succeeding symbol that succeeds the symbol being mixed in the useful symbol period of the symbol, and the intercarrier interference being caused by a signal component of the symbol being shorter than the useful symbol period.

* * * * *